(12) United States Patent
Hallar et al.

(10) Patent No.: US 11,829,206 B2
(45) Date of Patent: Nov. 28, 2023

(54) BI-STABLE SYNCHRONIZED DUAL AXLE HINGE

(71) Applicant: Dell Products L.P., Round Rock, TX (US)

(72) Inventors: James H. Hallar, Austin, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 17/245,417

(22) Filed: Apr. 30, 2021

(65) Prior Publication Data
US 2021/0247816 A1 Aug. 12, 2021

Related U.S. Application Data

(62) Division of application No. 16/583,828, filed on Sep. 26, 2019, now Pat. No. 11,016,540.

(51) Int. Cl.
*G06F 1/16* (2006.01)
*E05D 3/12* (2006.01)
*E05D 11/10* (2006.01)

(52) U.S. Cl.
CPC ........... *G06F 1/1681* (2013.01); *E05D 3/122* (2013.01); *E05D 11/1028* (2013.01); *G06F 1/1616* (2013.01); *E05Y 2900/606* (2013.01)

(58) Field of Classification Search
CPC ..... G06F 1/1681; G06F 1/1616; E05D 3/122; E05D 11/1028; E05Y 2900/606
See application file for complete search history.

(56) References Cited

U.S. PATENT DOCUMENTS

| | | | |
|---|---|---|---|
| 4,477,941 A | 10/1984 | Gregg | |
| 5,102,084 A | 4/1992 | Park | |
| 5,363,089 A | 11/1994 | Goldenberg | |
| 5,775,460 A | 7/1998 | Stone | |
| 7,512,376 B2 | 3/2009 | Suzuki | |
| 7,520,028 B2 | 4/2009 | Borieis | |
| 8,441,791 B2 | 5/2013 | Bohn et al. | |
| 8,472,177 B2 | 6/2013 | Probst et al. | |
| 8,769,772 B2 | 7/2014 | Griffin | |
| 8,776,319 B1 | 7/2014 | Chang et al. | |

(Continued)

FOREIGN PATENT DOCUMENTS

KR 100665709 11/2002
WO 2002082674 A1 10/2002

*Primary Examiner* — Victor D Batson
*Assistant Examiner* — Matthew J Sullivan
(74) *Attorney, Agent, or Firm* — ZAGORIN CAVE LLP; Robert W. Holland

(57) ABSTRACT

A portable information handling system housing rotationally couples first and second housing portions with a hinge assembly having first and second breakaway brackets that define an adjacent position of the first and second housing portions relative to each other and a spread position. The first and second breakaway brackets expand the spacing between the first and second housing portions in the event that the housing portions close over an object disposed between them. The breakaway brackets bias to the adjacent position with a biasing device and a retainer that maintains the adjacent position unless a predetermined force is applied through the hinge assembly at the breakaway brackets.

4 Claims, 46 Drawing Sheets

(56) References Cited

U.S. PATENT DOCUMENTS

| | | |
|---|---|---|
| 8,947,361 B2 | 2/2015 | Oakley |
| 9,430,000 B2 | 8/2016 | Hood, III |
| 9,464,471 B1 | 10/2016 | Chen et al. |
| 9,983,637 B1 | 5/2018 | Morrison |
| 10,203,731 B1 | 2/2019 | Brocklesby |
| 10,223,959 B2 | 3/2019 | Aurongzeb |
| 10,234,907 B2 | 3/2019 | Knoppert |
| 10,407,957 B1 | 9/2019 | Camp |
| 10,446,908 B2 | 10/2019 | Bologna |
| 10,564,681 B2 | 2/2020 | Siddiqui |
| 10,573,954 B2 | 2/2020 | Bologna |
| 10,725,505 B1 * | 7/2020 | Hallar .................. E05D 7/00 |
| 10,824,205 B2 * | 11/2020 | Lin .................. G06F 1/203 |
| 10,852,776 B1 * | 12/2020 | Morrison ............ E05D 11/1028 |
| 10,928,864 B1 * | 2/2021 | Sanchez ................ G06F 1/1681 |
| 10,983,570 B1 * | 4/2021 | Files .................. G06F 3/04886 |
| 10,989,978 B1 * | 4/2021 | Tsen .................. G06F 3/04886 |
| 10,990,204 B1 * | 4/2021 | Trim .................. G06F 1/1669 |
| 11,016,539 B2 * | 5/2021 | Hallar .................. G06F 1/1618 |
| 11,016,540 B2 * | 5/2021 | Hallar .................. G06F 1/1618 |
| 11,093,008 B2 * | 8/2021 | Hallar ................ E05D 11/1028 |
| 11,099,611 B2 * | 8/2021 | Hallar .................. G06F 1/1618 |
| 11,237,599 B2 * | 2/2022 | Ku .................. G06F 1/1618 |
| 11,268,565 B2 * | 3/2022 | Bae .................. F16C 11/04 |
| 11,320,876 B1 * | 5/2022 | North .................. G06F 1/166 |
| 2007/0097613 A1 | 5/2007 | Tracy et al. |
| 2007/0201199 A1 | 8/2007 | Schlesener |
| 2010/0142139 A1 | 6/2010 | Szabolcsi |
| 2011/0072727 A1 | 3/2011 | Kumazawa |
| 2011/0157780 A1 | 6/2011 | Wang et al. |
| 2011/0228463 A1 | 9/2011 | Matagne |
| 2012/0120618 A1 | 5/2012 | Bohn |
| 2012/0206893 A1 | 8/2012 | Bohn |
| 2013/0111704 A1 | 5/2013 | Mitsui |
| 2013/0163201 A1 * | 6/2013 | Wang .................. H05K 5/0213 361/692 |
| 2014/0223693 A1 | 8/2014 | Hsu |
| 2015/0267450 A1 | 9/2015 | Chiang |
| 2015/0378397 A1 | 12/2015 | Park et al. |
| 2015/0378400 A1 | 12/2015 | Sprenger et al. |
| 2016/0102487 A1 | 4/2016 | Kuramochi |
| 2016/0320795 A1 | 11/2016 | Daley, III |
| 2017/0145724 A1 | 5/2017 | Siddiqui |
| 2017/0235337 A1 | 8/2017 | Vic et al. |
| 2018/0049336 A1 | 2/2018 | Manuel et al. |
| 2018/0136696 A1 | 5/2018 | Chen |
| 2018/0196468 A1 | 8/2018 | Watamura et al. |
| 2018/0292860 A1 | 10/2018 | Siddiqui |
| 2018/0356858 A1 | 12/2018 | Siddiqui |
| 2018/0363341 A1 | 12/2018 | Siddiqui |
| 2019/0050028 A1 | 2/2019 | Chung et al. |
| 2019/0138054 A1 | 5/2019 | Alva et al. |
| 2019/0212773 A1 | 7/2019 | Jiang et al. |
| 2019/0317572 A1 | 10/2019 | North et al. |
| 2020/0012322 A1 | 1/2020 | Jan et al. |
| 2020/0117233 A1 | 4/2020 | Ou et al. |
| 2020/0117245 A1 | 4/2020 | Ou et al. |
| 2020/0166974 A1 | 5/2020 | Ai et al. |
| 2020/0183451 A1 | 6/2020 | Lin et al. |
| 2020/0192497 A1 | 6/2020 | Knoppert et al. |
| 2020/0225710 A1 | 7/2020 | Pelissier et al. |
| 2020/0241602 A1 | 7/2020 | Ku et al. |
| 2020/0256099 A1 | 8/2020 | Lin et al. |
| 2020/0291702 A1 * | 9/2020 | Hsu .................. G06F 1/1681 |
| 2020/0348745 A1 | 11/2020 | Tamlin et al. |
| 2020/0349895 A1 | 11/2020 | Files et al. |
| 2020/0349903 A1 | 11/2020 | Pelissier et al. |
| 2021/0022256 A1 | 1/2021 | Yu |
| 2021/0064084 A1 | 3/2021 | Lin et al. |
| 2021/0096607 A1 | 4/2021 | Hallar |
| 2021/0096608 A1 | 4/2021 | Hallar |
| 2021/0096609 A1 | 4/2021 | Hallar |
| 2021/0096610 A1 | 4/2021 | Hallar |
| 2022/0365568 A1 | 11/2022 | Torres et al. |
| 2022/0408578 A1 * | 12/2022 | Huang .................. H05K 5/0018 |
| 2023/0035672 A1 * | 2/2023 | Liu .................. G06F 1/1681 |

* cited by examiner

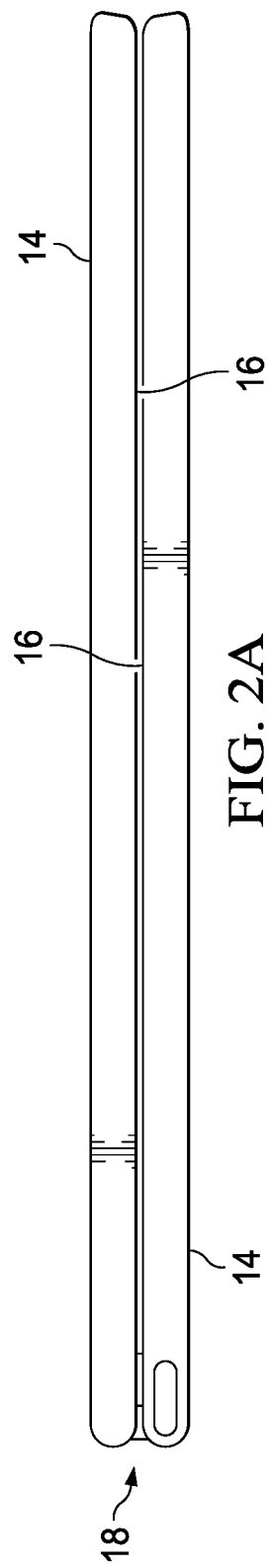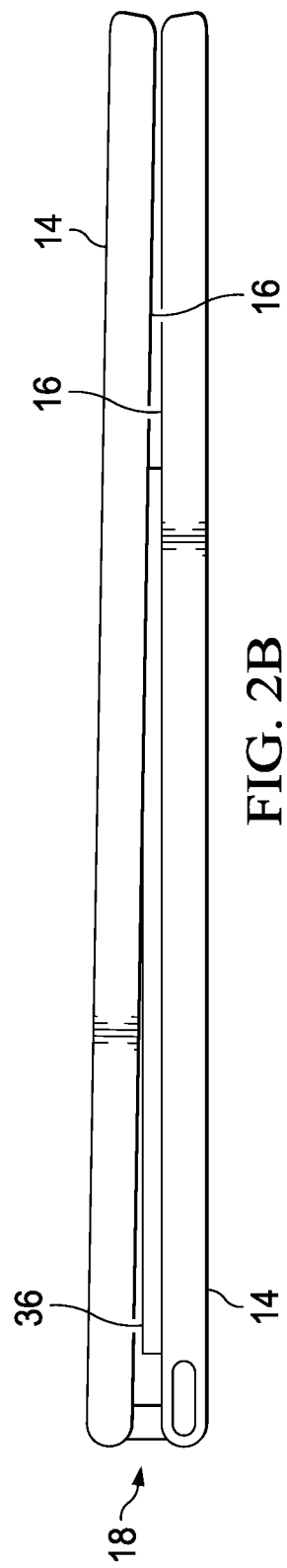
FIG. 2A
FIG. 2B

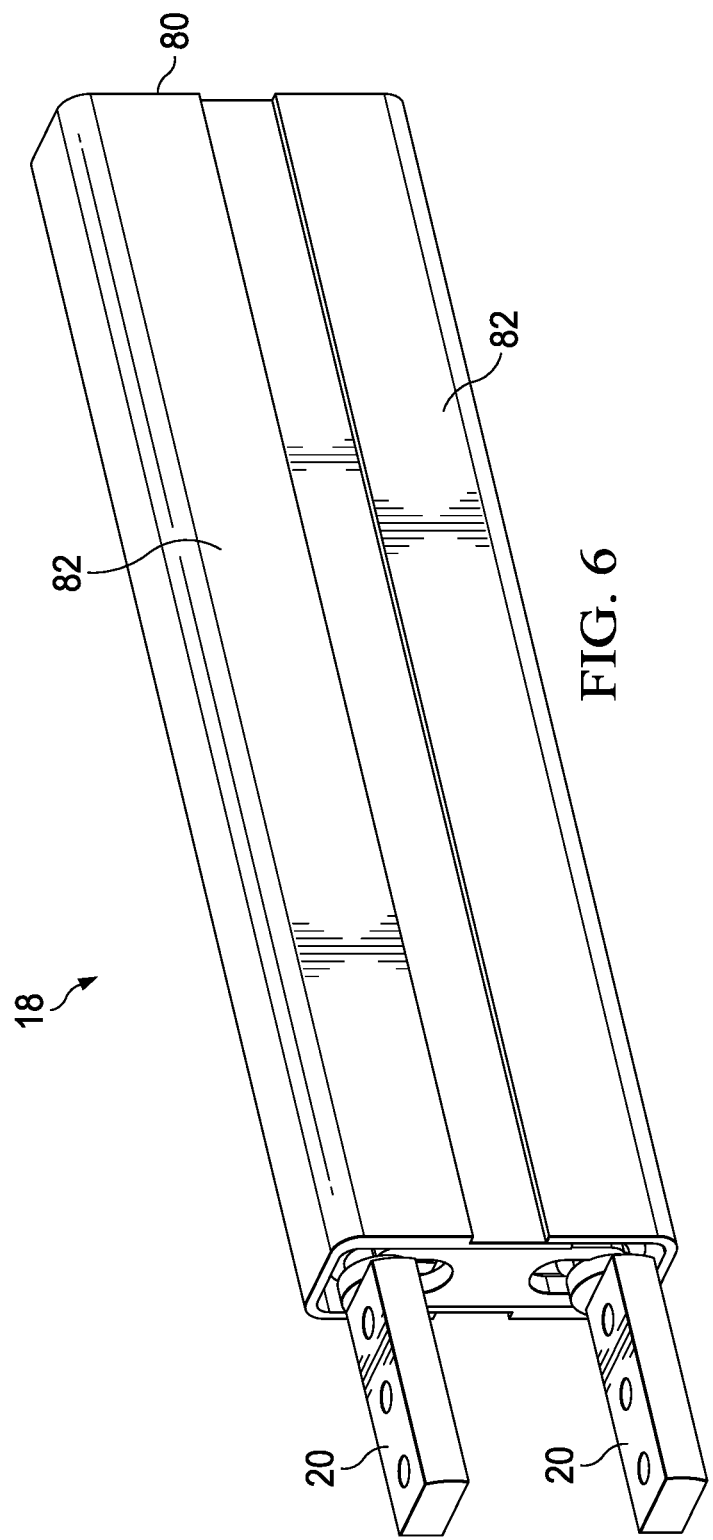

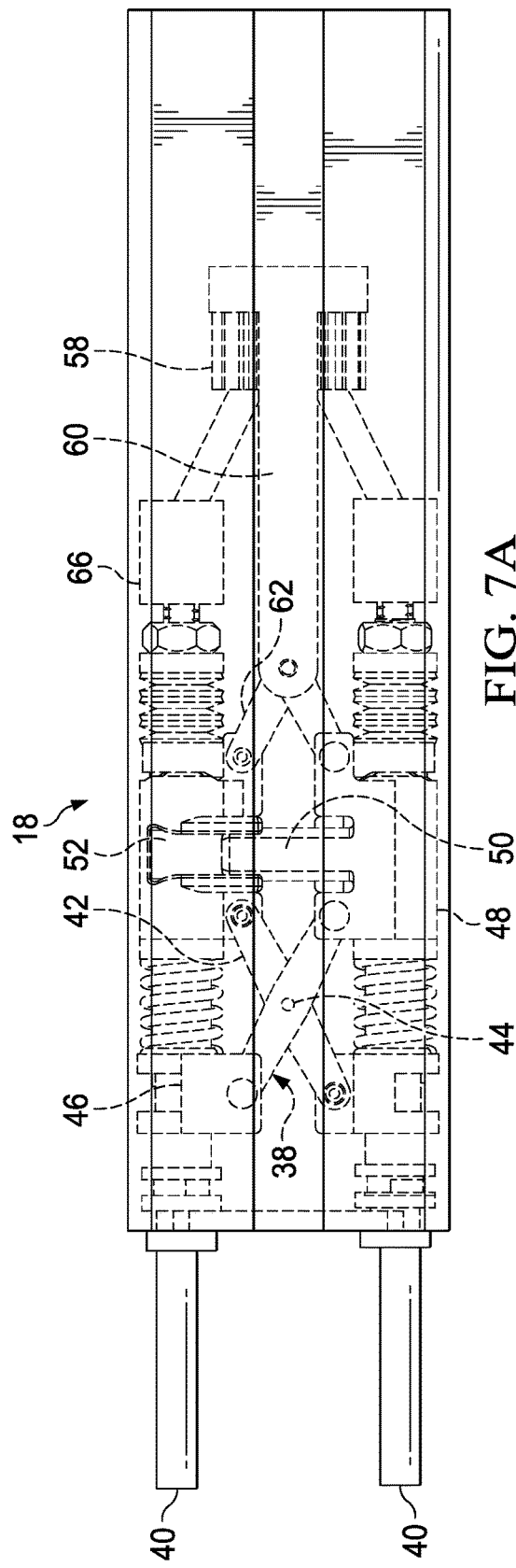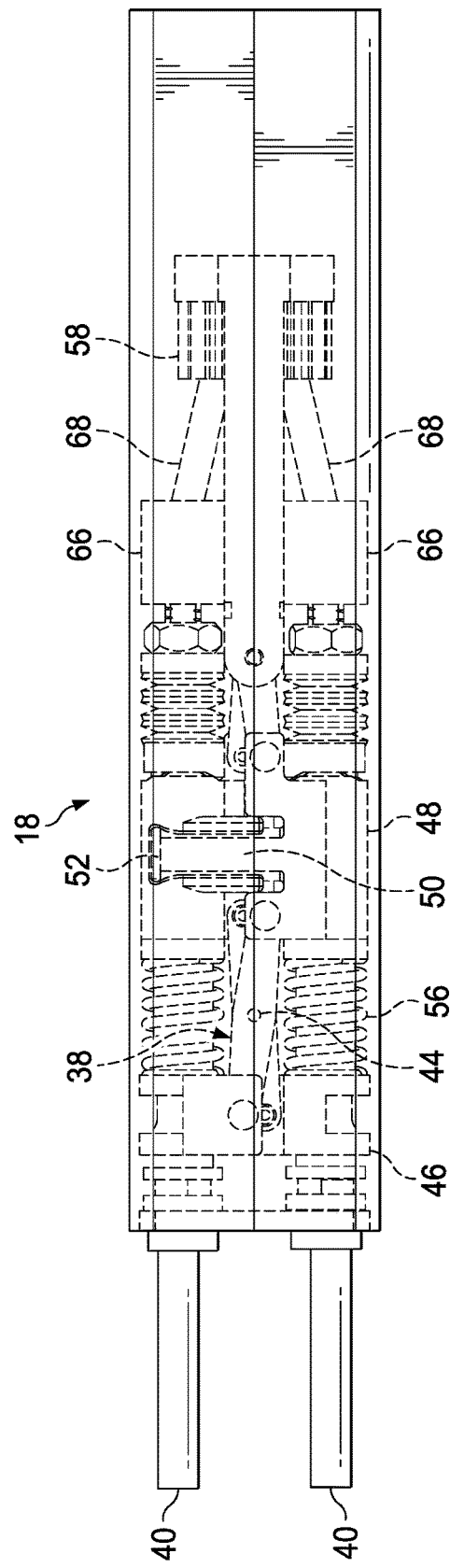

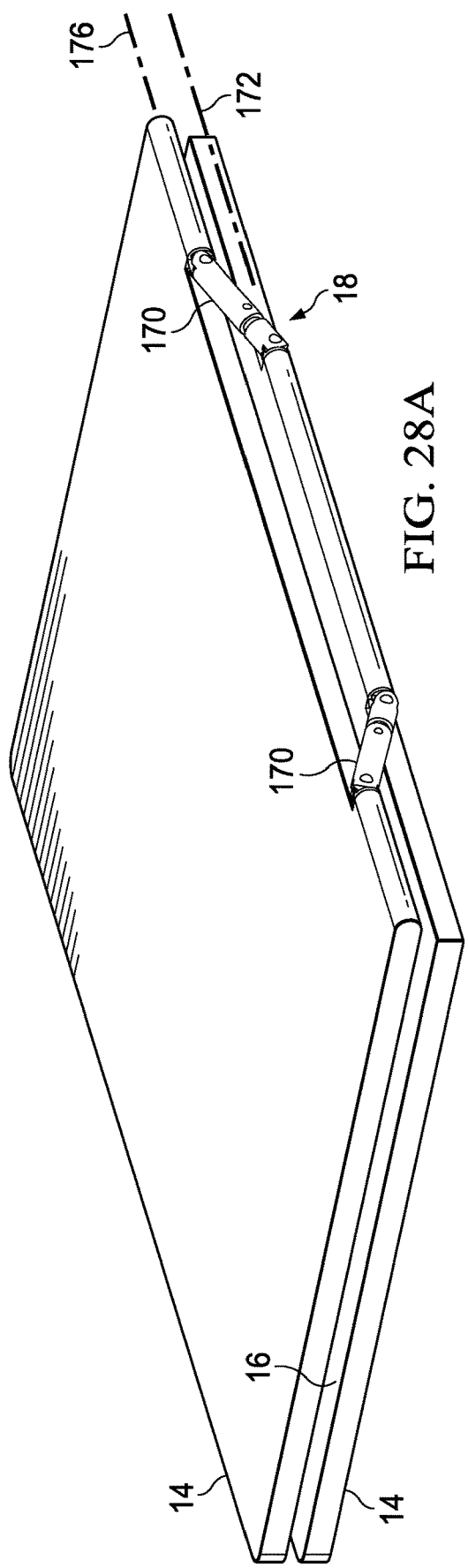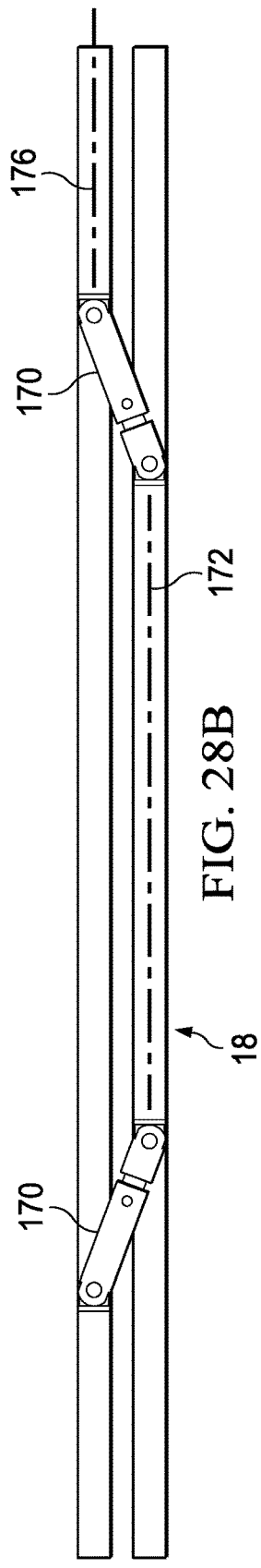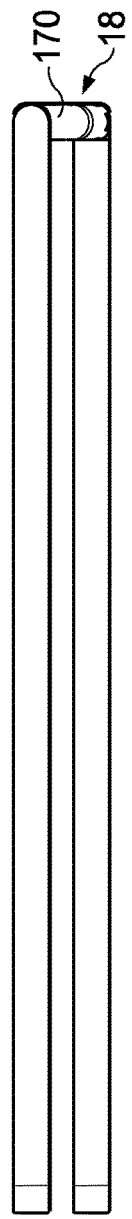
FIG. 28A
FIG. 28B
FIG. 28C

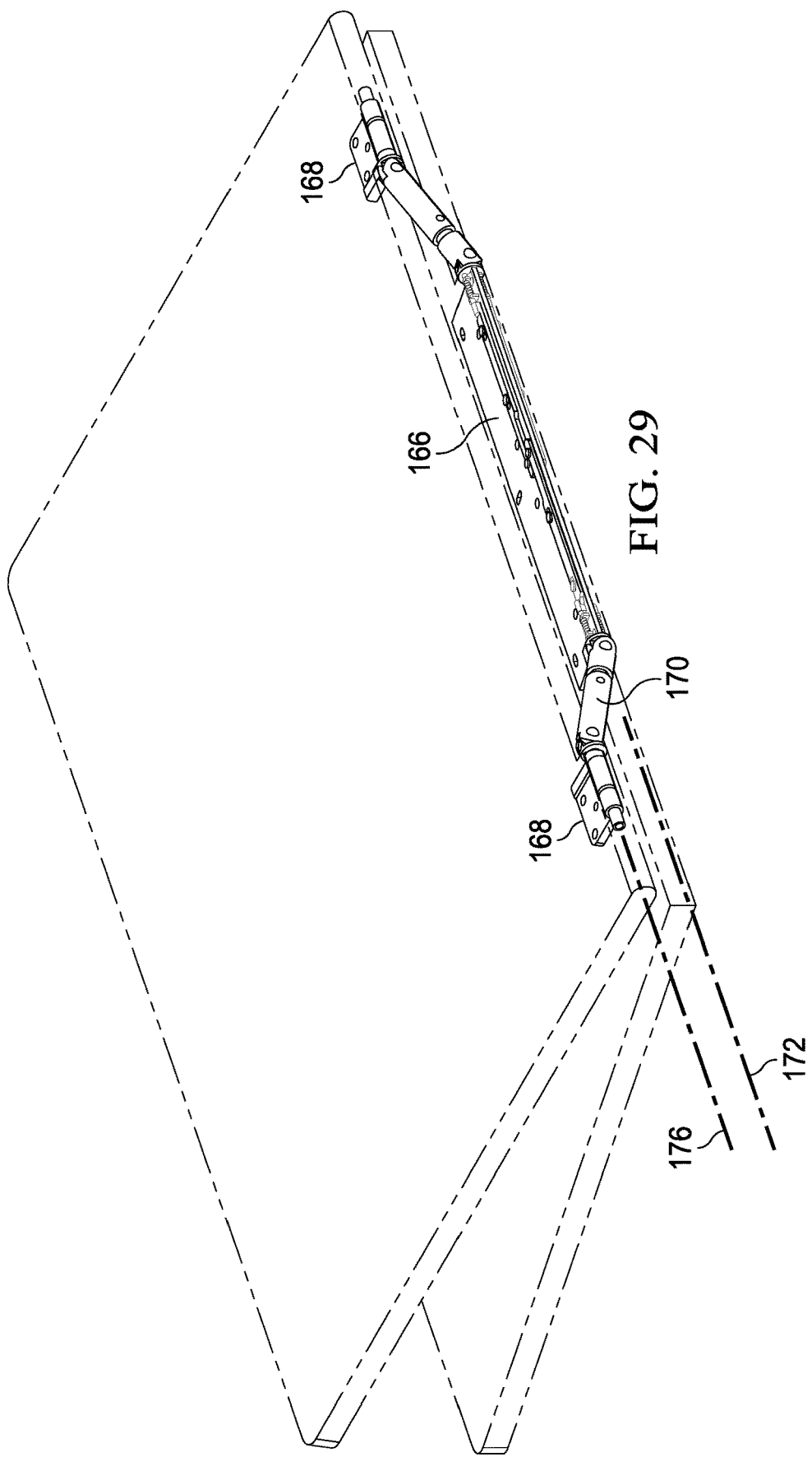

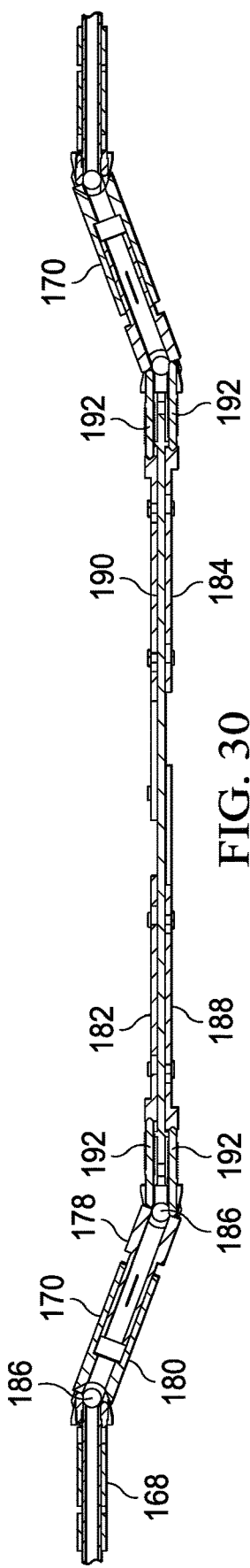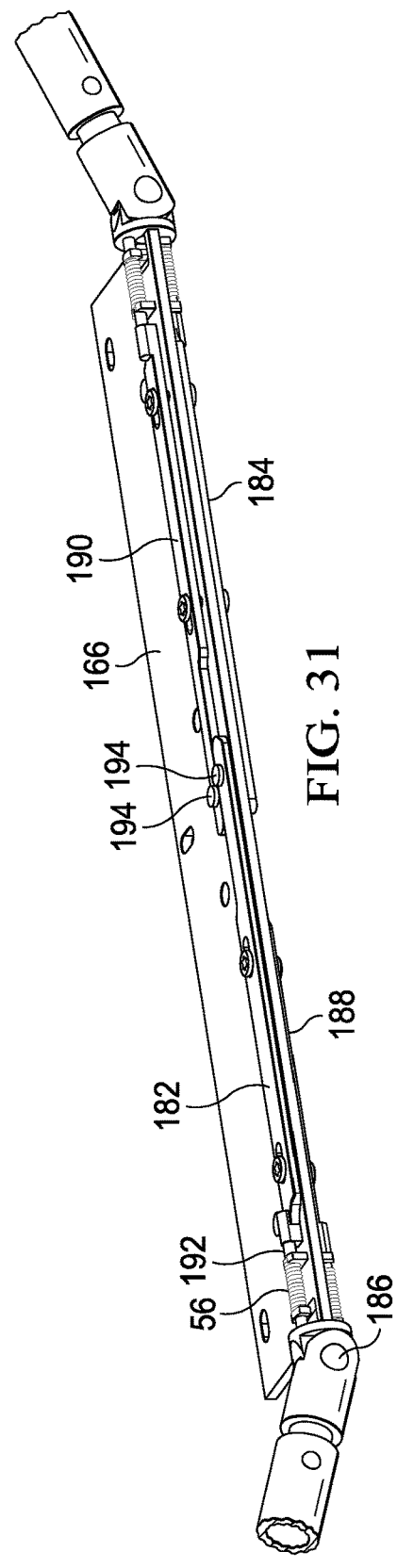
FIG. 30
FIG. 31

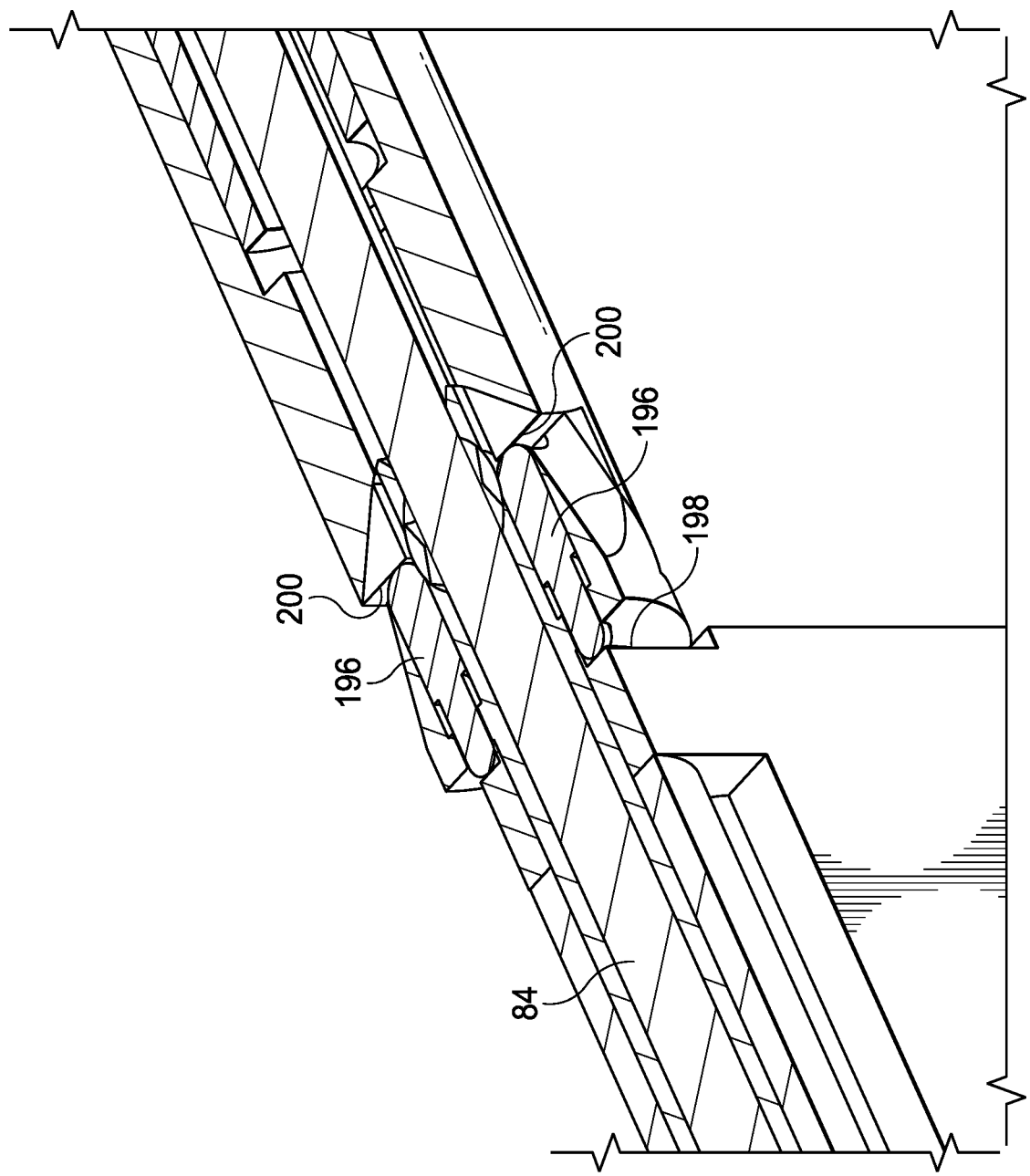

BI-STABLE SYNCHRONIZED DUAL AXLE HINGE

CROSS REFERENCE TO RELATED APPLICATIONS

This application is a divisional of U.S. patent application Ser. No. 16/583,828, filed Sep. 26, 2019, entitled "Bi-Stable Synchronized Dual Axle Hinge," naming James H. Hallar and John Trevor Morrison as inventors, which application is incorporated herein by reference in its entirety.

U.S. patent application Ser. No. 16/583,794, filed Sep. 26, 2019, now U.S. Pat. No. 10,928,864, entitled "Synchronized Dual Shaft Expandable Hinge" by inventors Anthony J. Sanchez, John Trevor Morrison, and George Tzeng, describes exemplary methods and systems and is incorporated by reference in its entirety.

U.S. patent application Ser. No. 16/583,800, filed Sep. 26, 2019, entitled "Synchronized Dual Shaft Expandable Hinge" by inventors James H. Hallar and John Trevor Morrison, describes exemplary methods and systems and is incorporated by reference in its entirety.

U.S. patent application Ser. No. 16/583,808, filed Sep. 26, 2019, entitled "Synchronized Expandable Dual Axle Hinge and Clutch" by inventors James H. Hallar and John Trevor Morrison, describes exemplary methods and systems and is incorporated by reference in its entirety.

U.S. patent application Ser. No. 16/583,816, filed Sep. 26, 2019, entitled "Belt Synchronized Expandable Dual Axle Hinge" by inventors James H. Hallar and John Trevor Morrison, describes exemplary methods and systems and is incorporated by reference in its entirety.

U.S. patent application Ser. No. 16/583,835, filed Sep. 26, 2019, now U.S. Pat. No. 10,852,776, entitled "Synchronized Single Axle Hinge" by inventors Jason S. Morrison and John Trevor Morrison, describes exemplary methods and systems and is incorporated by reference in its entirety.

U.S. patent application Ser. No. 16/583,843, filed Sep. 26, 2019, now U.S. Pat. No. 10,725,505, entitled "Synchronized Expandable Hinge Assembly" by inventors James H. Hallar, John Trevor Morrison, and Andrew P. Tosh, describes exemplary methods and systems and is incorporated by reference in its entirety.

BACKGROUND OF THE INVENTION

Field of the Invention

The present invention relates in general to the field of portable information handling systems, and more particularly to a portable information handling system synchronized dual shaft expandable hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with a hinge assembly to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One disadvantage of integrating a keyboard in a portable information handling system housing is that only one-half of the upper surface area of the housing includes a display to present visual images. An alternative approach is to have both upper surfaces of rotationally coupled housing portions integrate a display so that an end user has a larger display area for viewing visual images. In some instances, a separate liquid crystal display (LCD) panel is integrated in each housing portion. Alternatively, a flexible organic light emitting diode (OLED) display film may extend over both housing portions. Information handling systems that integrate a display over both rotationally coupled housing portions typically support a clamshell configuration by presenting a keyboard at one display and accepting keyed inputs as touches at the keyboard. Although such virtual keyboards provide a convenient input device, end users typically prefer physical keyboards that have moving keys.

One solution available to end users is to interface with the information handling system through a peripheral keyboard, such as through a wireless interface. Peripheral keyboards are available to support key inputs to a portable information handling system that have a minimalist footprint for improved mobility. For instance, a peripheral keyboard with approximately the same width as the integrated display may rest over the display while an end user types inputs. Such peripheral keyboards typically have a minimal Z height and weight to provide ready storage and improved mobility. Often portable information handling systems have carrying cases that provide a storage pocket for the peripheral keyboards.

One difficulty that can arise with peripheral keyboards used at dual display information handling systems is that end users will attempt to close the housing portions over top of the keyboard. Portable information handling system hinge assemblies for dual display systems tend to have a minimal size so that the housing portions remain close to each other and thus have less of a break between different viewing surfaces on different housing portions. Further, convertible information handling system hinge assemblies tend to have dual axles synchronized by gears so that the housing portions do not interfere with each other during the transition between closed and tablet configurations. Often, hinge assembly gears have a minimal size and precise manufacture that does not respond well to application of excessive force, such as can happen if the housing portions are shut over top of an object like a keyboard. If a hinge assembly gear binds, the housing portions may fail to rotate or damage may occur to the displays if an end user attempt to rotate the housing portions introduces excessive torsional force. In addition to damage to the hinge assembly, closing housing portions over top of an object may result in damage to the display due to the force applied by the object against the display.

SUMMARY OF THE INVENTION

Therefore, a need has arisen for a system and method which adapts portable information handling system hinge assemblies to provide a variable distance between housing portions closed over an object.

A further need exists for a dual axle hinge assembly that synchronizes housing portion rotation at varying distances between the dual axles.

A further need exists for a single axle hinge assembly that provides rotation between closed and tablet positions without interference between the housing portions during rotation.

In accordance with the present invention, a system and method are provided which substantially reduce the disadvantages and problems associated with previous methods and systems for rotationally coupling information handling system housing portions. A hinge assembly rotationally couples the housing portions at variable distances for a given orientation to provide clearance between the housing portions and to separate the housing portions if an object prevents rotation to a desired position, such as closure of the housing portions over a keyboard.

More specifically, a portable information handling system processes information with processing components disposed in a housing having separate housing portions rotationally coupled by a hinge assembly. The information is presented as visual images at one or more displays integrated in the housing. The hinge assembly synchronously rotates the housing portions to provide 360 degrees of rotation between closed and tablet positions. In one embodiment, synchronous rotation is provided by a dual axle hinge assembly having the dual axles interfaced to transfer rotation between the axles. Transfer of rotation is provided between the axles as the axles vary distance between each other. One example dual axle embodiment couples the axles with a scissor assembly that expands and contracts to adjust the distance between the axles. Mesh gears interface with each other at a fixed gear support to transfer rotation communicated with the axles by a translation axle interfaced through a set of universal joints. Another example dual axle embodiment communicates axle rotation through helical gears and an idler assembly having helical and mesh gears so that the idler assembly supports rotation transfer at variable axle distances. Yet another example dual axle embodiment transfers axle rotation with bands that route rotation through translation pulleys at variable axle distances.

One example embodiment provides dual axle synchronized motion for housing portions at multiple gear ratios so that the housing portions can have a compressed or expanded relative position. A clutch engages to shift one of the dual axle positions relative to a gear assembly so that a desired gear ratio is engaged. In the example embodiment and similar embodiments, logic executing on a controller, such as firmware stored in flash memory and executed on an embedded controller, detects an object on a display, such as keyboard, and adjusts the hinge assembly to provide room for the object between the housing portions. As an alternative to clutch selection of a gear ratio, the position of dual axles may remain unchanged relative to each other but adjust relative to the housing portion. For example, a breakaway bracket releases in response to a separating force at the hinge to increase the distance between the axle supported by the bracket and the housing portion, thus increasing the distance between the housing portions.

Another example embodiment provides synchronous housing portion rotation and variable distances between housing portions with a single axis hinge assembly. A main bracket couples to one housing portion on a main axis with rotationally coupled telescoping members extending from opposing ends. First and second secondary brackets couple to the other housing portion at opposing ends of the main bracket so that pivoting of the telescoping members at the main bracket and the secondary brackets defines a minor axis of rotation offset from the main axis. A cam surface at the secondary bracket interface with the telescoping member and a linkage across the main bracket cooperate to synchronize motion of the housing portions. In addition to the synchronized motion that results from the minor axis shifting around the main axis, the telescoping members provide extra extension to create space between the housing portions if needed to close over top of an object, such as a keyboard.

The present invention provides a number of important technical advantages. One example of an important technical advantage is that an information handling system rotates housing portion in a synchronized manner with a variable distance provided between the housing portions to adapt to objects placed between the housing portions without damage to the system. Variable distance between the housing portions is provided by a variety of embodiments including a dual axle hinge assembly that changes the distance between the axles, a dual axle hinge assembly that breaks away a bracket to change the distance between the housing and the hinge axles, a single axle hinge assembly that defines a minor axis with telescoping members to vary distance between housing portions, and a clutch that selects different gear ratios to rotate the housing portions. By adapting housing portion spacing with a hinge assembly, objects disposed between the housing portions are less likely to cause damage to the system display and to the hinge assembly. An automated response, such as based upon pressure applied towards separation of the housing portions from each other, prevents damage in an object is inadvertently left between the housing portions. Further, flexible response by a hinge assembly to unexpected forces provides a more robust system less sensitive to extreme operating conditions and external stresses.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A and 2B depict a side view of an information handling system hinge assembly in a compressed position having opposing displays adjacent to each other and an expanded position having opposing displays spread apart from each other;

FIG. 6 depicts a side perspective view of the hinge assembly disposed in a housing having slidingly engaged upper and lower portions;

FIGS. 7A and 7B depict a side view of a hinge assembly having a scissors assembly that coordinates movement of parallel axles between expanded and compressed configurations;

FIGS. 28A, 28B and 28C depict the portable information handling system having the single axle hinge in a closed configuration with a spread housing position between the housing portions;

FIG. 29 depicts a rear perspective cutaway view of the information handling system adapting the hinge assembly to varying distances as needed during closing of the housing portions;

FIG. 30 depicts a side view of the single axis hinge assembly having the secondary brackets offset to a minor axis of rotation;

FIG. 31 depicts an upper perspective view of the single axis hinge assembly synchronized translation of telescoping member rotation;

FIGS. 32A, 32B, and 32C depict upper perspective views of the single axis hinge assembly secondary bracket synchronized translation of rotation through the telescoping member;

DETAILED DESCRIPTION

A portable information handling system housing rotationally couples housing portions with a hinge assembly that selectively varies the distance between the housing portions, such as by expanding the hinge assembly to provide space for a keyboard disposed between the housing portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
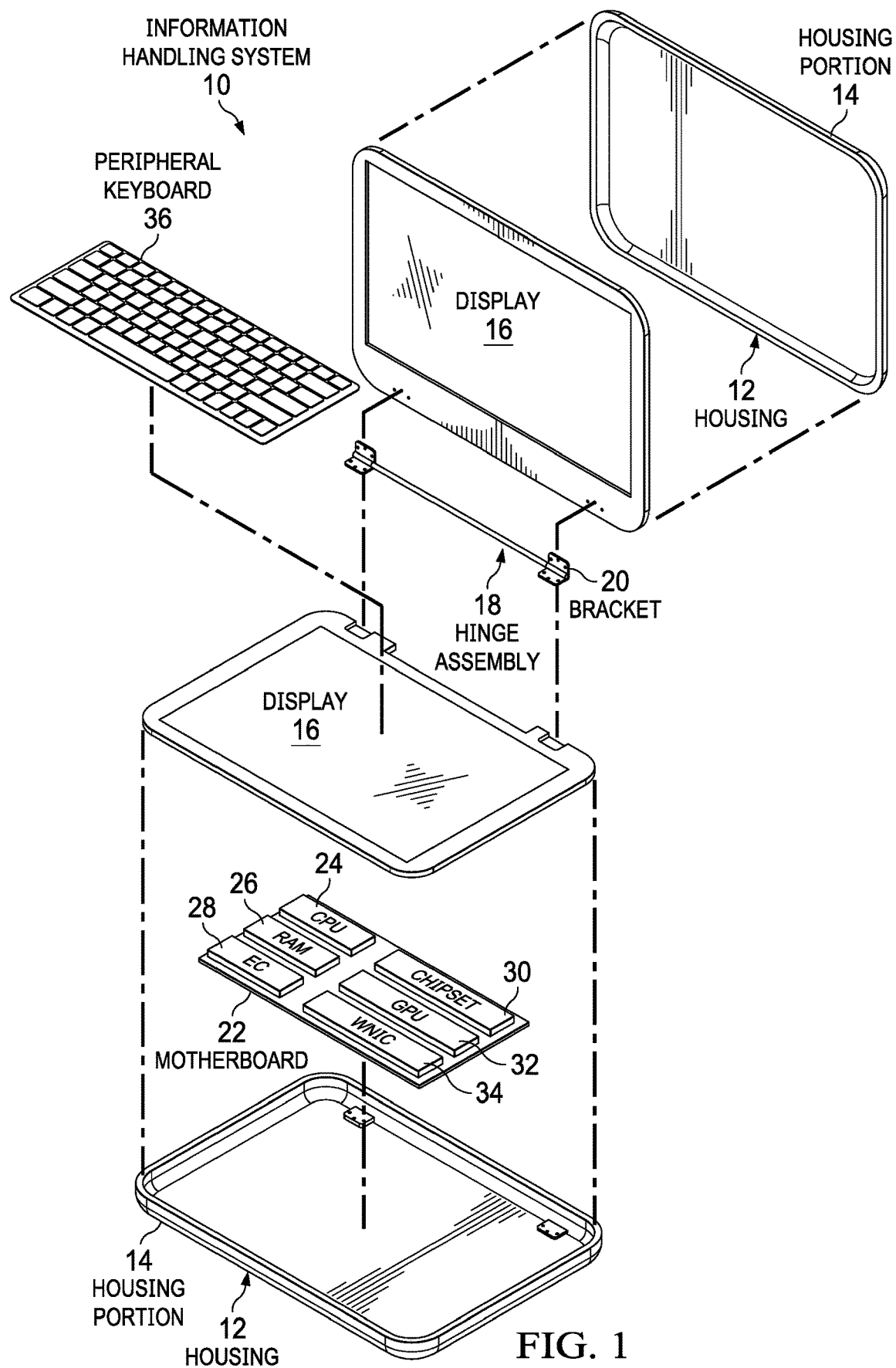
FIG. 1 depicts an exploded perspective view of an information handling system having an expandable hinge assembly configured to provide space to close rotationally coupled housing portions over a peripheral keyboard.

Referring now to FIG. 1, an exploded perspective view depicts an information handling system 10 having an expandable hinge assembly 18 configured to provide space to close rotationally coupled housing portions 14 over a peripheral keyboard 36. Information handling system 10 has a portable configuration built in a portable housing 12 that supports mobile operations with integrated processing components, input/output devices and power supply. In the example embodiment, housing 12 has first and second housing portions 14 that each integrate a display one on side, such as a liquid crystal display (LCD) panel or an organic light emitting diode (OLED) display panel. In alternative embodiments, a single flexible OLED display film may extend across both housing portion 14 upper surfaces to fold at hinge assembly 18 when transitioned to a closed position. Hinge assembly 18 includes plural brackets 20 that couple to each housing portion 14, such as with screws or other coupling devices. As is described in greater depth below, hinge assembly 18 rotates housing portions 14 between a closed position having displays 16 adjacent to each other to a variety of open positions, such as a clamshell position having approximately 90 degrees of rotation, a flat tablet position having approximately 180 degrees of rotation, a tent position having approximately 270 degrees of rotation and a tablet convertible position having approximately 360 degrees of rotation.

In the example embodiment, information handling system 10 processing components interface through a motherboard 22 to coordinate processing of information. For example, a central processing unit (CPU) 24 executes instructions to processing information with the instructions and information stored in random access memory (RAM) 26. An embedded controller 28 manages control of hardware components, such as power and thermal management, and of interactions with I/O devices, such touchscreens integrated with displays 16. A chipset 30 coordinates operation of CPU 24, such as by managing clock speed and memory transactions. A graphics processor unit (GPU) 32 interfaces with CPU 24, such as through coordination by chipset 30, to generate pixel values that define visual images for presentation at displays 16. A wireless network interface card (WNIC) 34 provides wireless communication, such as through a wireless personal area network (WPAN) that interfaces with peripheral keyboard 36. In various embodiments, various types of processing components may cooperate to process information in various configurations of portable information handling systems. For instance, rather than a dual display 16 system as depicted by the example embodiment, a single display 16 in one housing portion 14 and an peripheral keyboard 36 in another housing portion 14 may be used. Hinge assembly 18 adapts a distance between housing portions 14 in the event an object is closed between the housing portions that could damage a display 16. Various example embodiments of such hinge assemblies are described below in greater detail.

Referring now to FIGS. 2A and 2B, a side view of information handling system 10 depicts hinge assembly 18 in a compressed position having opposing displays 16 adjacent to each other and an expanded position having opposing displays spread apart from each other. FIG. 2A illustrates the relative position of housing portions 14 at completion of rotating to a closed position about hinge assembly 18 to bring displays 16 adjacent to each other. As with conventional portable information handling systems, the adjacent position seeks to compress housing portions 14 to close proximity so that the Z-height of the system is minimal for improved portability. FIG. 2B illustrates the relative position of opposing housing portions 14 where hinge assembly 18 has an expanded configuration to provide a spaced position between displays 16, such as with a peripheral keyboard 36 left in between housing portions 14. In the example embodiment, hinge assembly 18 defines a spaced position having at least the thickness of keyboard 36 and transitions to the spaced position by compressing opposing displays 16 around keyboard 36. For example, hinge assembly 18 includes a biasing device that biases it to a compressed configuration and that is overcome at a predetermined force to transition to the expanded configuration. The compression force that overcomes biasing of hinge assembly 18 has a threshold set sufficiently small so as to avoid damage to displays 16. The amount of space provided by expanding of hinge assembly 18 may be limited to the thickness of peripheral keyboard 36 or may provide greater spacing to protect against other objects that may inadvertently be placed between housing portions 14. In one example embodiment, objects placed on a display are detected, such as by the touchscreen of the display, so that an actuator is used to transition hinge assembly 18 to the expanded configuration.

Figure 3:
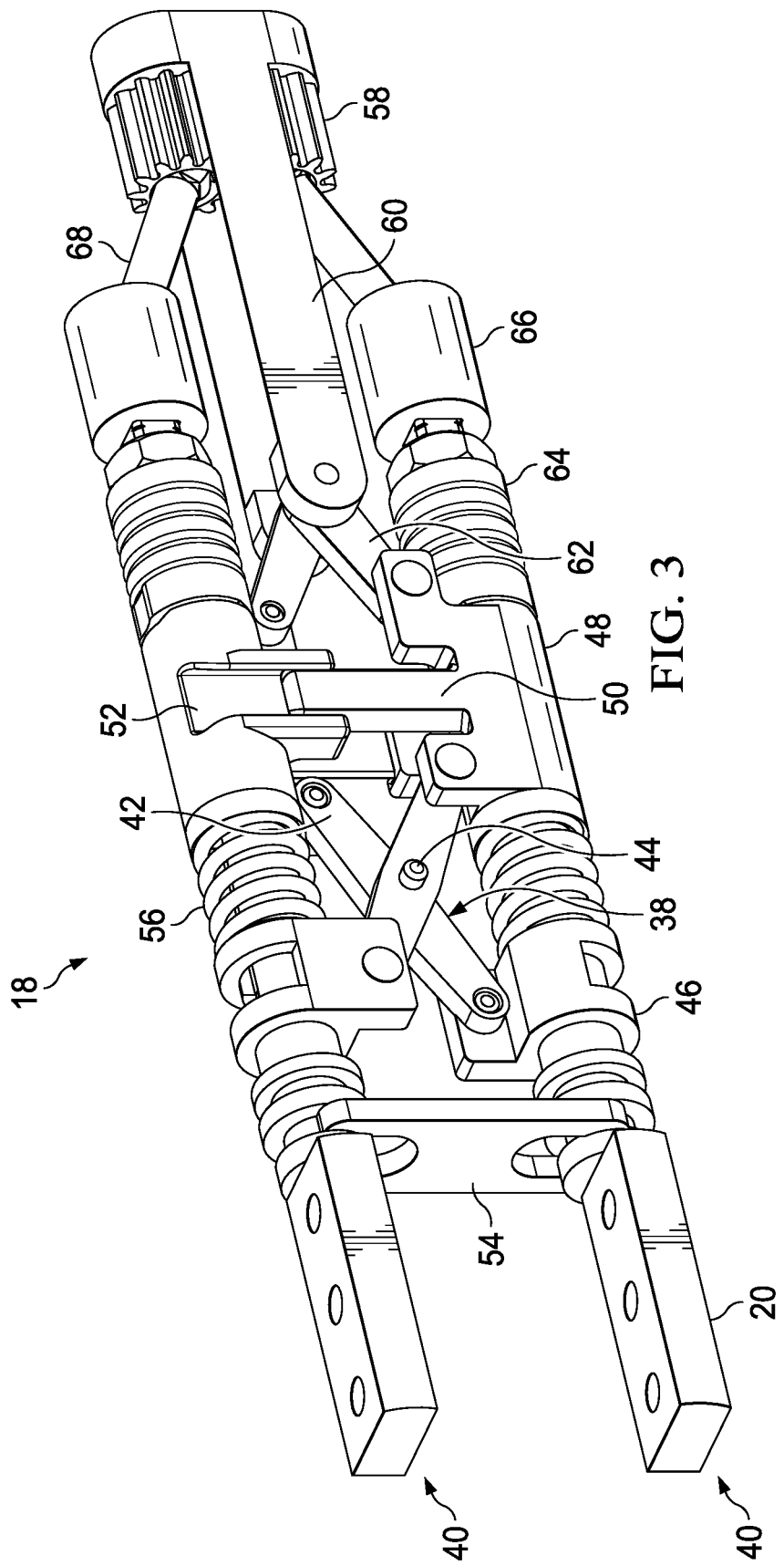
FIG. 3 depicts a side perspective view of a hinge assembly having a scissors assembly to adjust a distance between parallel and laterally aligned axles.

Referring now to FIG. 3, a side perspective view depicts a hinge assembly 18 having a scissors assembly 38 to adjust a distance between parallel and laterally aligned axles 40. Hinge assembly 18 is in an expanded configuration having an additional space provided between parallel axles 40 as reflected by the expanded cross members 42 of scissor assembly 38. Each axle 40 terminates in a bracket 20 that couples to separate information handling system housings 14. Scissors assembly 38 has first and second cross members 42 rotationally coupled at a central pivot location 44 and at opposing ends to axles 40 so that axles 40 maintain a substantially parallel orientation during movement between the expanded and compressed positions. One end of each cross member 42 couples to a biasing sleeve 46 inserted around an axle 40 to slide laterally as the distance between axles 40 adjusts. The opposite ends of each cross member 42 couples to a collar 48 having a fixed location laterally along axles 40. An extension 50 of collar 48 slides within a groove 52 to provide alignment of axles 40 in a fixed lateral position while compensating for a changed vertical distance between axles 40. Biasing sleeve 46 adapts to changes in the relative length of scissors assembly 38 by sliding biasing sleeve 46 along each axle 40 motivated by scissors assembly 38 cross members 42. A spacer 54 couples to each axle 40 and defines a range of vertical motion towards the compressed configuration. A biasing spring 56 is disposed between biasing sleeve 46 and collar 48 to bias scissors assembly 38 towards a compressed position. An expanding force operating on hinge assembly 18, such as by an object placed between two housing portions coupled to brackets 20 and rotated closed, overcomes the bias of biasing spring 56 to slide biasing sleeve 46 towards collar 48. In one example embodiment, biasing spring 56 releases biasing sleeve 46 to slide along axle 40 if a force separating axles 40 is within a threshold of a force associated with damage to a display closed over an object.

Rotational movement of axles 40 translates between axles 40 through synchronizing gears 58 held in proximity to each other during vertical movement of axles 40 by a gear support 60. Gear support 60 is held in a central position of axles 40 by a gear scissors support 62 having a cross member coupled to opposing sides of collar 48 to maintain the central position of gear support 60 as axles 40 move vertically. Each axle 40 has a torque generator 64 coupled proximate collar 48 to generate torque that resists rotational movement and terminates at a universal joint 66, each of which rotates with its respective axle 40. At the end of each universal joint 66, a translation axle 68 translates rotation between each axle 40 and each synchronous gear 58. Universal joints 66 adapt to variations in distances between axles 40 by adjusting the angle of translation axle 68 to the relative fixed position of synchronous gears 58. Rotation within universal joints 66 of translation axles 68 and rotation of gear scissors support 62 at collar 48 and gear support 60 cooperate to maintain engagement of synchronous gears 58.

Figure 4:
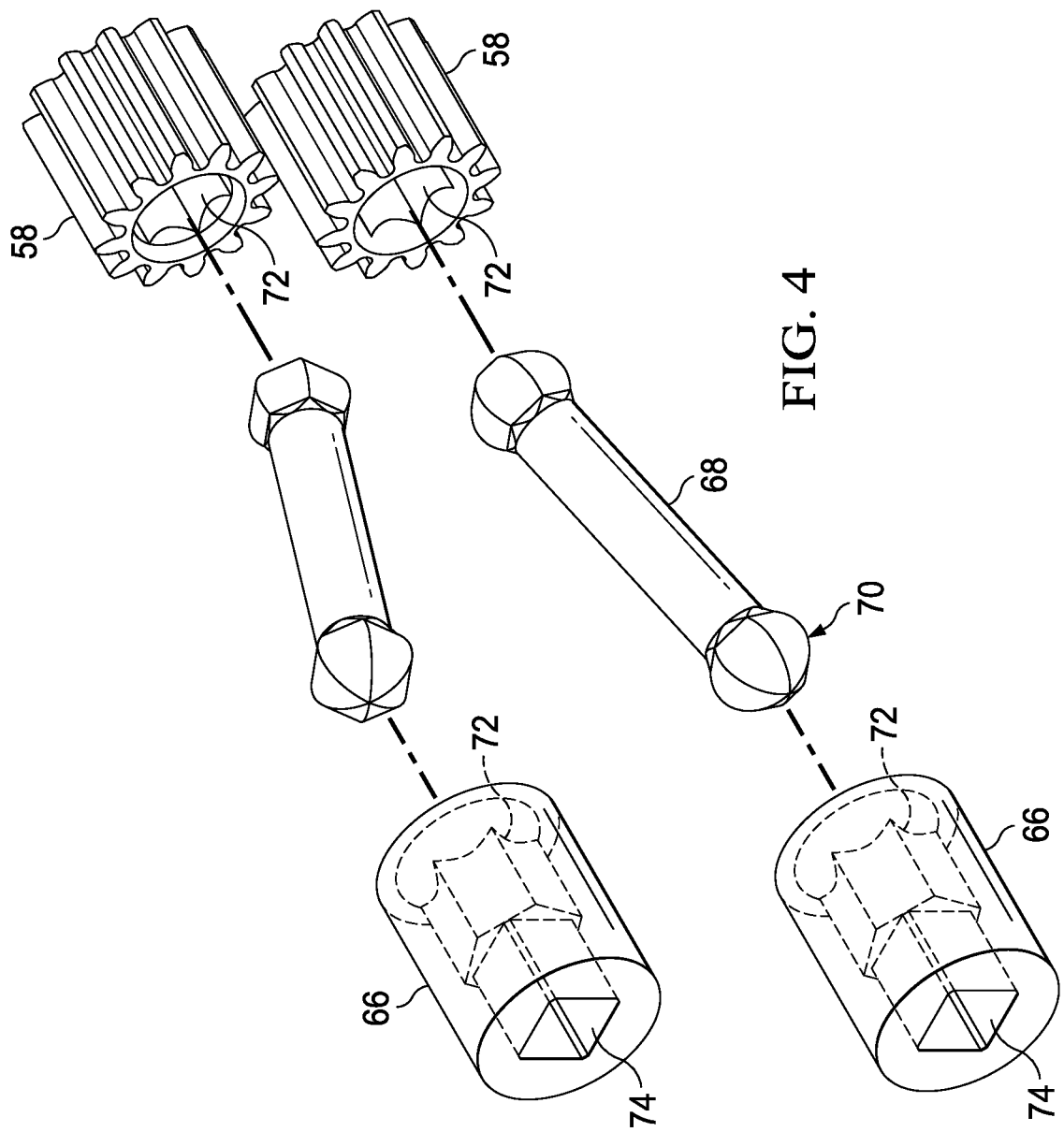
FIG. 4 depicts an exploded side perspective view of a gear scissors support with universal ball joints to translate rotational movement between hinge assembly axles.

Referring now to FIG. 4, an exploded side perspective view depicts a gear scissors support universal ball joints to translate rotational movement between hinge assembly axles. Each translation axle 68 terminates on both opposing ends with a round end 70 sized to snap into a rounded receptacle 72 formed in both synchronizing gears 58 and universal joint 66. Round end 70 couples with round receptacle 72 to maintain a fixed rotational relationship of universal joint 66 and synchronous gear 58 through translational axle 68 while providing off-axis rotation as the distance between axles 40 changes. Square receptacles 74 fit onto the ends of each axle 40 without a need for off-axis rotation. In alternative embodiments, universal joint 66 could have a rounded coupling at axle 40 that provides off-axial rotation while translation axles 68 fixed co-axial with the opposite side of universal joint 66. Various other off-axis translations of rotation between axles 40 and synchronous gears 58 may be used.

Figure 5:
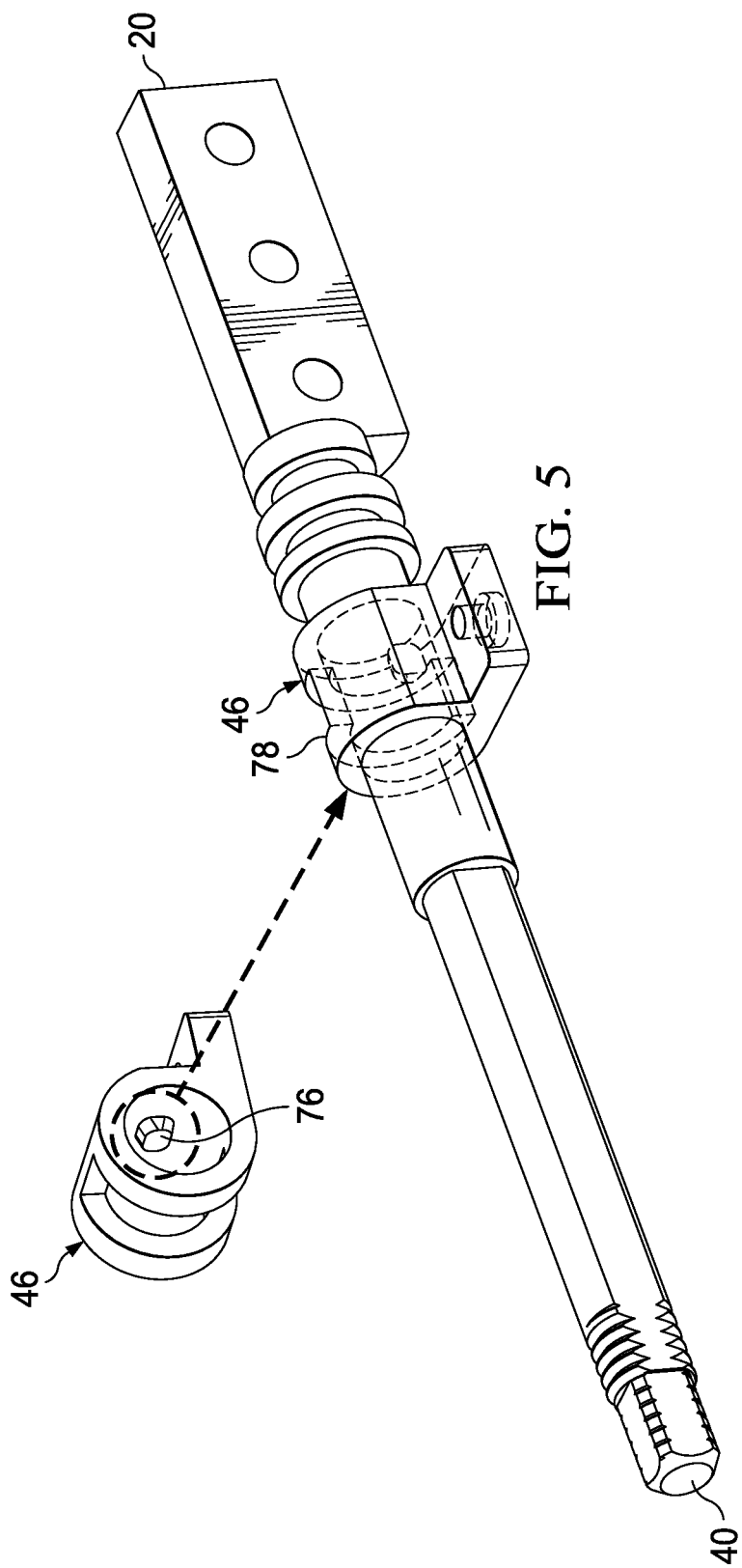
FIG. 5 depicts a side perspective view of a biasing sleeve configured to interact with an axle to restrict hinge expansion to predetermined angular relationships.

Referring now to FIG. 5, a side perspective view depicts a biasing sleeve 46 configured to interact with an axle 40 to restrict hinge expansion to predetermined angular relationships. Biasing sleeve 46 includes an extension 76 from an inner circumference that extends into an axle guide 78 formed in axle 40. Extension 76 engages axle guide 78 to define rotational angles at which sliding of biasing sleeve 46 is allowed along axle 40. If extension 76 interacts with axle guide 78 to prevent sliding of biasing sleeve 46, then axles 40 cannot move vertically with respect to each other. Preventing the expanding apart of axles 40 may be a desired behavior between 90 and 270 degrees of housing portion rotation since an object will not be captured between the housing portions over that rotational range. Allowing expansion between zero and 90 degrees of rotation and between 270 and 360 degrees of rotation helps to prevent damage caused by an object caught between closing housing portions. In various embodiments, axle guide 78 may provide various amounts of rotation at varying housing orientations to achieve a desired degree of protection for the information handling system.

Referring now to FIG. 6, a side perspective view depicts hinge assembly 18 disposed in a housing 80 having slidingly engaged upper and lower portions. During normal operations in a compressed configuration, brackets 20 synchronously rotate to separate housing portions. As a separating force is applied at brackets 20 that overcomes biasing by hinge assembly 18 to the compressed position, housing 80 has two separate housing portions 82 that slide apart as the axles 40 of hinge assembly 18 increase their vertical distance between each other.

Referring now to FIGS. 7A and 7B, a side view of a hinge assembly 18 depicts a scissors assembly 38 that coordinates movement of parallel axles 40 between expanded and compressed configurations. FIG. 3A depicts hinge assembly 18 in an expanded configuration having an additional 4.0 mm of space provided between parallel axles 40 relative to the compressed configuration depicted by FIG. 3B. Scissors assembly 38 first and second cross members 42 rotationally couple at a central pivot location 44 and at opposing ends to axles 40 so that axles 40 maintain a substantially parallel orientation during movement between the expanded and compressed positions. One end of each cross member 42 couples to a biasing sleeve 46 inserted around an axle 40 to slide laterally as the distance between axles 40 adjusts. The opposite ends of each cross member 42 couples to a collar 48 having a fixed location laterally along axles 40 to hold axles 40 in a fixed lateral orientation during relative vertical movement. Extension 50 slides within groove 52 to provide alignment of axles 40 in the fixed lateral position while compensation for a changed distance between axles 40 is provided by sliding of biasing sleeves 46 along each axle 40 motivated by scissors assembly 38 cross members 42. Opposite collar 48 from scissor assembly 38, gear scissors support 62 extends and retracts gear support 60 so that synchronizing gears 58 remain engaged while translation axles 68 rotate off axis from axles 40 to translate rotational movement between axles 40 with synchronizing gears 58.

Comparing FIGS. 7A and 7B illustrates the interaction of hinge assembly 18 components as axles 40 vary the distance between them by 4.0 mm. In FIG. 7A, scissors assembly 38 expands to separate axles 40 from each other by 4.0 mm distance compared with the compressed configuration of scissors assembly 38 in FIG. 7B. Scissors assembly 38 slides biasing sleeves 46 along axles 40 towards collar 48 in FIG. 7A and pushes biasing sleeves 46 away from collar 48 in FIG. 7B. Similarly, gear scissors support 62 moves gear support 60 away from collar 48 with movement from the expanded configuration of FIG. 7A to the compressed configuration of FIG. 7B so that the longer relative engagement of translation axles 68 are compensated for as the compressed position aligns axles 40, translation axles 68 and synchronizing gears 58 in a more co-linear manner.

Figure 8:
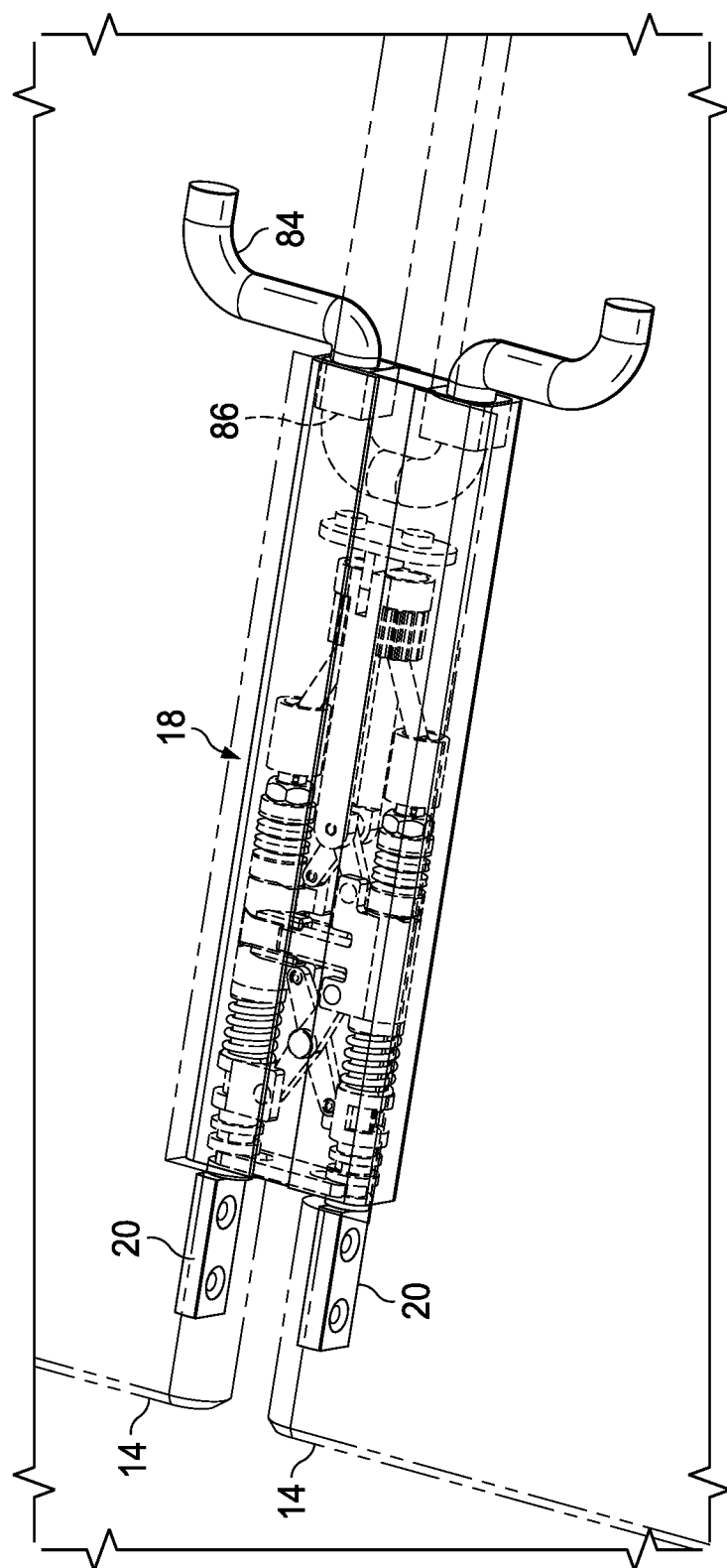
FIG. 8 depicts a side perspective view of the hinge assembly having cables routed through at the varied axle distances.

Referring now to FIG. 8, a side perspective view depicts hinge assembly 18 having cables 84 routed through at the varied axle distances. Cable 84 enters each side of hinges assembly 18 at a cable holder 86 and passes across hinge assembly 18 with a U-shaped loop. The U-shape loop in cable 84 within hinge assembly 18 allows cable 84 to smoothly deflect as hinge assembly 18 expands and contracts. In part, cable management may take advantage of defined angles of rotation at which axles 40 are restricted from varying the distance between each other.

Figure 9:
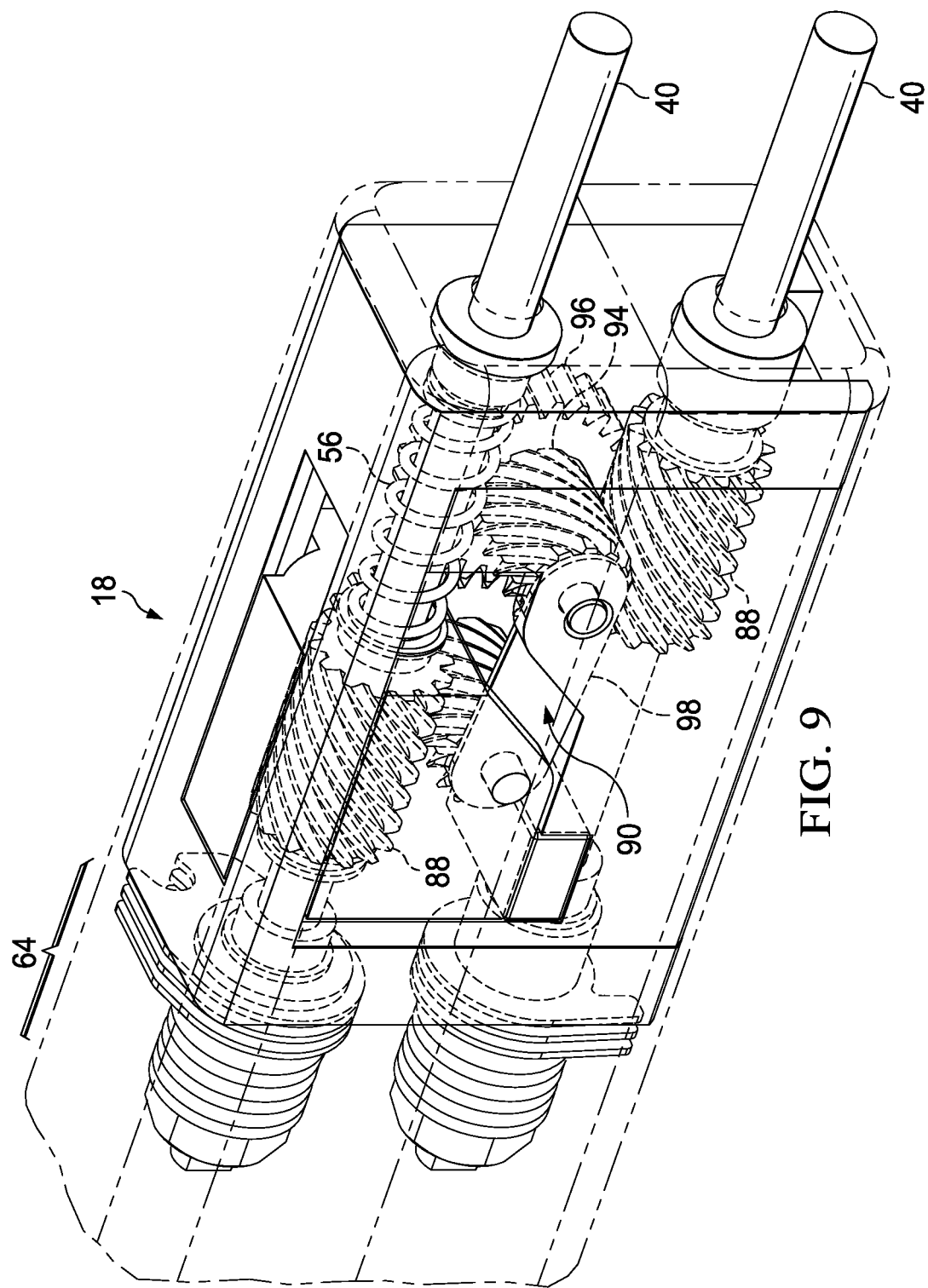
FIG. 9 depicts a side perspective view of a hinge assembly having helical gear synchronized variable distance axles driven by an idler assembly biased to a compressed position.
Figure 14:
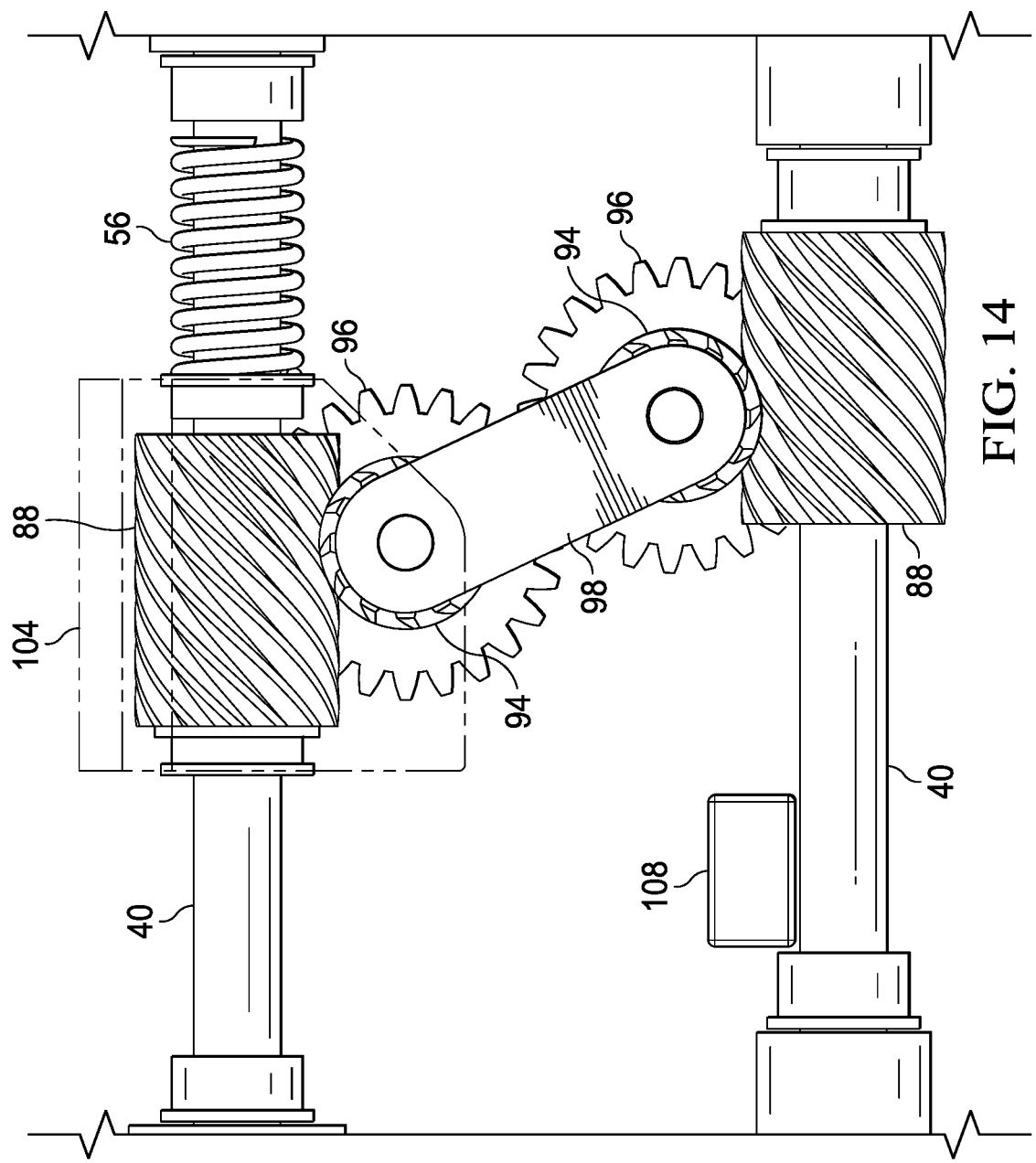
FIG. 14 depicts a side view of a hinge assembly in an expanded position with idler assembly gear assemblies transferring rotation between parallel axles at an increased distance relative to the compressed position.

Referring now to FIG. 9, a side perspective view depicts a hinge assembly 18 having helical gear 88 synchronized variable distance axles 40 driven by an idler assembly 90 biased to a compressed position. In the example embodiment, each axle 40 has a helical gear 88 fixed on the outer surface and engaged with an idle assembly 90, which transfers rotation between axles 40 at variable distances. Idler assembly 90 has two separate idler gear assemblies coupled to each other by an idler support member 98. Each idler gear assembly has an idler helical gear 94 fixed to an idler mesh gear 96. Each idler helical gear 94 engages with an axle helical gear 88 to transfer axle rotation to the idler mesh gear 96. Both idler mesh gears 96 of idler assembly 90 are engaged at a fixed distance to each other by idler support member 98. As the distance between axles 40 varies, idler assembly 90 changes it orientation between the parallel orientation shown by FIG. 9 in the compressed position to a perpendicular orientation, such as is depicted in FIG. 14. A biasing spring 56 disposed on one axle 40 biases idler assembly 90 towards a compressed position. A torque generator 64 generates torque to control motion of axles 40.

Figure 10:
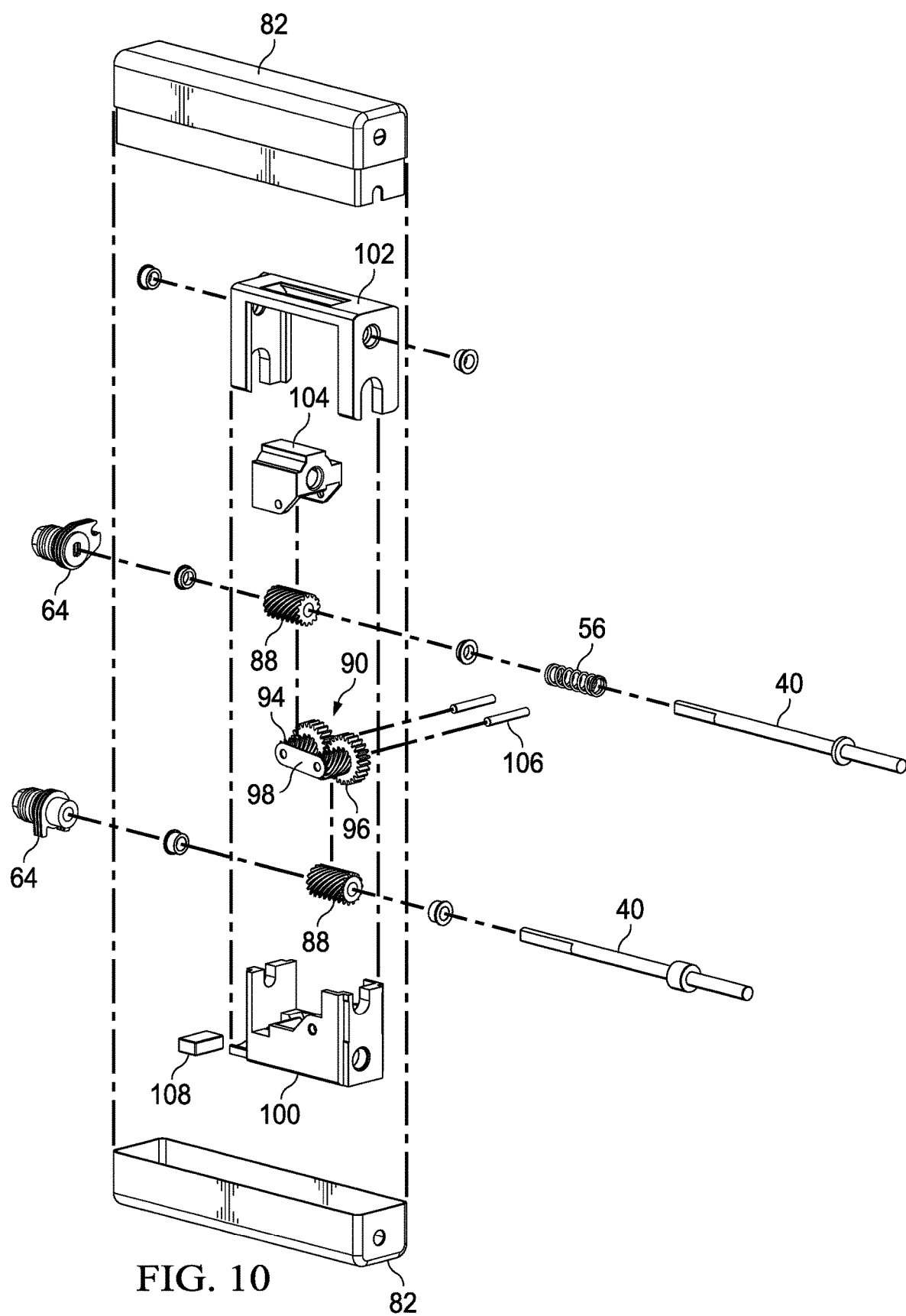
FIG. 10 depicts an exploded side perspective view of the helical gear driven synchronized variable axle distance hinge assembly.

Referring now to FIG. 10, an exploded side perspective view depicts the helical gear driven synchronized variable axle distance hinge assembly 18. A lower axle 40 inserts through a bottom opening of a bottom gear chassis 100 and an upper axle 40 inserts through a top opening of a top gear chassis 102. In addition, upper axle 40 inserts through a drive carriage 104 that moves laterally along axle 40 in support of vertical axle movement as described below. Idler assembly 90 resides within bottom gear chassis 100 and top gear chassis 102 to maintain synchronized axle rotation at variable axle distances. In the example embodiment, one end of idler support member 98 rotationally couples with a first idler pin 106 to bottom gear chassis 100 and rotationally couples with a second idler pin 106 to drive carriage 104 within top gear chassis 102. In response to vertical expansion of axles 40 apart from each other, drive carriage 104 slides along the upper axle 40 to rotate idler assembly 90 upwards from a parallel orientation of idler support member 98 to a perpendicular orientation. In the example embodiment, each axle 40 also passes through an opening of a housing cover portion 82 so that the gears are protected during movement with a sliding vertical relationship of housing cover portions 82. Biasing spring 56 biases against drive carriage 104 to bias idler assembly 90 towards a parallel orientation. Further, a magnet 108 attracts top gear chassis 102 to bias axles 40 toward the compressed position. Helical gears 88 remain engaged with idler helical gears 94 as axle distance varies while idler mesh gears 96 adjust their relative vertical positions to transfer axle 40 rotational movement at varying axle distances.

Figure 11:
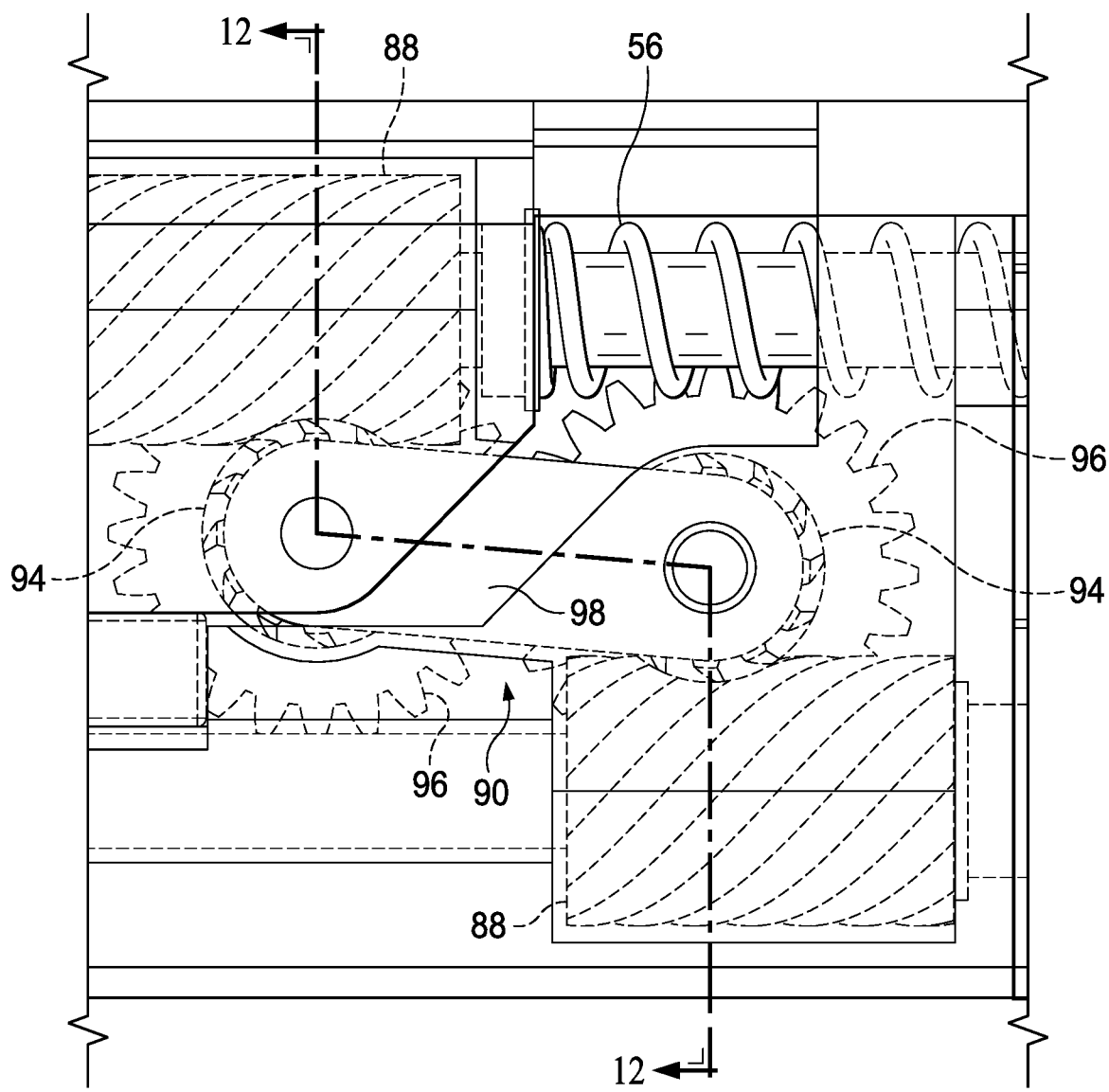
FIG. 11 depicts a side view of a hinge assembly in a compressed position with a cross sectional view indication.

Referring now to FIG. 11, a side view depicts hinge assembly 18 in a compressed position with a cross sectional view indication. In the depicted compressed position, parallel axles 40 support information handling system housing portions disposed with opposing displays in an adjacent position, such as where no objects are disposed between the displays. Each axle 40 fixedly couples to a helical gear 88 for transfer of rotational movement about the axle 40. Idler assembly 90 transfers rotational movement between helical gears 88 through first and second gear assemblies that each fixedly couple an idler helical gear 94 to an idler mesh gear 96. Each idler helical gear 94 engages with a helical gear 88 of fixedly coupled to an axle 40 so that the helical gears 94 each rotate their fixedly coupled mesh gear 96. Idler support member 98 holds mesh gears 96 in a spaced engaged relationship to transfer rotation by idler helical gears 94. Biasing spring 56 biases against rotation of idler support member 98 from the depicted orientation having idlers support member 98 substantially parallel to axles 40.

Figure 12:
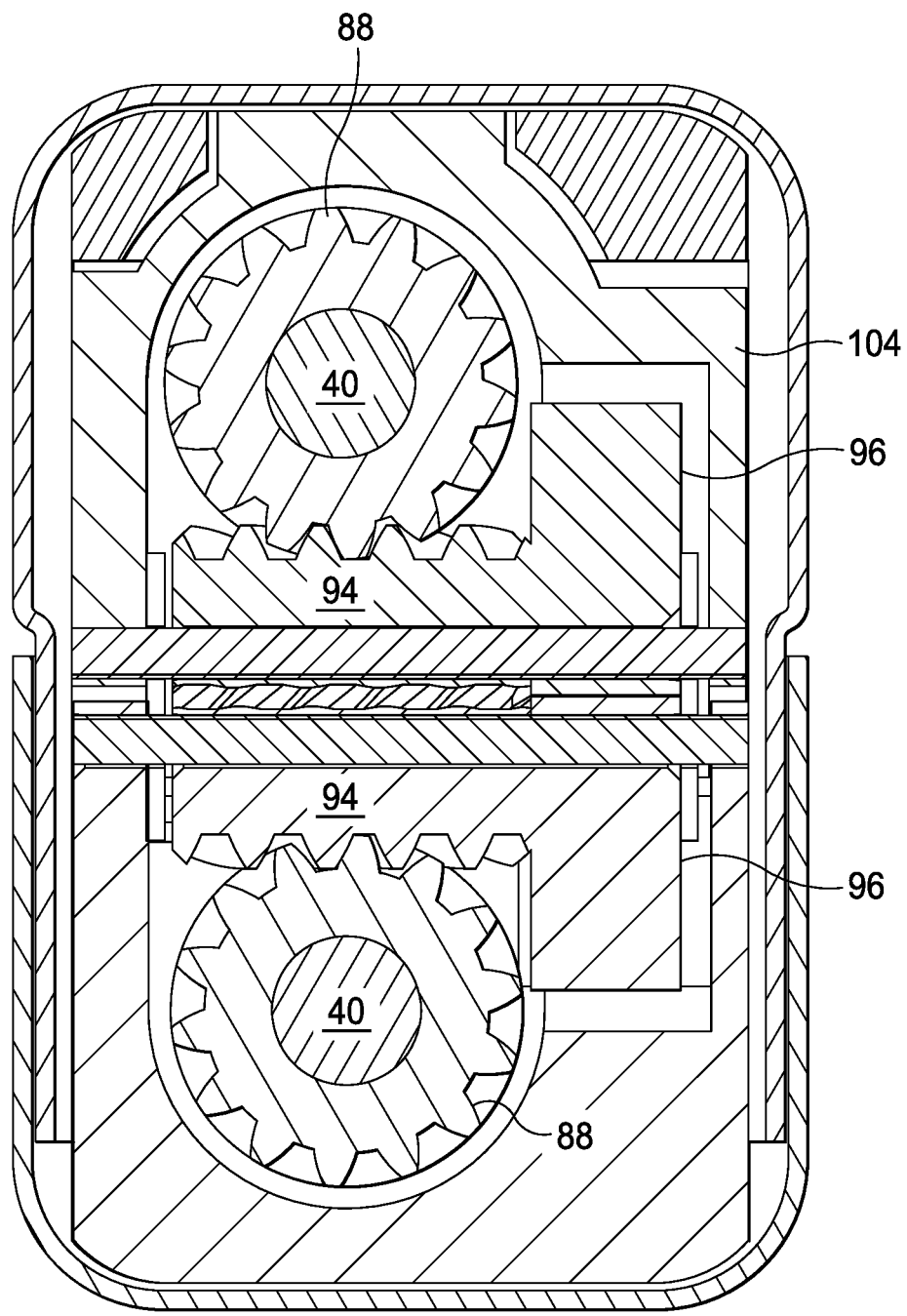
FIG. 12 depicts a cross sectional view of a hinge assembly having helical and mesh gears engaged to transfer rotation between axles in a compressed position.

Referring now to FIG. 12, a cross sectional view depicts hinge assembly 18 having helical and mesh gears engaged to transfer rotation between axles 40 in a compressed position. The cross sectional view, as taken from the cross sectional indication of FIG. 11, illustrates gear engagement to transfer rotation between axles 40. Helical gears 88 coupled to axles 40 rotate with axles 40 and engage idler helical gears 94 held in place by the idler support member. Idler helical gears 94 in turn rotate mesh gears 96 so that rotation of each axle 40 transfers through the two idler gear assemblies to each other.

Figure 13:
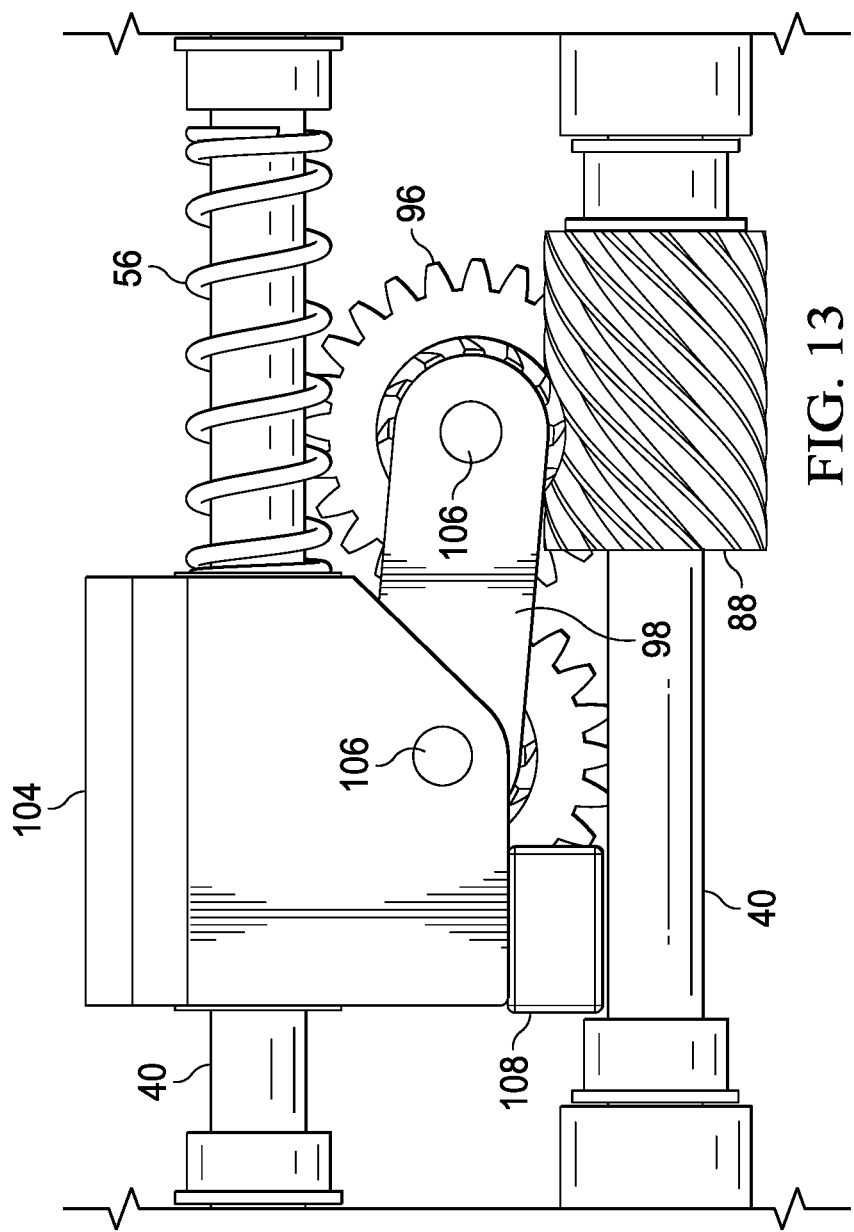
FIG. 13 depicts a side view of the hinge assembly in a compressed position illustrating a drive carriage rotationally coupled to an idler support member.

Referring now to FIG. 13, a side view depicts hinge assembly 18 in a compressed position illustrating a drive carriage 104 rotationally coupled to an idler support member 98. Drive carriage 104 rotationally couples at one end of idler support member 98 with an idler pin 106 so that a separating force operating to increase spacing between axles 40 pulls drive carriage 104 along the upper axle 40 to compress biasing spring 56. Lateral motion of drive carriage 104 along axle 40 pulls idler support member 98 upwards from the depicted parallel orientation towards a perpendicular orientation relative to axles 40 while maintaining engagement of helical gears 88 through idler helical gears 94 and idler mesh gears 96. In the depicted compressed position, drive carriage 104 is held in proximity with a magnet 108 to further bias axles 40 towards remaining in the compressed position.

Referring now to FIG. 14, a side view depicts hinge assembly 18 in an expanded position with idler assembly 90 gear assemblies transferring rotation between parallel axles 40 at an increased distance relative to the compressed position. Drive carriage 104 has slid laterally along the upper axle 40 to compress biasing spring 56 and lift the side of idler support member 98 to which it rotationally couples. Idler assembly 90 idler helical gear 94 is held engaged against the upper axle 40 helical gear 88 by idler pin 106 passing through drive carriage 104 and through the rotational axis of the idler helical gear 94. Idler support member 98 maintains engagement of mesh gears 96 so that the lower idler helical gear 94 interfaces with the lower axle 40 helical gear 88 to transfer rotation between axles 40 in the expanded configuration. Thus, synchronized axle 40 rotation is supported in the compressed and expanded configurations and during movement along range between fully compressed with idler support member 98 substantially parallel to axles 40 to fully extended with idler support member 98 substantially perpendicular to axles 40.

Figure 15:
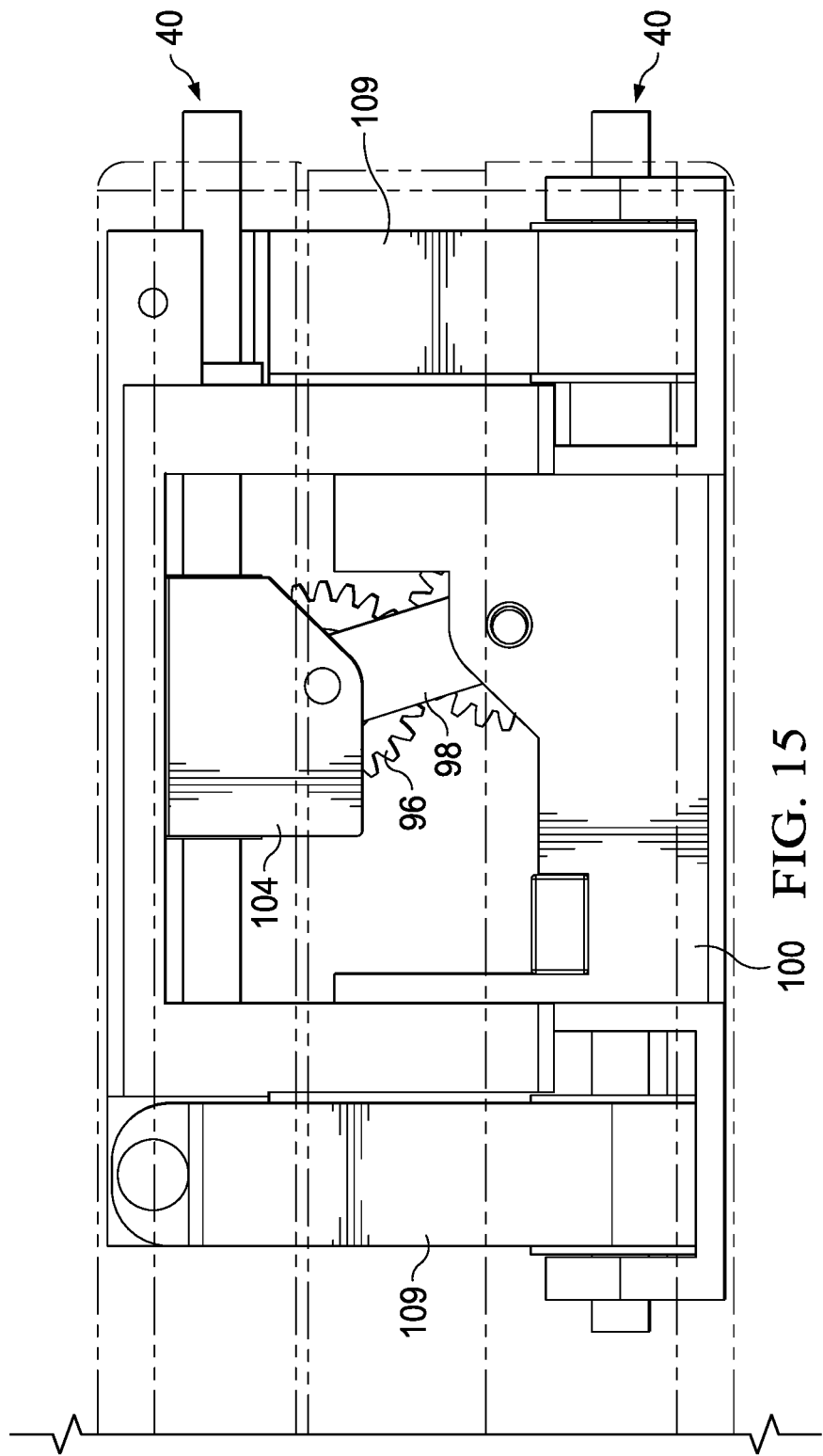
FIG. 15 depicts a side view of an alternative embodiment hinge assembly having axles biased to a compressed positions by a constant force spring.

Referring now to FIG. 15, a side view depicts an alternative embodiment hinge assembly 18 having axles biased to a compressed positions by a constant force spring 109. Constant force spring 109 has a first end coupled to a structure shared with bottom axle 40, such as bottom gear chassis 100, and an opposing end to upper axle 40 so that both axles 40 rotate freely. Constant force spring 109 generates a constant biasing force at both axles 40 towards a compressed position, which translates through idler mesh gears 96 to rotate idler support member 98 to a parallel configuration. In various embodiments, biasing force generated by constant force spring 109 may vary, such as by control provided from an embedded controller or other system management. For instance, if an information handling system detects a keyboard on a display, the embedded controller may command a reduced biasing force at constant force spring 109 so that less stress is placed against the display in the event the information handling system housing covers are rotated to a closed position over the keyboard.

Figure 16:
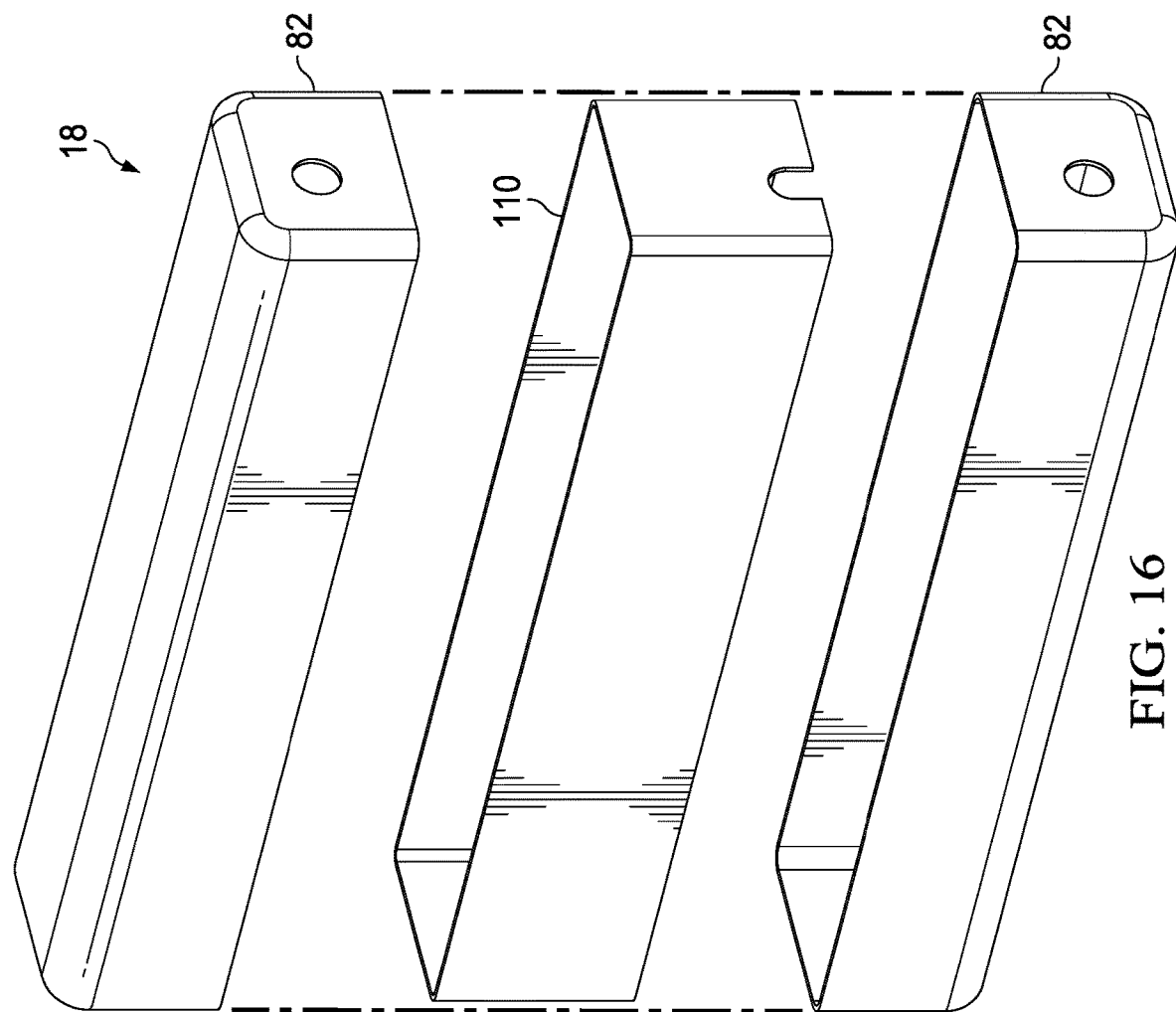
FIG. 16 depicts a sider perspective view of an alternative embodiment hinge assembly having a band cover disposed between upper and lower housing covers.

Referring now to FIG. 16, a side perspective view depicts an alternative embodiment hinge assembly 18 having a band cover 110 disposed between upper and lower housing cover portions 82. Band 110 protects the mid-range of hinge assembly 18 while avoiding a sliding overlap of housing cover portions 82 to adapt as hinge 18 moves to the compressed position. For instance, band 110 may have linkages to housing cover portions 82 that provide an impression of band 110 remaining stationary during hinge assembly 18 expansion and contraction.

Figure 17:
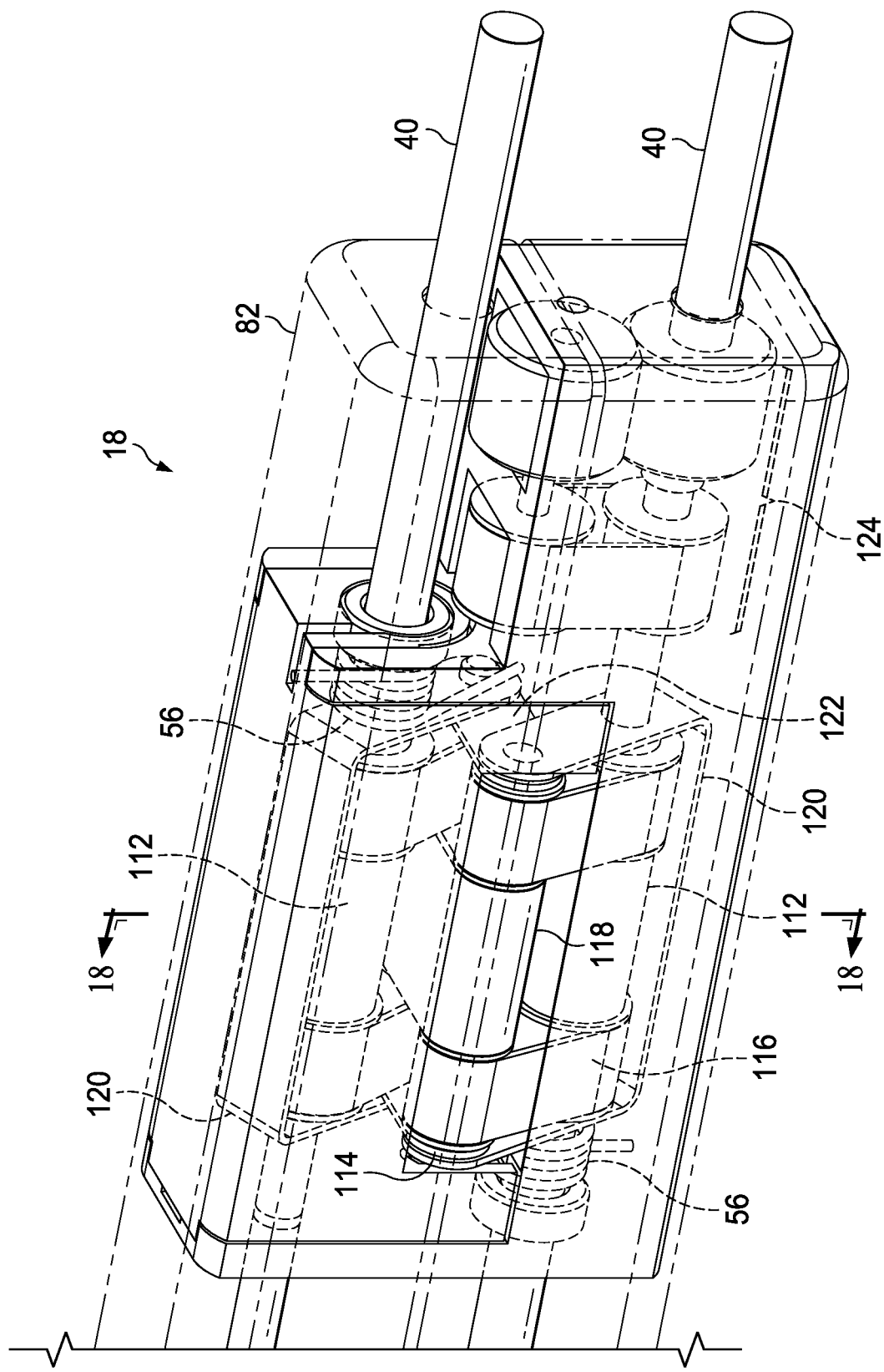
FIG. 17 depicts a side perspective view of a biased belt driven hinge assembly that synchronizes housing portion rotation at variable axle distances through translation pulleys.

Referring now to FIG. 17, a side perspective view depicts a biased belt driven hinge assembly 18 that synchronizes housing portion rotation at variable axle 40 distances through translation pulleys 114. Each axle 40 inserts through a main axle pulley 112. Main axle pulleys 112 translate rotational movement through translation pulleys 114 so that the axles 40 rotate in a synchronous manner. First and second main bands 116 rotationally couple each main axle pulley 112 to a translation pulley 114 and a translation band 118 rotationally couples the two translation pulleys 114. First and second axle supports 120 rotationally couple to each main axle 40 to hold each translation pulley 114 in a fixed parallel relationship with its associated main axle pulley 112. Translation support members 122 rotationally couple to translation pulleys 114 to hold translation pulleys 114 in a fixed parallel relationship while adjusting a vertical distance between axles 40 by adjusting the vertical relationship of translation pulleys 114. Biasing springs 56 couple at each axle 40 to bias axle supports 120 and translation support members 122 towards a compressed position that minimizes vertical distance between axles 40. A counter rotation drive 124 interfaces at one axle 40 to adapt distance between axles 40 in the event a separating force is applied to axles 40 while in a compressed position so that counter rotation can, in effect, operate to separate axles 40 from each other.

Figure 18:
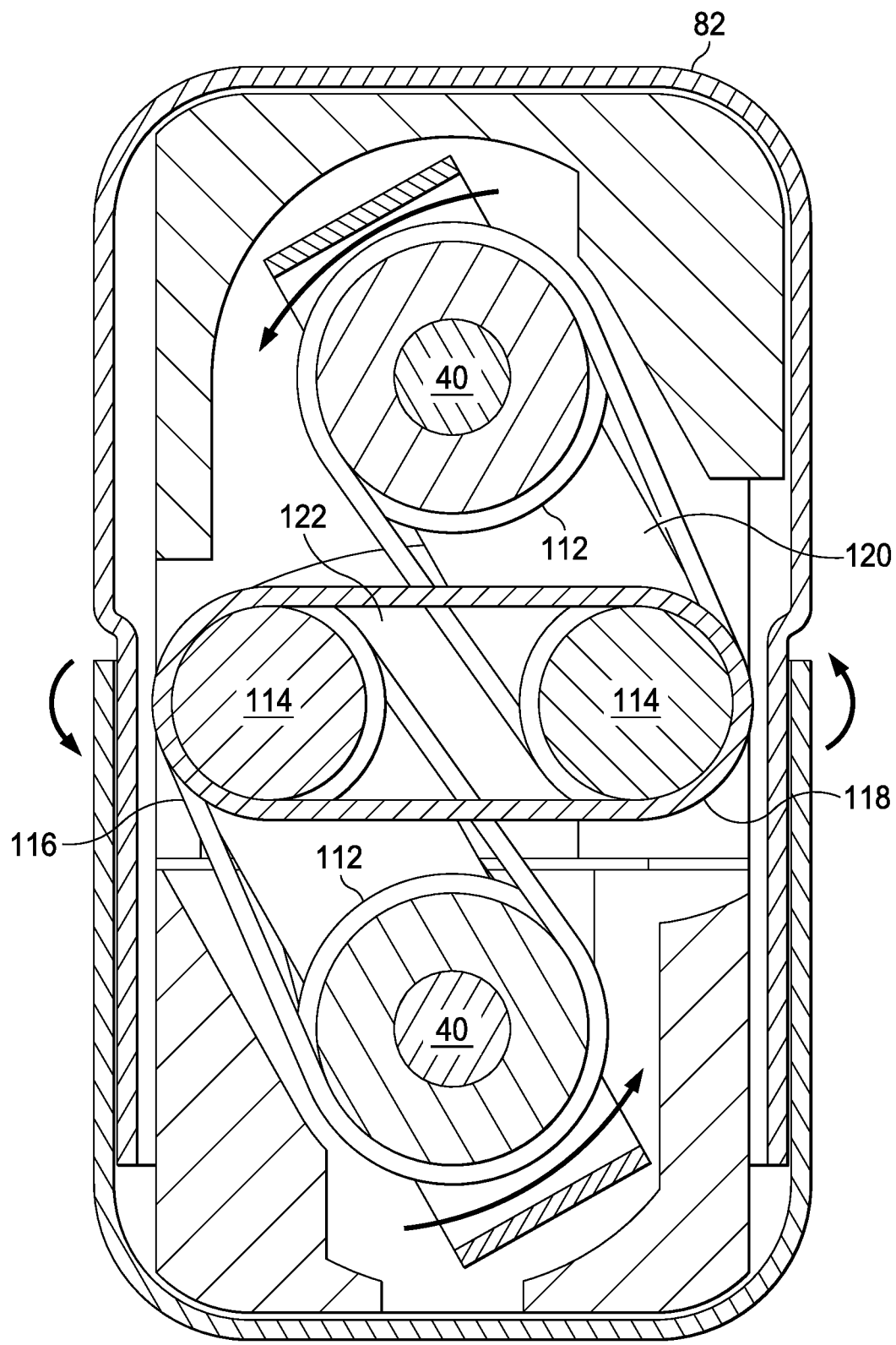
FIG. 18 depicts a side cross sectional view of an example of rotational movement translation between hinge assembly axles.

Referring now to FIG. 18, a side cross sectional view depicts an example of rotational movement translation between hinge assembly axles 40. In the example embodiment, each axle 40 fixedly couples to a main axle pulley 112 to co-rotate about an axis shared with axle supports 120. Main bands 116 translate rotation from each main axle pulley 112 to its translation pulley 114 rotationally coupled at the opposing end of each axle support 120. Translation pulleys 114 transfer rotation between each other, as indicated by the arrows, with a translation band 118. A separation force applied at axles 40 to increase the distance between axles 40 pulls translation support member 122 from a horizontal orientation between translation pulleys 114 towards a vertical orientation that maintains rotational motion transfer between axles 40. Axle supports 120 rotate about their respective axle 40 towards a vertical orientation so that the length of translation support member 122 extends between the ends of axle support 120 to increase the distance between the axles 40. Housing cover portions 82 slide apart as the distance between axles 40 increase and slide together when the distance between the axles 40 decrease.

Figure 19:
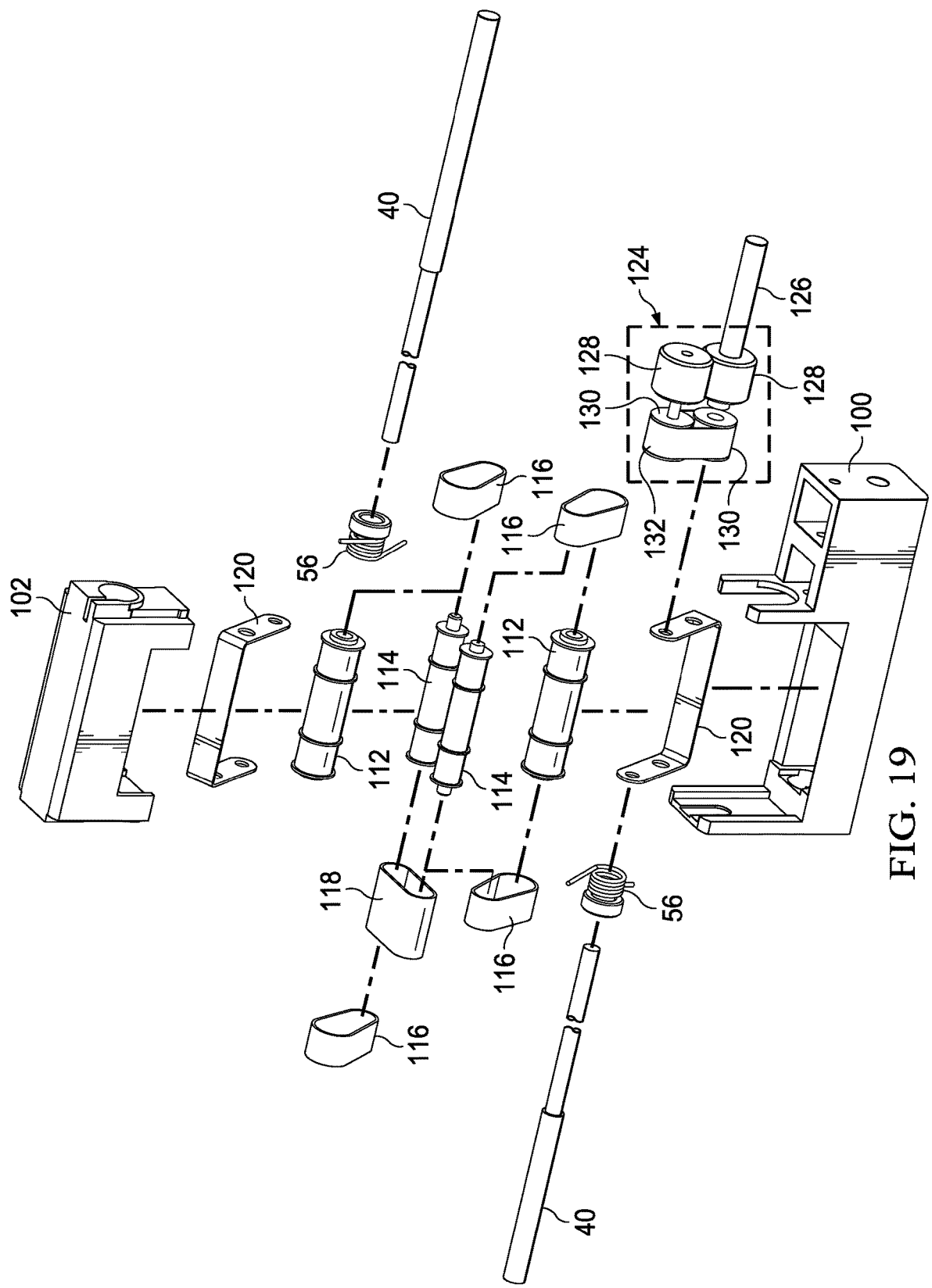
FIG. 19 depicts an exploded view of a hinge assembly having biased belt driven synchronized expanding axles.

Referring now to FIG. 19, an exploded view depicts a hinge assembly 18 having biased belt driven synchronized expanding axles. A top chassis 102 has an opening to accept top axle 40, which passes through axle support 120. Biasing spring 56 operates against top chassis 102 to press axles 40 towards each other in the compressed position. Top chassis 102 slidingly engages with bottom chassis 100 to adjust the distance between axles 40. Bottom chassis 100 has a counter rotation drive 124 axle 126 proceeding out an opening with main axle 40 coupled to the opposing side of counter rotation drive 124 to transfer rotation. Counter rotation drive 124 has first and second gears 128 that cooperate to rotate axle 126 and first and second pulleys 130 interfaced through a belt 132 to transfer motion associated with axle 126. During normal operations, rotation passes from axle 126, through gears 128 and across a minor axle to pulleys 130 and belt 132 for transfer to axle 40. In a compressed position of axles 40, rotational force applied to axle 126 translates to a counter rotation that drives axles 40 apart.

In the example embodiment, main axle pulleys 112 and translation pulleys 114 have a smooth outer surface divided into three regions, each associated with the location of engagement by main bands 116 and translation bands 118. Main bands 116 and translation bands 118 are, for instance, a resilient rubber material with a high friction to maintain consistent rotational motion transfer. Biasing springs 56 work against chassis 100 and 102 to drive axles 40 towards a compressed position. A separating force at axles 40 that overcomes the biasing to the compressed position results in an increased distance between axles 40 with an inward rotation of axle supports 120.

Figure 20:
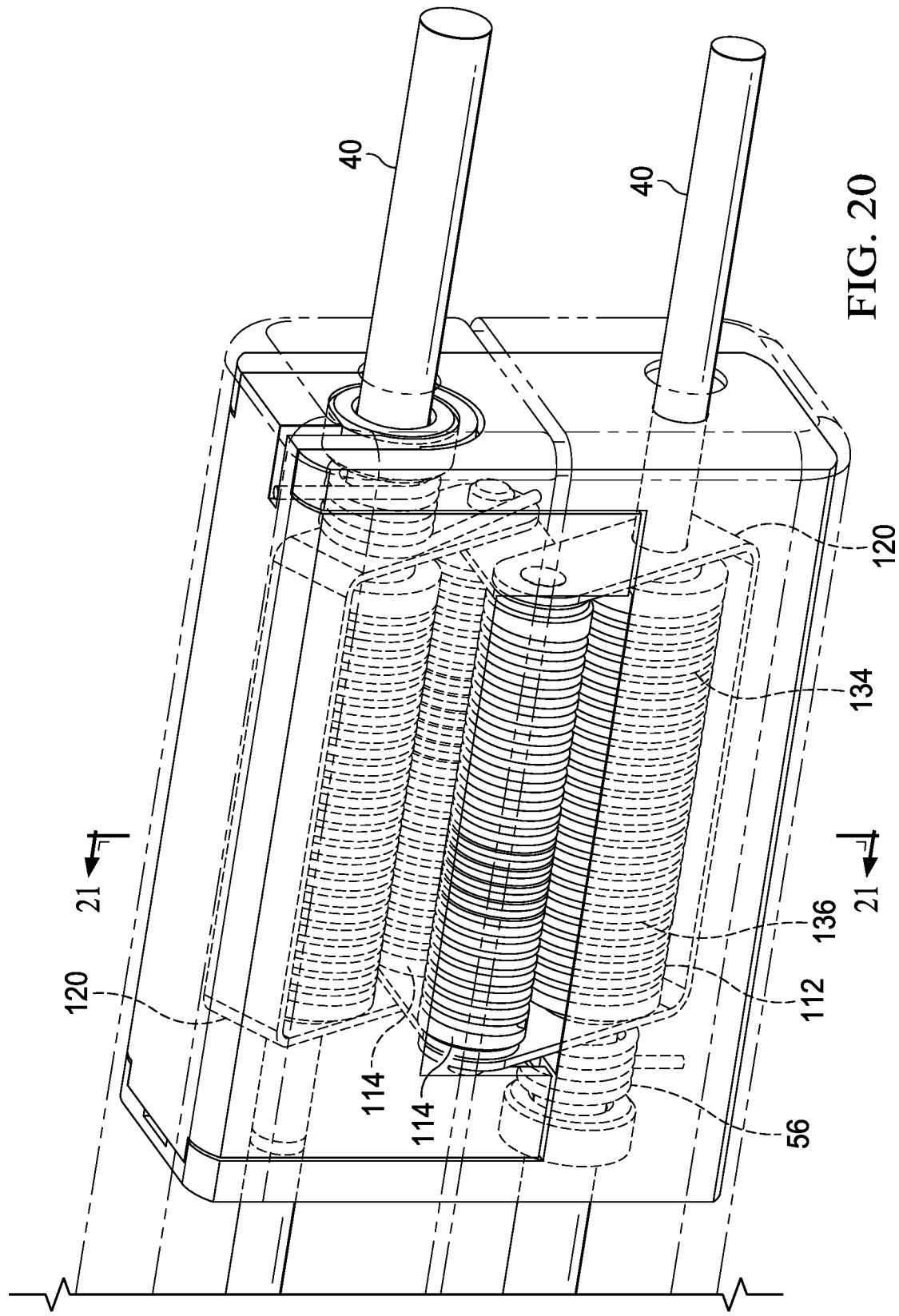
FIG. 20 depicts an alternative single belt driven hinge assembly that provides synchronous rotation of axles at variable distances.

Referring now to FIG. 20, an alternative belt driven hinge assembly 18 provides synchronous rotation of axles at variable distances. Main pulleys 112 and translation pulleys 114 integrate grooves 134 that guide a single band 136 about their circumferences. Axle support 120 and translation support members 122 maintain spacing between main pulleys 112 and translation pulleys 114 so that a separation force applied at axles 40 provides an expanded position with rotation of translation support member 122 from a horizontal towards a vertical position. As with the multiple band embodiment described above, the housing around pulleys 112 and 114 slidingly expands and contracts with axle movement. Single band 136 has multiple wraps around each pulley to provide adequate tension for transfer of rotational movement between the axles 40.

Figure 21:
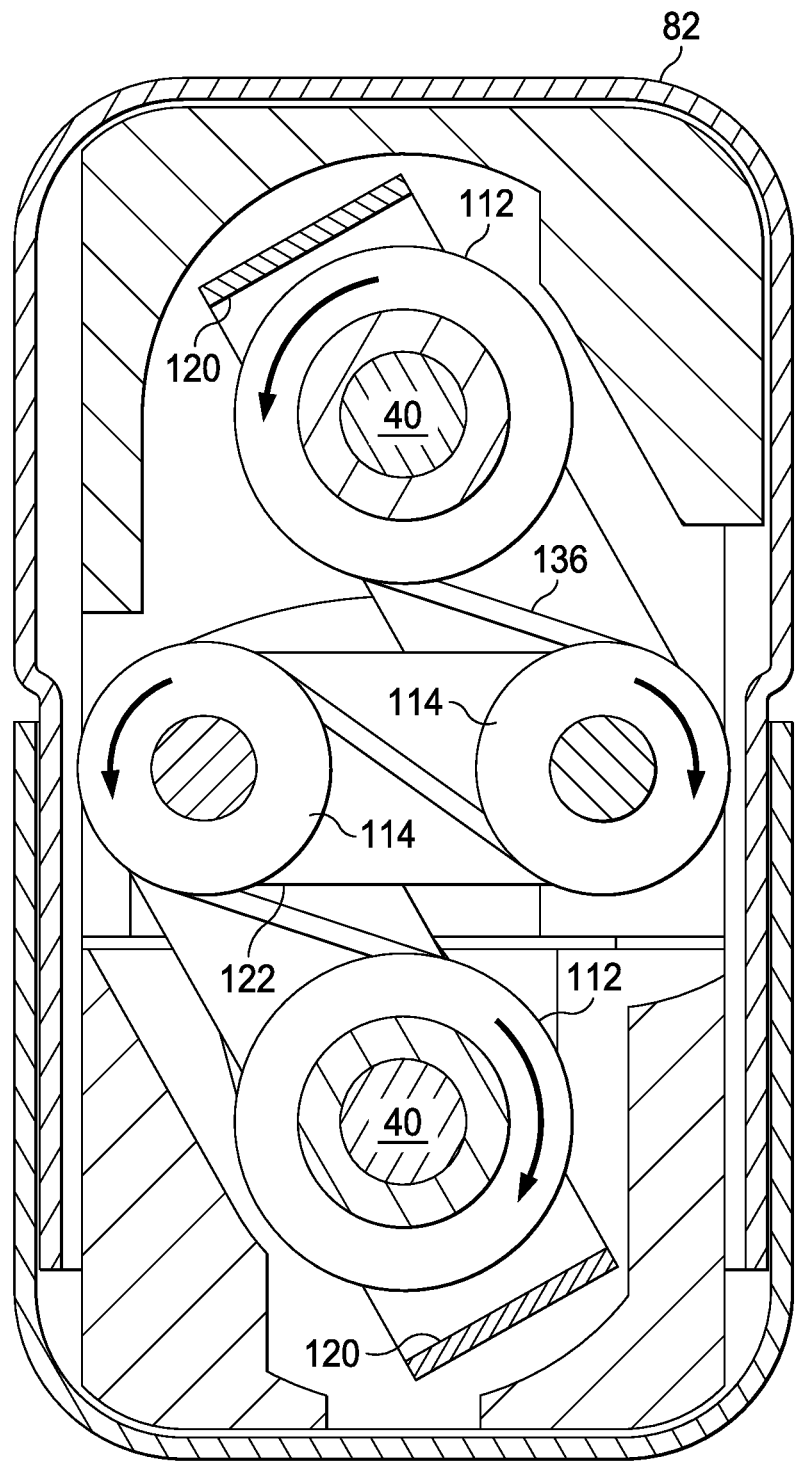
FIG. 21 depicts a side cross sectional view of the single belt driven assembly illustrating belt flow across the pulleys.

Referring now to FIG. 21, a side cross sectional view depicts the single belt driven hinge assembly 18 illustrating single band 136 flow across the pulleys 112 and 114. In the example embodiment, single band 136 has a relatively small diameter, such as a cable with a rubberized outer surface, which affixes at opposing ends in the main pulleys 112. Multiple windings around each of pulleys 112 and 114 adapt to vertical compressing and spreading of axles 40 as axle supports 120 and translation support members move vertically relative to each other.

Figure 22:
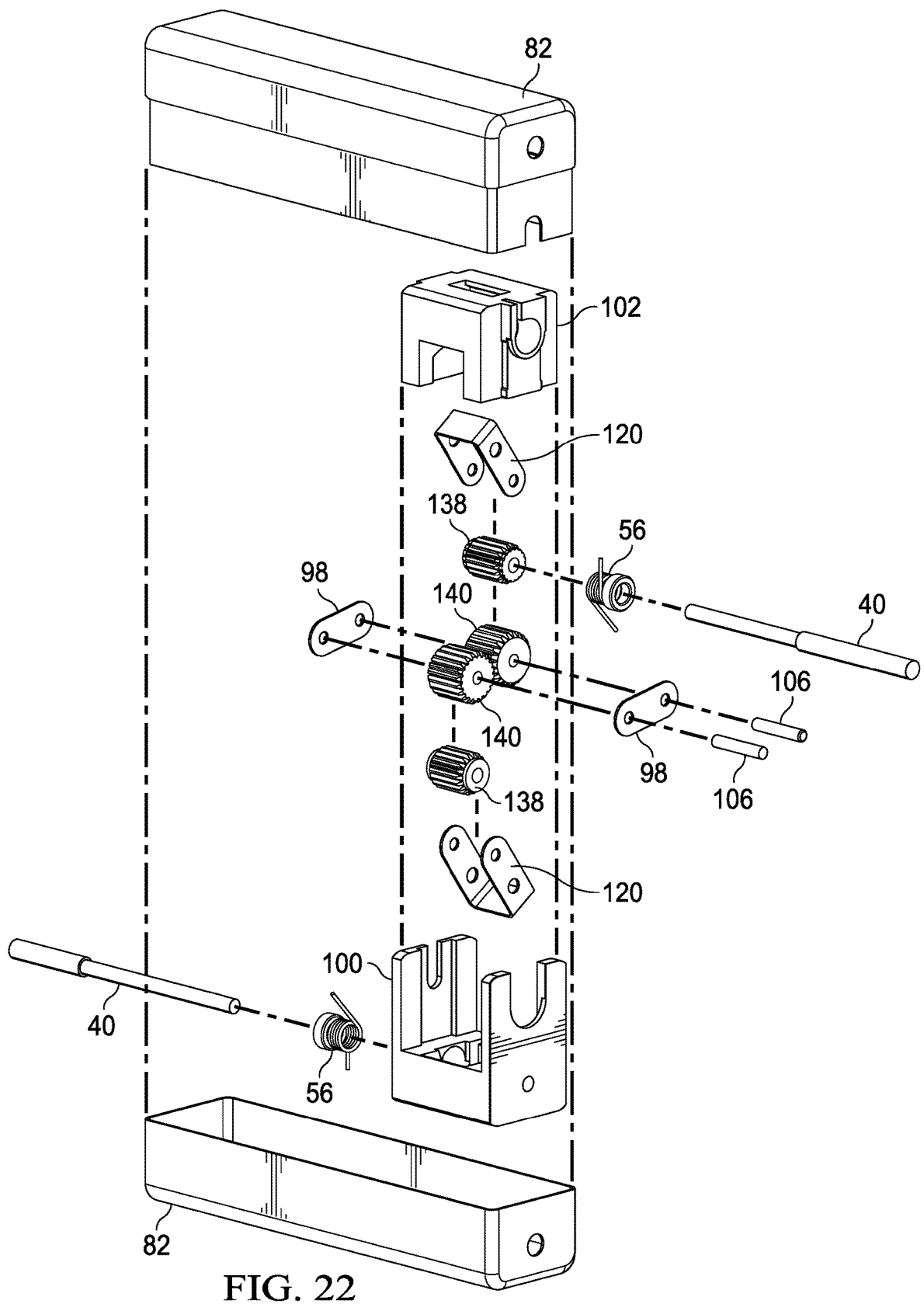
FIG. 22 depicts a side perspective exploded view of a hinge assembly having a biased idler mesh gear to expand and compress in support of vertical axle movement.

Referring now to FIG. 22, a side perspective exploded view depicts a hinge assembly having a biased idler mesh gear to expand and compress in support of vertical axle movement. As with the biased band gear assembly described above, axles 40 proceed through chassis 100 and 102 and couple internally through axle supports 120. Mesh axle gears 138 fixedly couple to each axle 40 within the axle support 120 and are held engaged with idler gear 140 by axle support 120 coupling at its end to idler gear 140 by idler pin 106. Idler support members 98 hold idler gears 140 engaged with each other so that rotation at one of the mesh axle gears 138 translates through idler gears 140 to the other mesh axle gear 138. A separating force pulling main axles 40 apart transfers through chassis 100 and 102 to rotate idler support members 98 from a horizontal to a vertical orientation with the fixed spatial relationship between mesh axle gears 138 and idler gears 140 is maintained by axle supports 120 and idler support members 98. Biasing springs 56 operate against chassis 100 and 102 to bias axles 40 towards a compressed position having idler support member 98 in a horizontal orientation. Housing cover portions 82 slidingly engage to extend and compress with axles 40 as describe above.

Figure 23A:
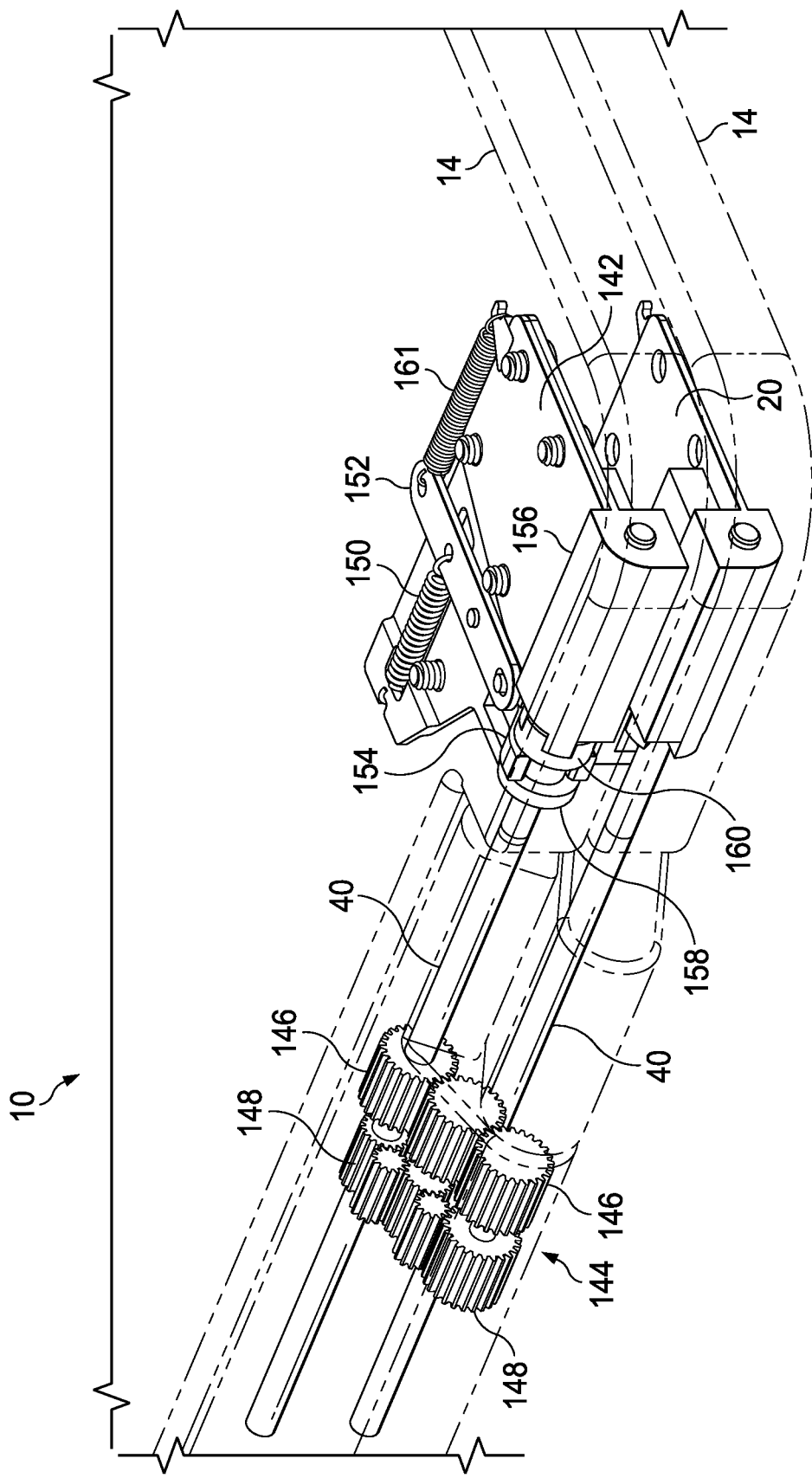
FIGS. 23A and 23B depict a hinge assembly that adapts to multiple axle distances with a clutch selection of gear assemblies having different gear ratios.
Figure 23B:
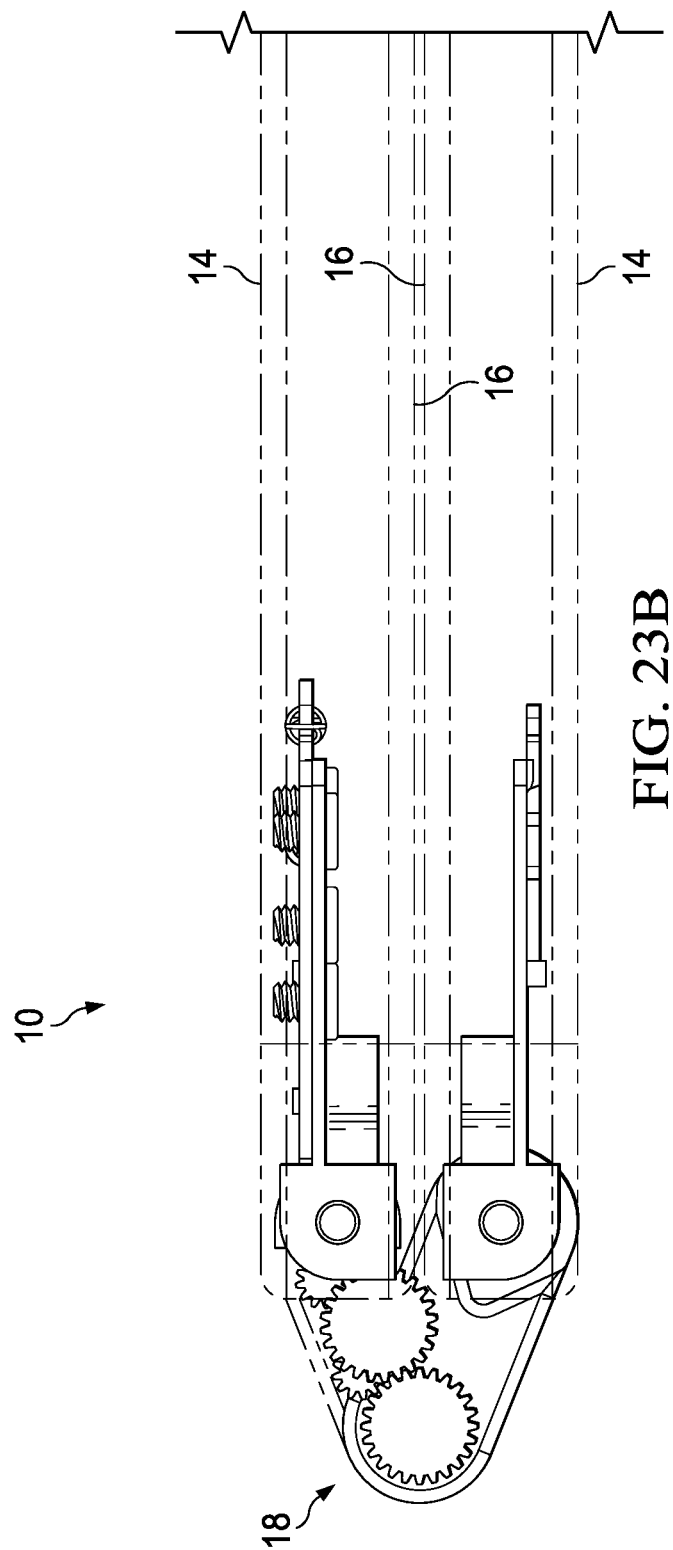

Referring now to FIGS. 23A and 23B, a hinge assembly 18 adapts to multiple axle 40 distances with a clutch 142 selection of clutch gear assembly 144 having compressed and expanded gear ratios 146 and 148. In the example embodiment, hinge assembly 18 has a compressed gear ratio 146 that provides normal dual axle 40 motion to synchronously rotate housing portions 14 from the closed position depicted by FIG. 23B for 360 degrees to a tablet position. Compressed gear ratio 146 of clutch gear assembly 144 holds housing portions 14 to have displays 16 in an adjacent position without space between them that could accommodate a keyboard disposed between housing portions 14. When clutch 142 engages the expanded gear ratio 148, the effect is to expand housing portions 14 apart from each other. Clutch 142 operates with a clutch actuator 150 and clutch release spring 160 that cooperate to pull clutch lever 152 between compressed and expanded positions. Clutch lever 152 moves a clutch fork 154 which extends or retracts axle 40 into and out of a clutch housing 156. An axle clutch adapter 158 aligns with clutch housing guides 160 to ensure that the expanded gear ratio 148 and compressed gear ratio 146 remain synchronized at desired housing positions.

Figure 24A:
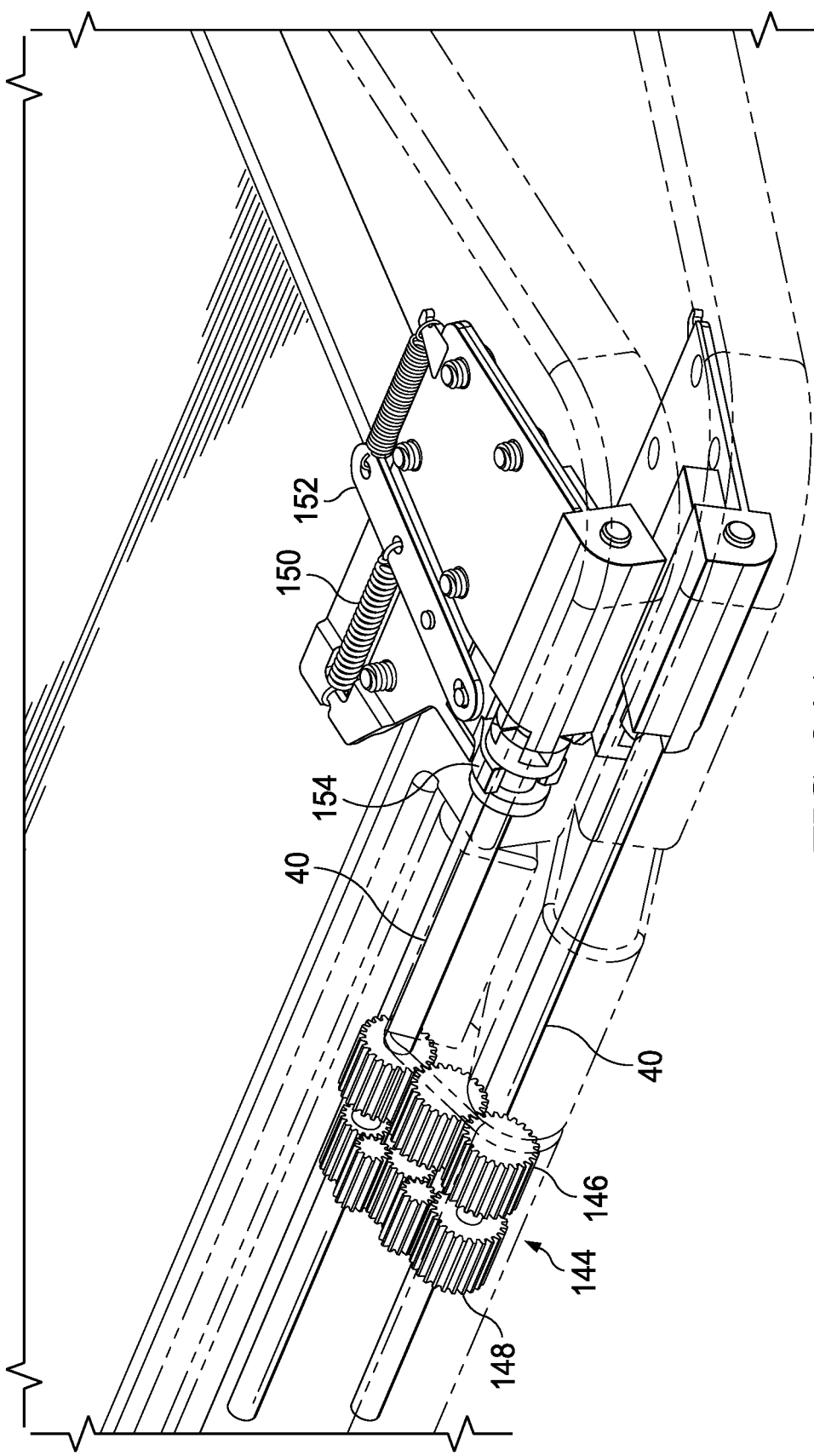
FIGS. 24A and 24B depict an example hinge assembly clutch actuation that illustrates the relationship of the clutch axle position at actuation and before transition from the compressed position to the expanded position.
Figure 24B:
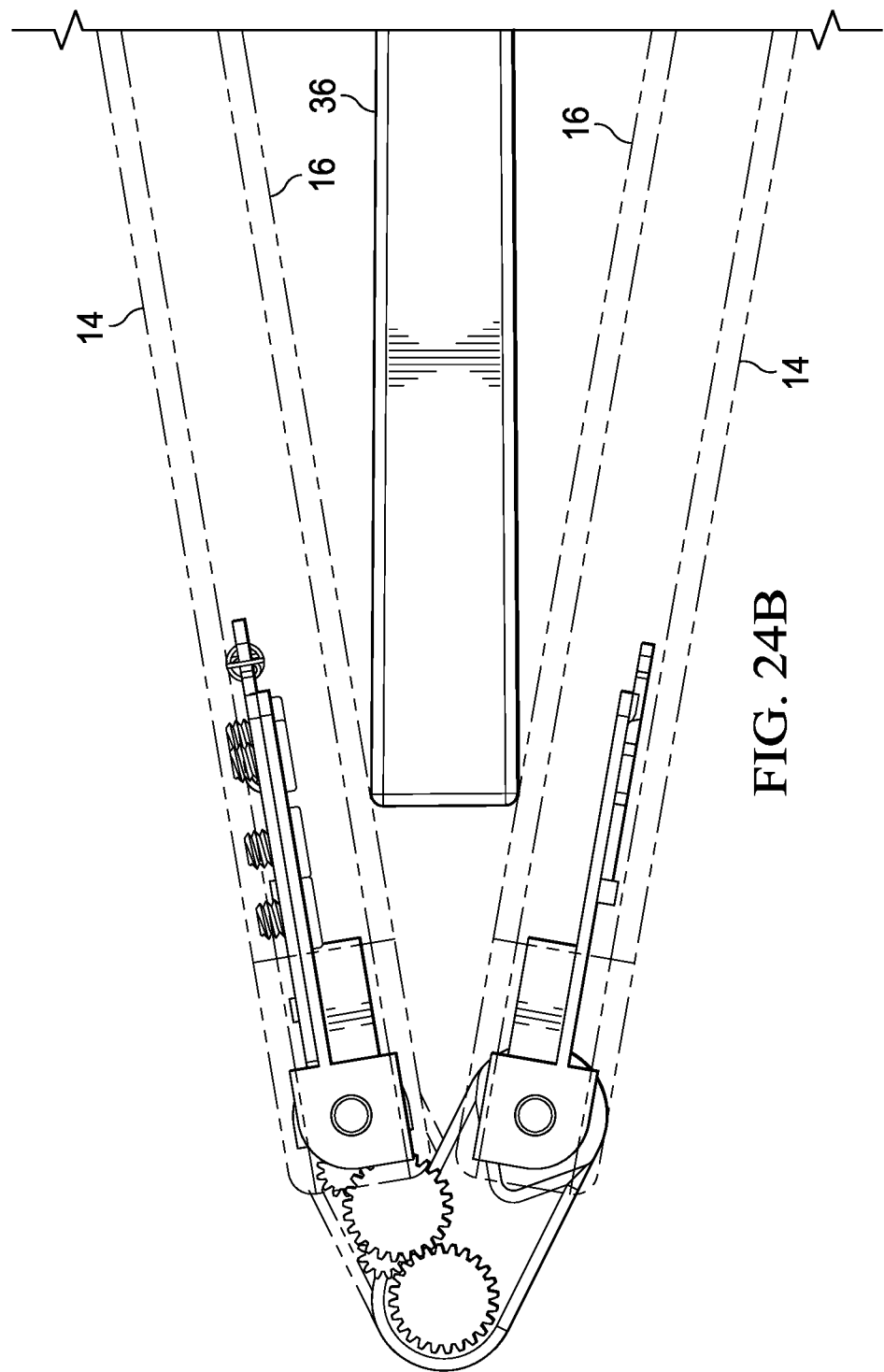

Referring now to FIGS. 24A and 24B, an example hinge assembly clutch actuation depicts the relationship of the clutch axle position at actuation and before transition from the compressed position to the expanded position. Clutch lever 152 has actuated to push clutch fork 154 towards clutch gear assembly 144 to push axle 40 out of clutch housing 156, thus engaging expanded gear ratio 148 instead of compressed gear ratio 146. FIG. 24B illustrates the position of housing portions 14 before the engagement of expanded gear ratio 148 where hinge assembly 18 holds housing portions 14 adjacent at the rotational axis. Clutch lever 152 is, for instance, pulled between extended and compressed positions by passing a current through a nickel titanium alloy spring to change phase. Alternatively, a solenoid, electromagnet or other actuator may be used. In one embodiment, clutch transition between compressed and expanded positions may be commanded by firmware executing on an embedded controller or other logic based upon detection of keyboard 36 on a display 16 and/or between housing portions 14. Alternatively, clutch 142 may automatically release from the compressed position if a predetermined force is detected upon closing of housing portions 14. Note that clutch 142 has released axle 40 to select expanded gear ration 148, however, clutch gear assembly 144 has not yet moved from compressed gear ratio 146 so that clutch gear assembly 144 remains aligned substantially in plane with housing portions 14.

Figure 25A:
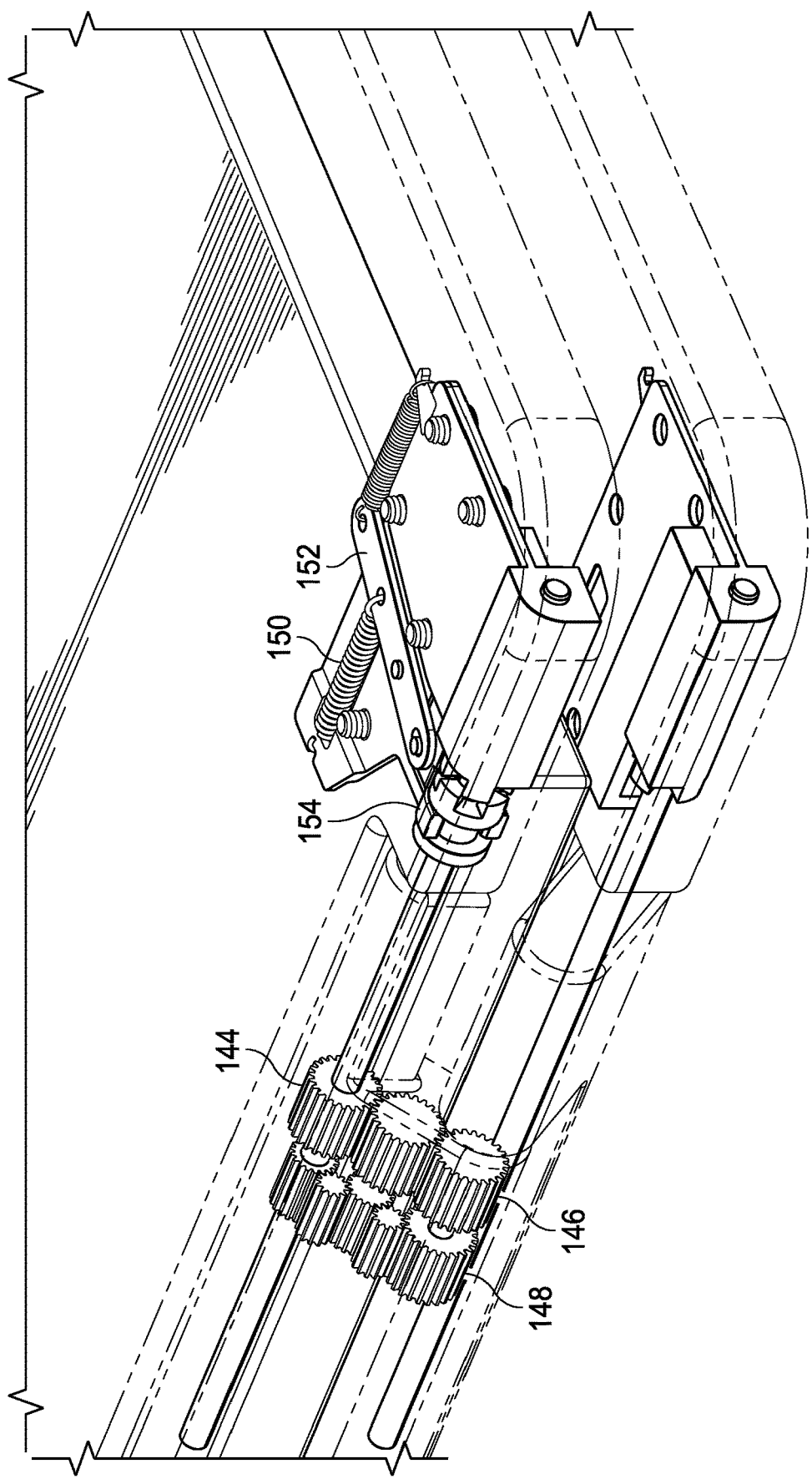
FIGS. 25A and 25B depict an example hinge assembly clutch actuation that illustrates the relationship of the clutch axle position after actuation and transition to the expanded position.
Figure 25B:
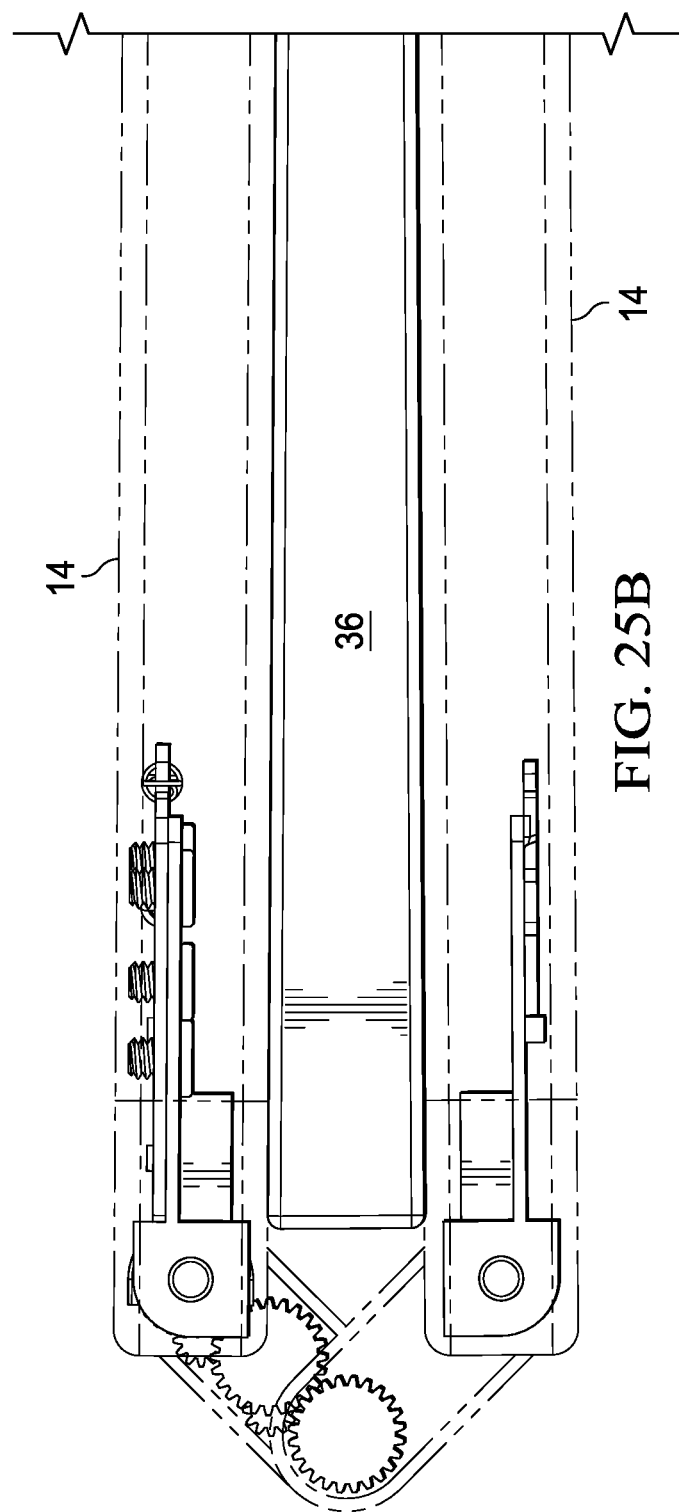

Referring now to FIGS. 25A and 25B, an example hinge assembly 18 clutch actuation depicts the relationship of the clutch axle 40 position after actuation and transition to the expanded position. Expanded hinge ratio 148 adjusts the synchronous motion of axles 40 so that housing portions 14 reach a parallel orientation in a spaced relationship rather than when adjacent to each other. As illustrated by FIG. 25B, the expanded position provides space between housing portions 14 to hold keyboard 36. Clutch gear assembly 144 in the expanded gear ratio 148 shifts to a more vertical disposition when closed over keyboard 36. If keyboard 36 were removed and housing portions 14 pushed together, clutch gear assembly 144 would shift to the more horizontal disposition show by FIG. 24A. In the depicted example position, axle clutch adapter 158 is out of alignment with clutch housing guides 160 as the axle 40 has not fully rotated due to the different gear ratio that is engaged. Beveled edges formed between clutch housing guides 160 and axle clutch adapter 158 may be used to help guide axle 40 back into position for the compressed gear ratio 146. In the example embodiment, clutch housing guide 160 may force alignment in a fully closed, fully open or flat tablet housing position if a clutch actuation is attempted.

Figure 26:
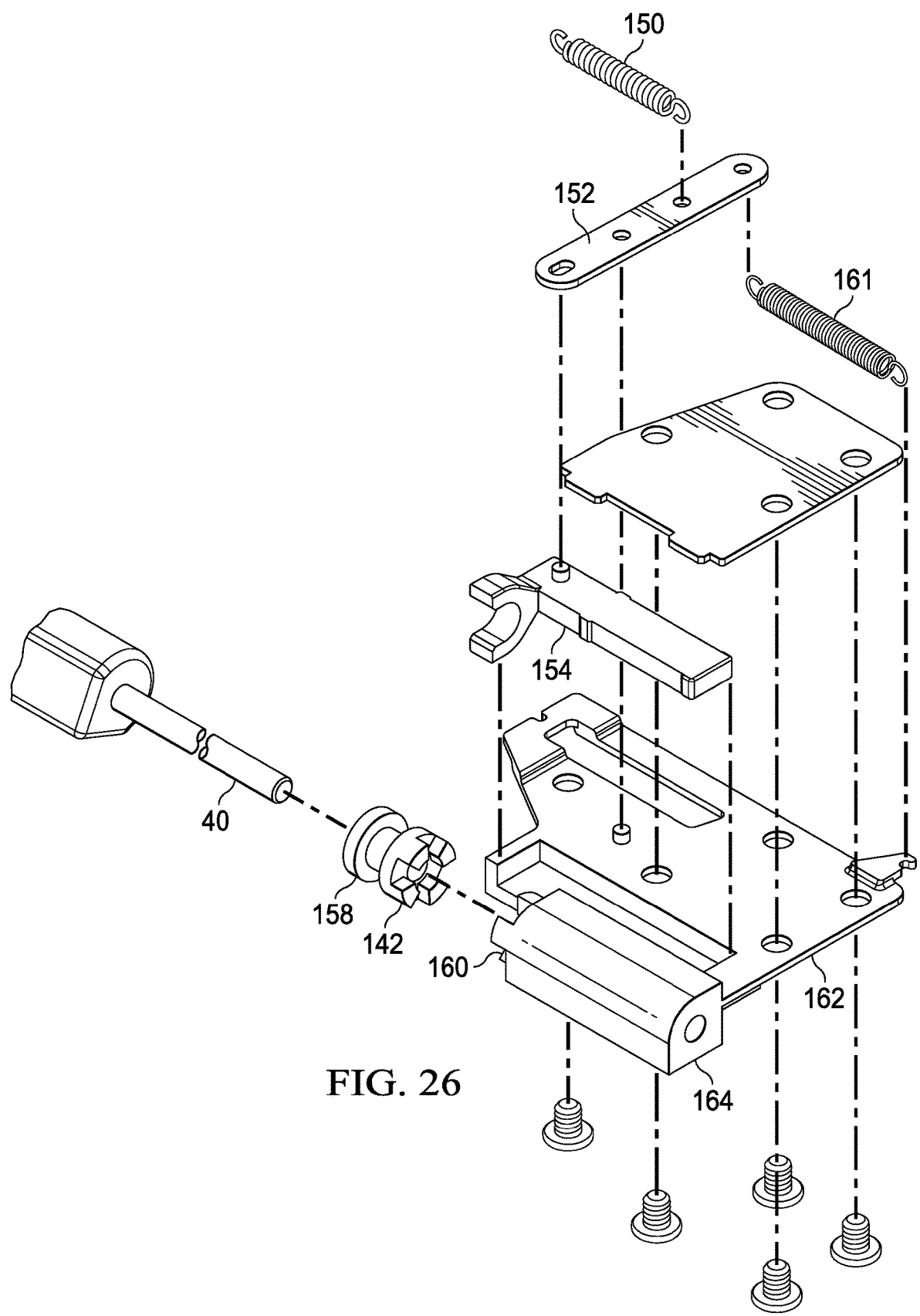
FIG. 26 depicts an exploded upper perspective view of one example embodiment of a clutch that changes gear ratios at a hinge assembly.

Referring now to FIG. 26, an exploded upper perspective view depicts one example embodiment of a clutch that changes gear ratios at a hinge assembly. Axle 40 inserts into clutch housing 156 and fixedly couples to axle clutch adapter 158, which interacts with clutch fork 154. Top plate 162 couples over top of bracket 20 to hold clutch fork 154 in place. Actuator and release springs 150 and 161 couple to clutch lever 152 and bracket 20 to selectively move lever 152 between the compressed gear ratio and expanded gear ratio positions. In the example embodiment, axle 40 slides laterally in response to clutch fork 154 movement of axle clutch adapter 158 so that a gear fixed on axle 40 moves from engagement with a compressed gear ratio to an expanded gear ratio that interfaces the parallel axle 40. In the example embodiment, transition between gear ratios generally is limited to housing portion 14 configurations where the gears match positions between the gear ratios, such as at zero, 180 and 360 degrees of rotation. In alternative embodiments, clutch 142 may adjust other aspects of the gear interactions that allow changes at other housing orientations, such as by having clutch 142 change the idler gear size between two main axle gears that remain stationary.

Figure 27:
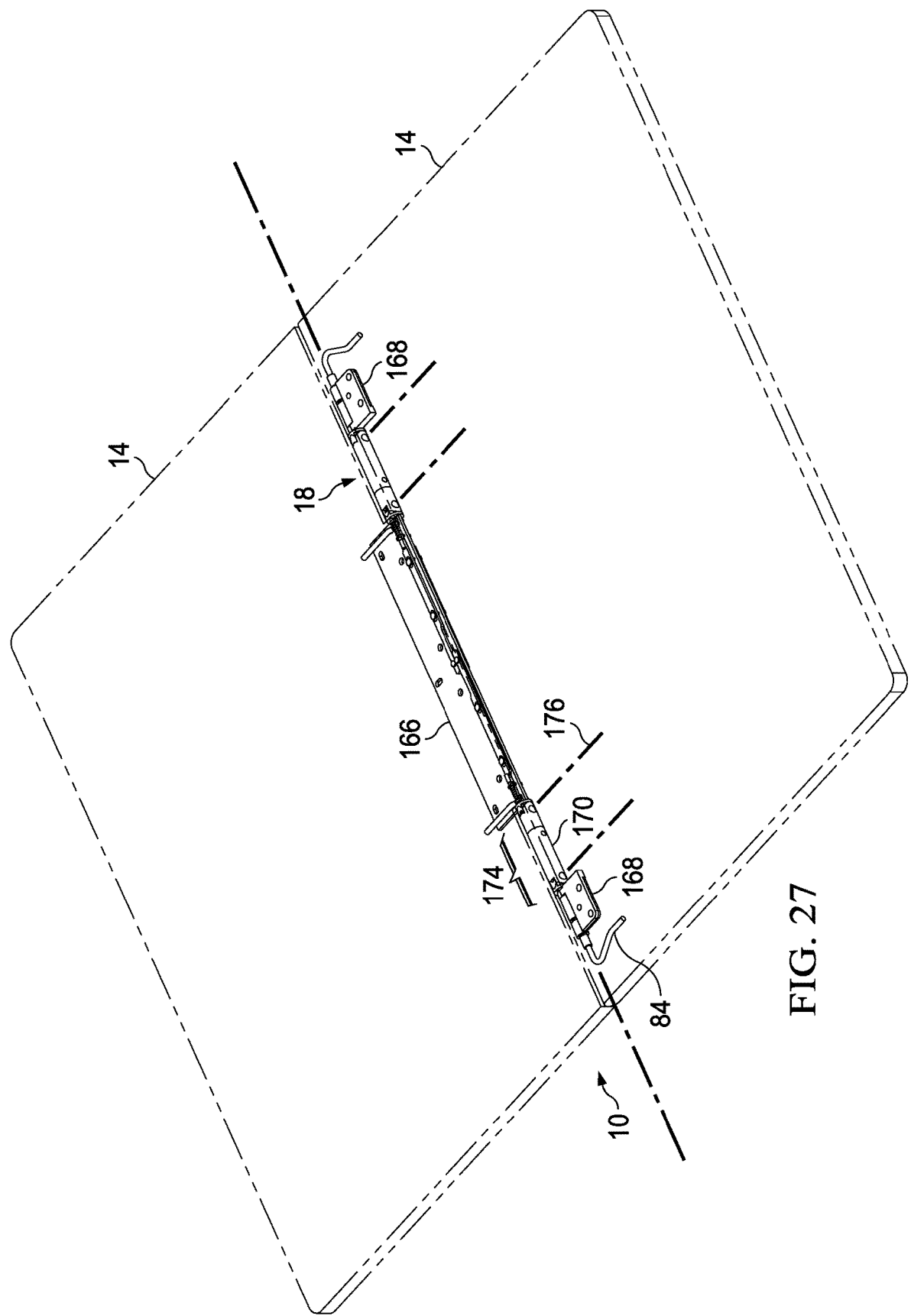
FIG. 27 depicts an upper perspective view of a portable information handling system in a flat tablet configuration having a single axle hinge assembly that adjusts housing portions to have variable distance between each other.

Referring now to FIG. 27, an upper perspective view depicts a portable information handling system 10 in a flat tablet configuration having a single axis hinge assembly 18 that adjusts housing portions 14 to have variable distance between each other. Hinge assembly 18 couples to one housing portion 14 with a main bracket 166 and to the other housing portion 14 with first and second secondary brackets 168 coupled at opposing ends of main bracket 166. First and second telescoping members 170 rotationally couple main bracket 166 at opposing ends to secondary brackets 168. A main axis 172 is defined along the length of main bracket 166 and, in the flat tablet configuration as depicted, a telescoping axis 174 and minor axis 176 are aligned collinear with main axis 172. Power and information pass between housing portions 14 through a cable 84 that extends through an opening form through secondary bracket 168 and telescoping member 170. In the flat tablet configuration as depicted, single axis hinge assembly 18 occupies the volume of a conventional single axis hinge but includes three rotational joints and one sliding joint that adjust housing portion 14 position to support rotation in a manner similar to that of a dual axis hinge. More specifically, as housing portions rotate from the flat configuration to a closed configuration, telescoping axis 174 extends secondary brackets 168 to rotate about minor axis 176 displaced off main axis 172.

Referring now to FIGS. 28A, 28B and 28C, portable information handling system 10 is depicted having the single axle hinge assembly 18 in a closed configuration with a spread housing position between the housing portions 14. Main axis 172 is defined at the housing portion 14 having main bracket 166 while telescoping members 170 extend up at an angle to secondary brackets 168, which rotate about minor axis 176. In the example embodiment, hinge assembly 18 separates housing portions 14 by an amount sufficient to accept a keyboard between housing portions 14. The additional space illustrates how single axis hinge assembly 18 provides spare room as needed between housing portions 14; however, as is set forth in greater detail below, biasing integrated in hinge assembly 18 works to bring housing portions 14 adjacent to each other. From the side view depicted by FIG. 28C, the effective change in distance between the main axis and minor axis illustrates the single axis approach adapting to motion of housing portions 14 through 360 degrees of rotation.

Referring now to FIG. 29, a rear perspective cutaway view of information handling system 10 depicts adaptation of hinge assembly 18 to varying distances as needed during closing of housing portions 14. Both telescoping members 170 have synchronously rotated relative to main bracket 166 to raise secondary brackets 168 for alignment with minor axis 176. The relative vertical movement provided by telescoping members 170 adapts the position of minor axis 176 relative to main axis 172 so that housing portions 14 rotate without interfering with each other. As the distance between main axis 172 and minor axis 176 changes, the length of telescoping member 170 adapts, allowing secondary bracket 168 to pivot at the end about minor axis 176.

Referring now to FIG. 30, a side view depicts single axis hinge assembly 18 having the secondary brackets 168 offset to a minor axis 176 of rotation. Telescoping member 170 rotationally couples at opposing ends to main bracket 166 and secondary bracket 168 at pivots 186 so that secondary bracket 168 is held parallel and off-axis with main bracket 166. Telescoping member 170 has a first element 178 that sliding inserts into a second element 180 to change its length as the off-axis distance between main axis 172 and minor axis 176 changes. Motion of telescoping members 170 at pivot 186 to main bracket 166 is synchronized by a push rod and biasing device, while motion about pivot 186 at secondary bracket 168 is synchronized by a cam. The push rod synchronization passes across opposing sides of main bracket 166 through opposing linkages. A first linkage 182 couples to an upper side of a first telescoping member 170 with a first push rod 192 that works against a second linkage 184 coupled to a lower side of main bracket 166 and a second push rod 192. Similarly, linkages 188 and 190 work in opposing directions through third and fourth push rods 192. As a result, if one of the telescoping members 170 rotates at a pivot 186 to main bracket 166, then the other telescoping member 170 is motivated to rotate about its pivot 186 in a synchronous manner.

Referring now to FIG. 31, an upper perspective view of the single axis hinge assembly 18 depicts synchronized translation of telescoping member rotation. A biasing spring 56 is disposed around each push rod 192 to bias telescoping members 170 towards a collinear orientation with main bracket 166. Linkages 182 and 184 couple with a first pin 194 that slides laterally in main bracket 166. Similarly, linkages 188 and 190 couple with a second pin 194 that slides laterally in main bracket 166. Rotational movement about pivots 186 thus work against a bias towards a collinear orientation and transfer through the linkages across main bracket 166 to the telescoping member at the opposing end.

Figure 32B:
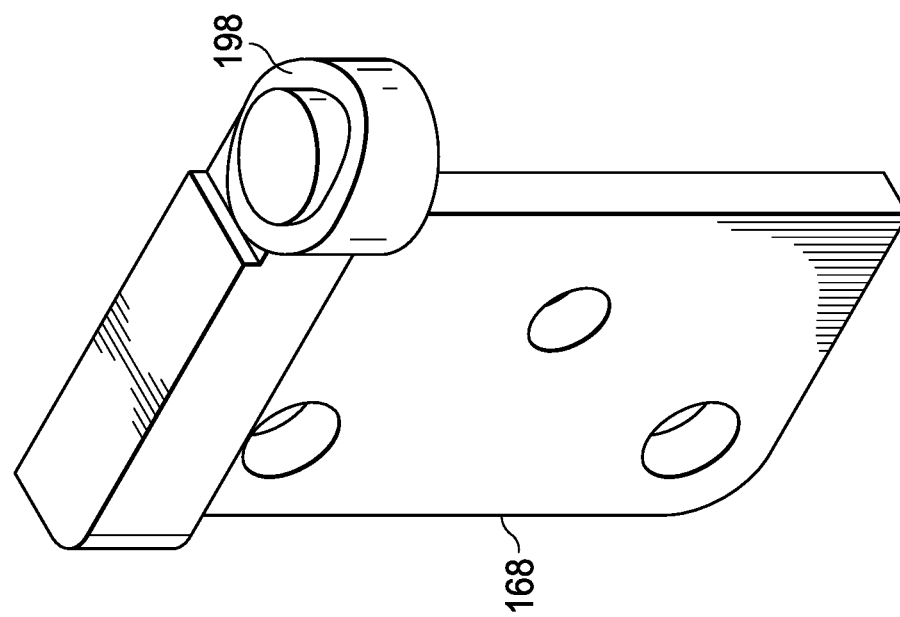
Figure 32A:
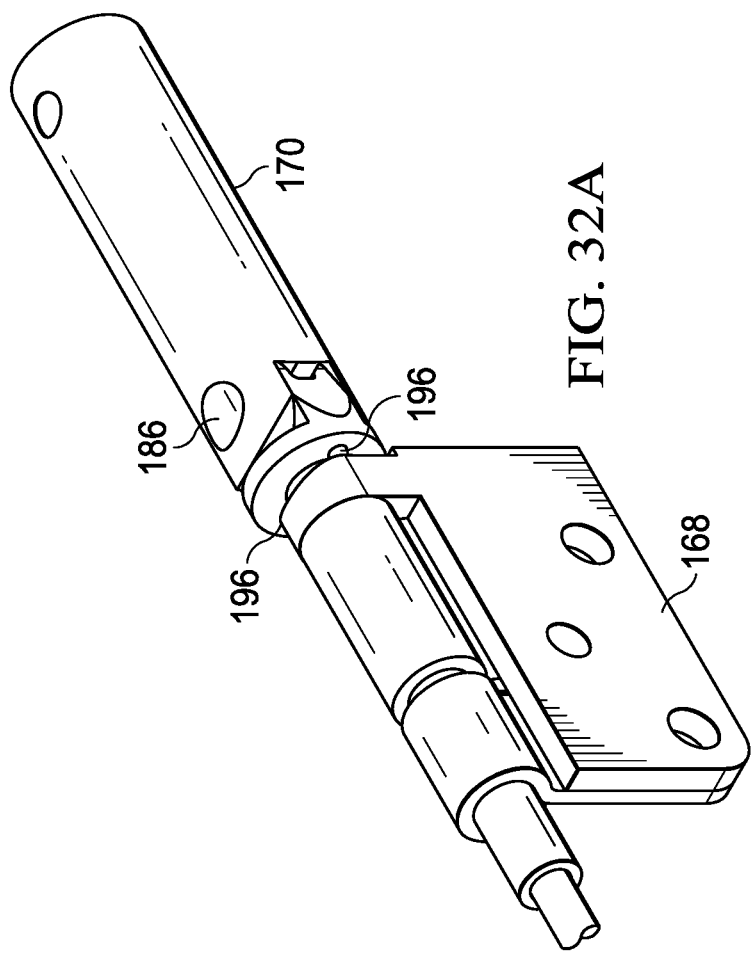

Referring now to FIGS. 32A, 32B, and 32C, upper perspective views depict the single axis hinge assembly 18 secondary bracket 168 synchronized translation of rotation through the telescoping member 170. FIG. 32A depicts secondary bracket 168 rotating about an axis defined by rotation at pivot 186, which aligns with minor axis 176. To achieve alignment of secondary bracket 168 with minor axis 176, a cam surface 198, shown by FIG. 32B, works against push rods 196 extending out of telescoping member 170. As rotation occurs about main axis 172, cam surface 198 moves push rods 196 to force rotation of the minor axis 176. In one example embodiment, cam surface 198 has a flat portion, such as between 90 and 270 degrees of housing portion rotation, which does not move push rods 196 so that housing portions 14 remain in close proximity through that rotation range. During housing portion 14 rotation of 0-90 and 270-360 degrees of rotation, cam surface 198 works against push rods 196 to force minor axis 176 to rotate as needed to allow housing portions 14 room to move without interference. In addition, cam surface 198 allows a lift off so that additional minor axis 176 rotation can accommodate an increased spacing between housing portions 14, such as to allow closing of housing portions 14 over a keyboard. Cam surface 198 forces rotation of minor axis 176 to minimize wear between housing portions 14, which would otherwise work against each other, and to allow a sharper housing edge at hinge assembly 18 that reduces spacing between displays of opposing housing portions with the housing in a flat tablet configuration.

Figure 33:
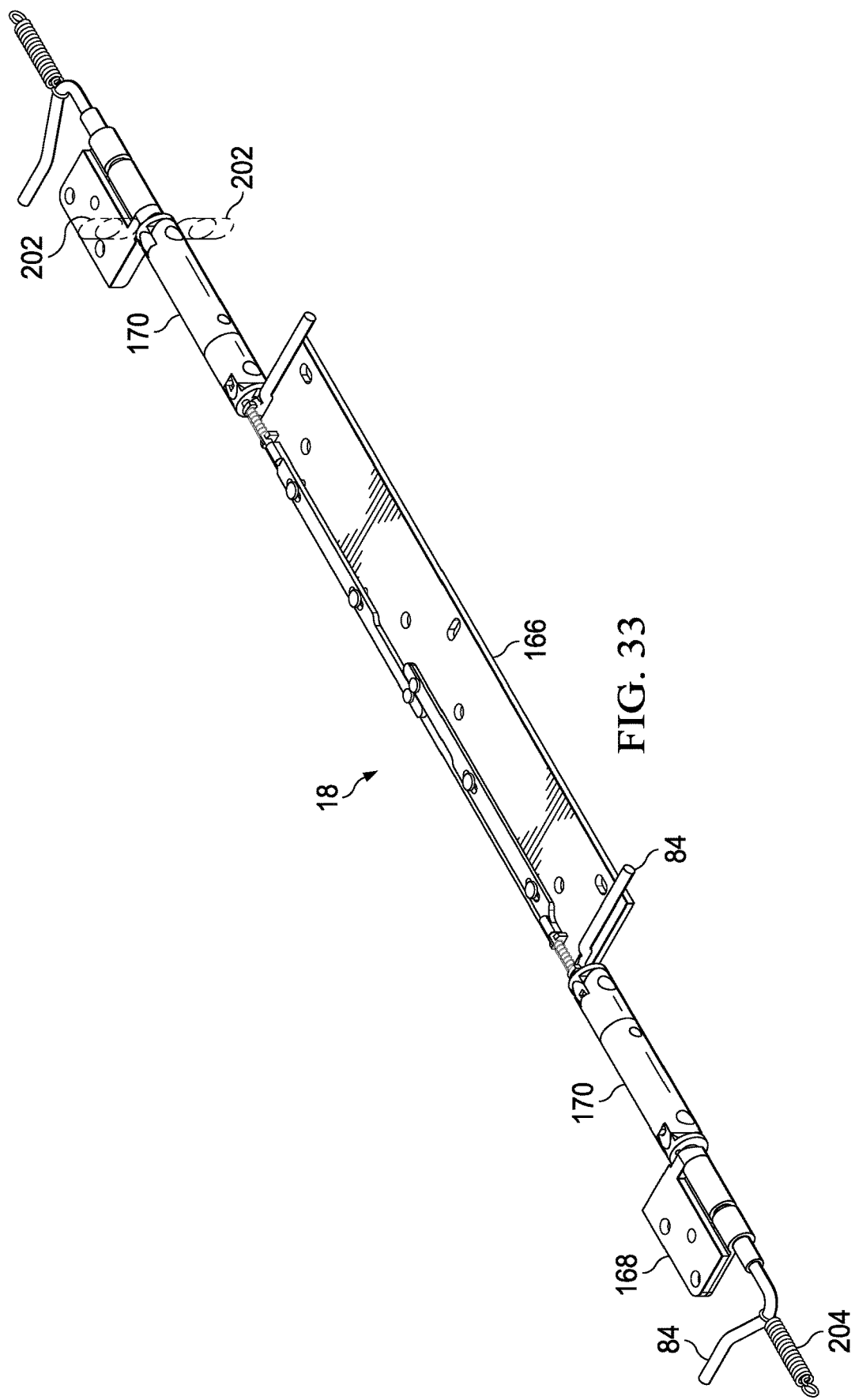
FIG. 33 depicts an upper perspective view of an example of cable routing through the single axis hinge assembly.

Referring now to FIG. 33, an upper perspective view depicts an example of cable 84 routing through the single axis hinge assembly 18. In the example embodiment, a biasing device 204, such as a spring, maintains tension on cable 84 passing through a central opening of telescoping member 170 and secondary bracket 168. As telescoping member 170 pivots to move the minor axis about which secondary bracket 168 rotates, biasing device 204 maintains sufficient tension on cable 84 to prevent bunching and to encourage cable 84 to slide within the opening.

Figure 34:
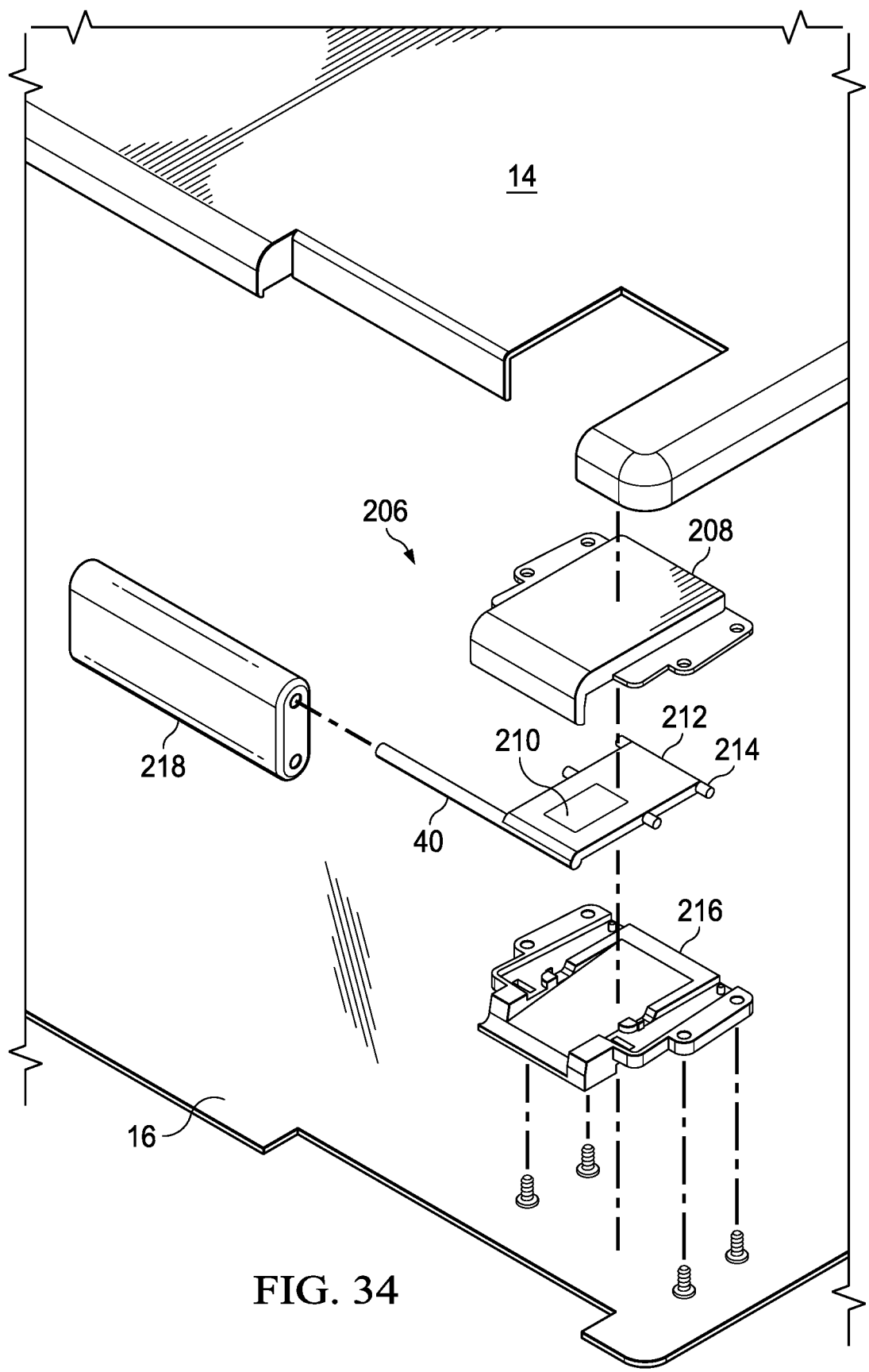
FIG. 34 depicts a side perspective exploded view of a breakaway bracket hinge assembly that adjusts housing portion spacing of an information handling system.

Referring now to FIG. 34, a side perspective exploded view depicts a breakaway bracket 206 hinge assembly 18 that adjusts housing portion 14 spacing of an information handling system 10. In the example embodiment, breakaway bracket 206 offers a traditional 360 degree hinge assembly that supports a convertible housing configuration and that separates to convert between adjacent and separated spacing between housing portions 14 if an object is placed between the housing portions. Breakaway bracket 206 captures an axle plate 212 between an upper hinge bracket 208 and a bottom hinge bracket 216, such as with screws that couple to housing portion 14. Axle plate 212 extends an axle 40 from one end that couples to a hinge knuckle 218 and a hinge barrel 214 that defines a rotational axis within bottom bracket 216 and upper bracket 208. In a compressed configuration that holds housing portions 14 and integrated displays 16 adjacent to each other, a bi-stable magnet 210 attracts axle plate 212 against upper hinge bracket 208 with a pivot about a rotational axis defined at hinge barrel 214. Bottom bracket 216 biases axle plate 212 to remain rotated upwards and against upper bracket 208. However, with a sufficient separating force applied from axle 40, axle plate 212 breaks away from upper bracket 208 and towards bottom hinge bracket 216 by rotating about an axis defined at hinge barrel 214. Movement by axle plate 212 towards bottom hinge bracket 216 creates additional space at hinge knuckle 218 to separate the housing portions apart from each other. Once the separation force is removed, magnet 210 biases axle plate 212 towards upper hinge bracket 208 to return hinge assembly 18 from the spaced configuration to the adjacent configuration. In one example embodiment, magnet 210 is an electro permanent magnet that may selectively increase or reduce magnetic attractive force, such as with a control signal provided from an embedded controller or other system management processor.

Figure 35A:
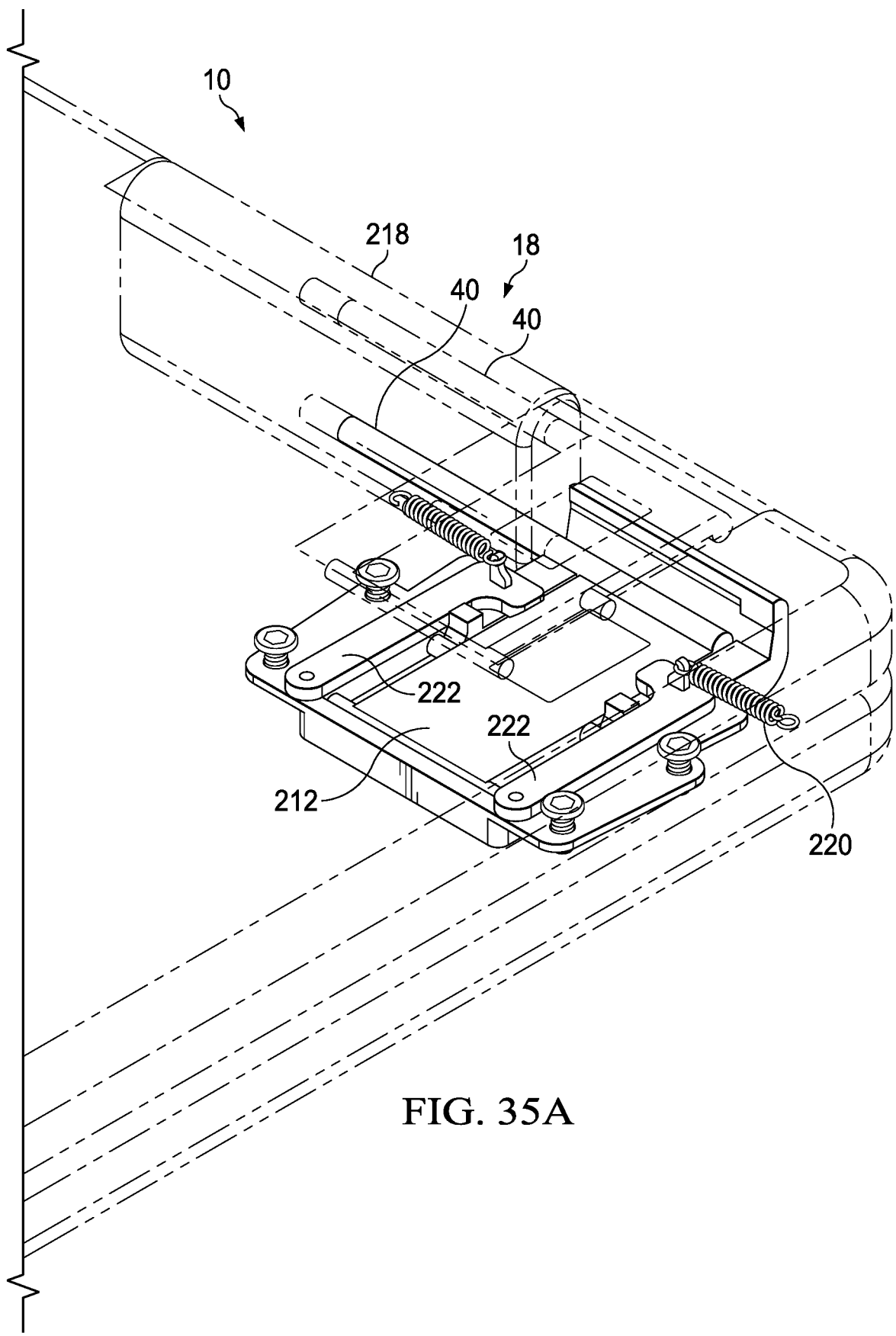
FIGS. 35A and 35B depict an upper perspective cutaway view of the breakaway bracket hinge assembly holding information handling system housing portions in an adjacent position.
Figure 35B:
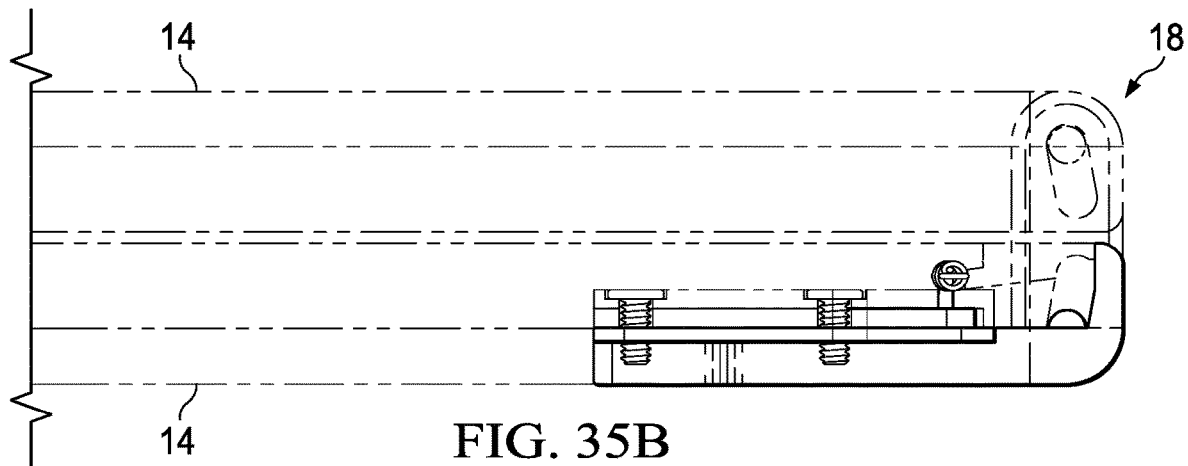

Referring now to FIGS. 35A and 35B, an upper perspective cutaway view depicts the breakaway bracket 206 hinge assembly 18 holding information handling system housing portions 14 in an adjacent position. In the example embodiment, hinge barrel 214 couples to first and second axles extending from first and second housing portions 14 and may include synchronizing gears or other synchronizing devices that cooperate to rotate housing portions. A breakaway bracket 206 may be used to interface both housing portions 14 to hinge knuckle 218 or just one breakaway bracket 206 may be used at one housing portion 14. In the example embodiment, first and second actuator springs 220 engage with a retainer 222 to selectively release retainer 222 and set axle plate 212 free to rotate. For instance, actuator springs 220 are nickel titanium alloy material that pull retainer 222 arms away from axle plate 212 when a current is applied to change the material phase. Retainer 222 has beveled edges that bias over axle plate 212 so that sufficient force pulling axle plate 212 against retainer 222 pushes the retainer arms out and away from axle plate 212 so it can rotate within upper and lower brackets 208 and 216. In the example embodiment, retainer 222 is formed as part of bottom hinge bracket 216 with a resilient plastic material that biases the retaining arms inward and over axle plate 212. Beveled edges are formed on both sides of retainer 222 to aid in passage of axle plate 212 between the adjacent/compressed position and the spaced/expanded position.

Figure 36B:
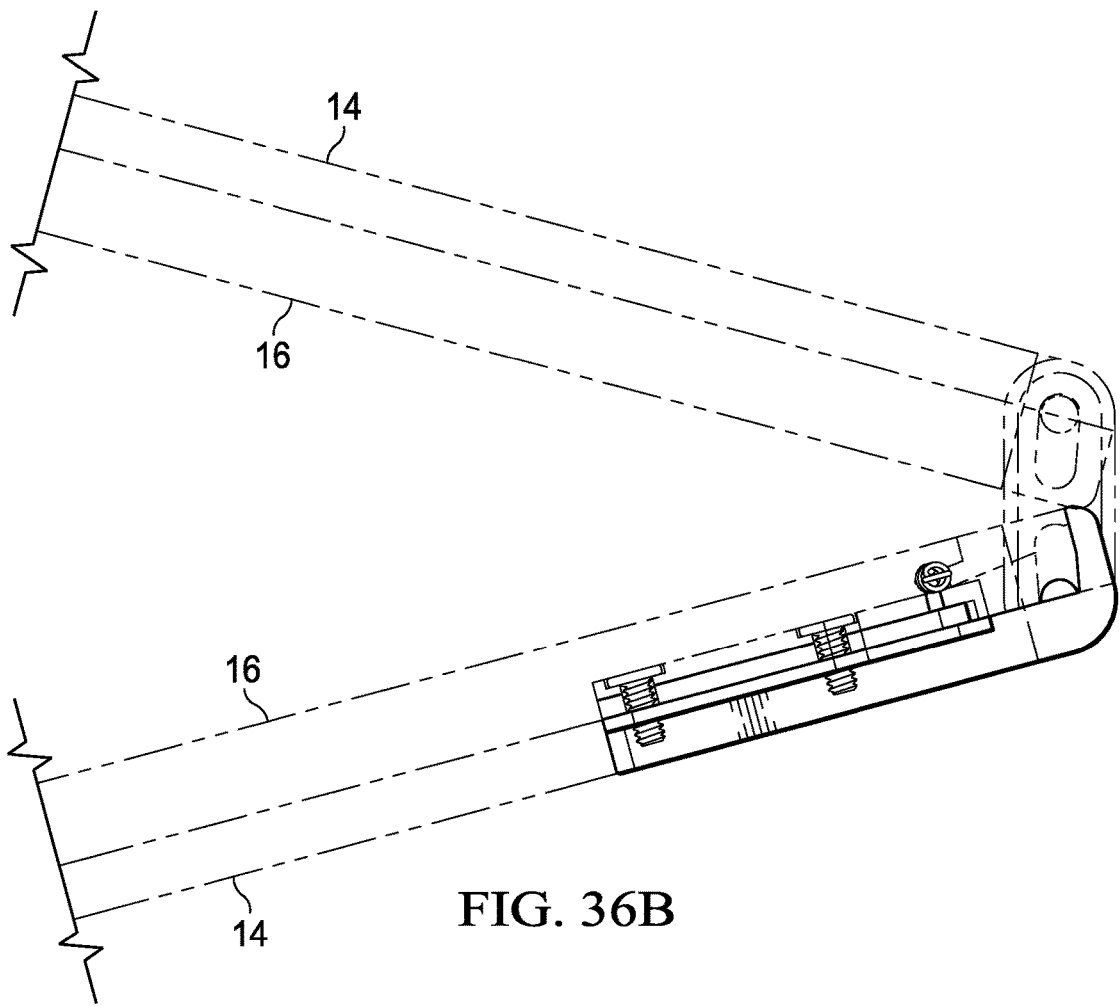
FIGS. 36A and 36B depict an upper perspective cutaway view of the breakaway bracket hinge assembly supporting dual axle housing portion rotation.
Figure 36A:
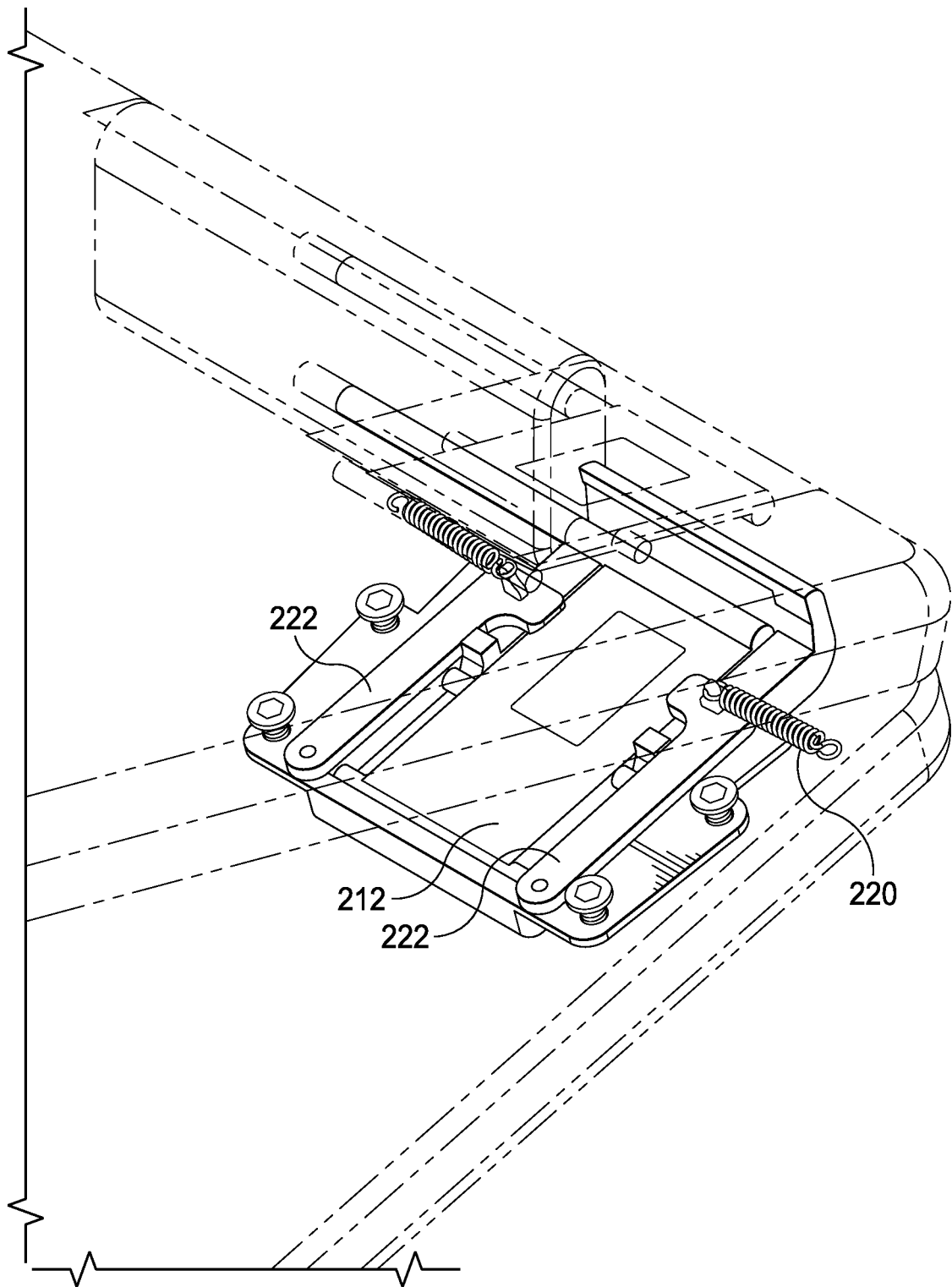

Referring now to FIGS. 36A and 36B, an upper perspective cutaway view depicts the breakaway bracket 206 hinge assembly 18 supporting dual axle housing portion 14 rotation. With axle plate 212 biased against upper hinge bracket 208, such as under the influence of magnet 210 and retainer 222, hinge assembly 18 rotates housing portions 14 in a conventional manner, such as synchronously with a gear mechanism disposed in hinge knuckle 218.

Figure 37A:
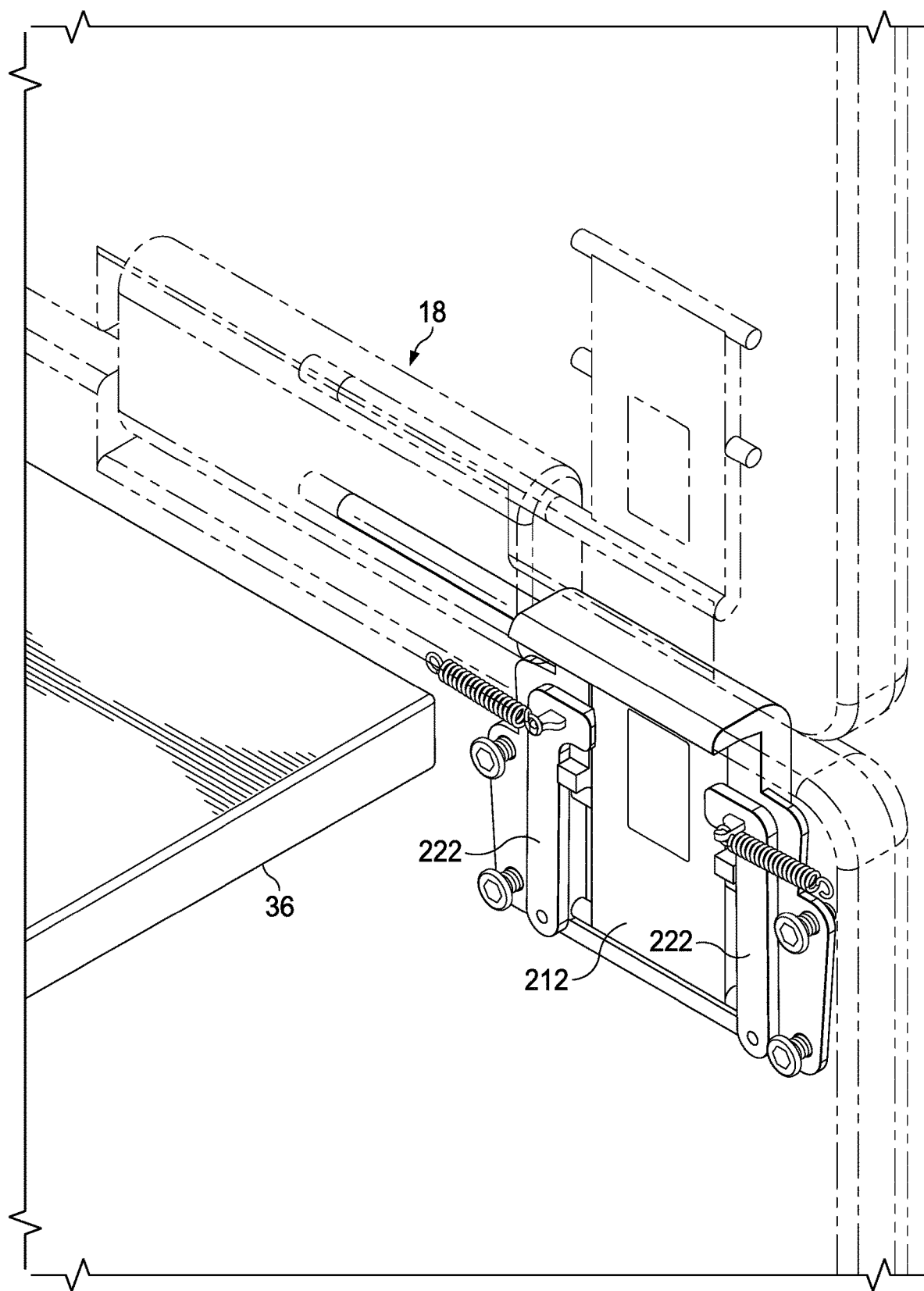
FIGS. 37A and 37B depict a breakaway bracket hinge assembly rotationally coupling information handling system housing portions about dual axles in a flat tablet configuration prepared to close over a keyboard.
Figure 37B:
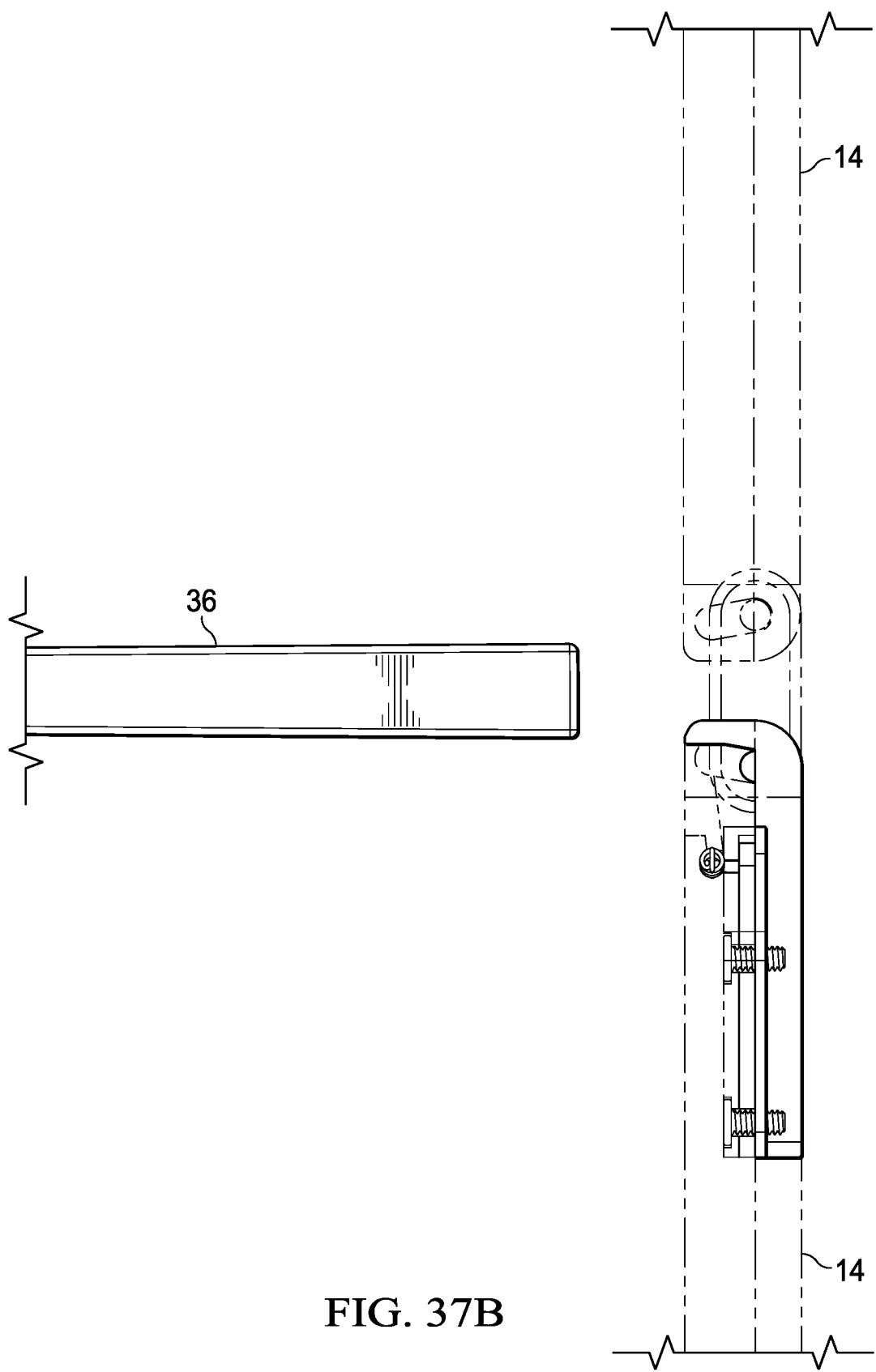

Referring now to FIGS. 37A and 37B, a breakaway bracket 206 hinge assembly 18 rotationally couples information handling system 10 housing portions 14 about dual axles 40 in a flat tablet configuration prepared to close over a keyboard 36. In one embodiment, housing portions 14 close over top of keyboard 36 to generate a separating force at axles 40 that releases axle plate 212 to provide an expanded configuration with room between displays 16 for keyboard 36. In an alternative embodiment, breakaway bracket 206 is released based upon detection of keyboard 36 so that a closing force is not applied against displays 16.

Figure 38A:
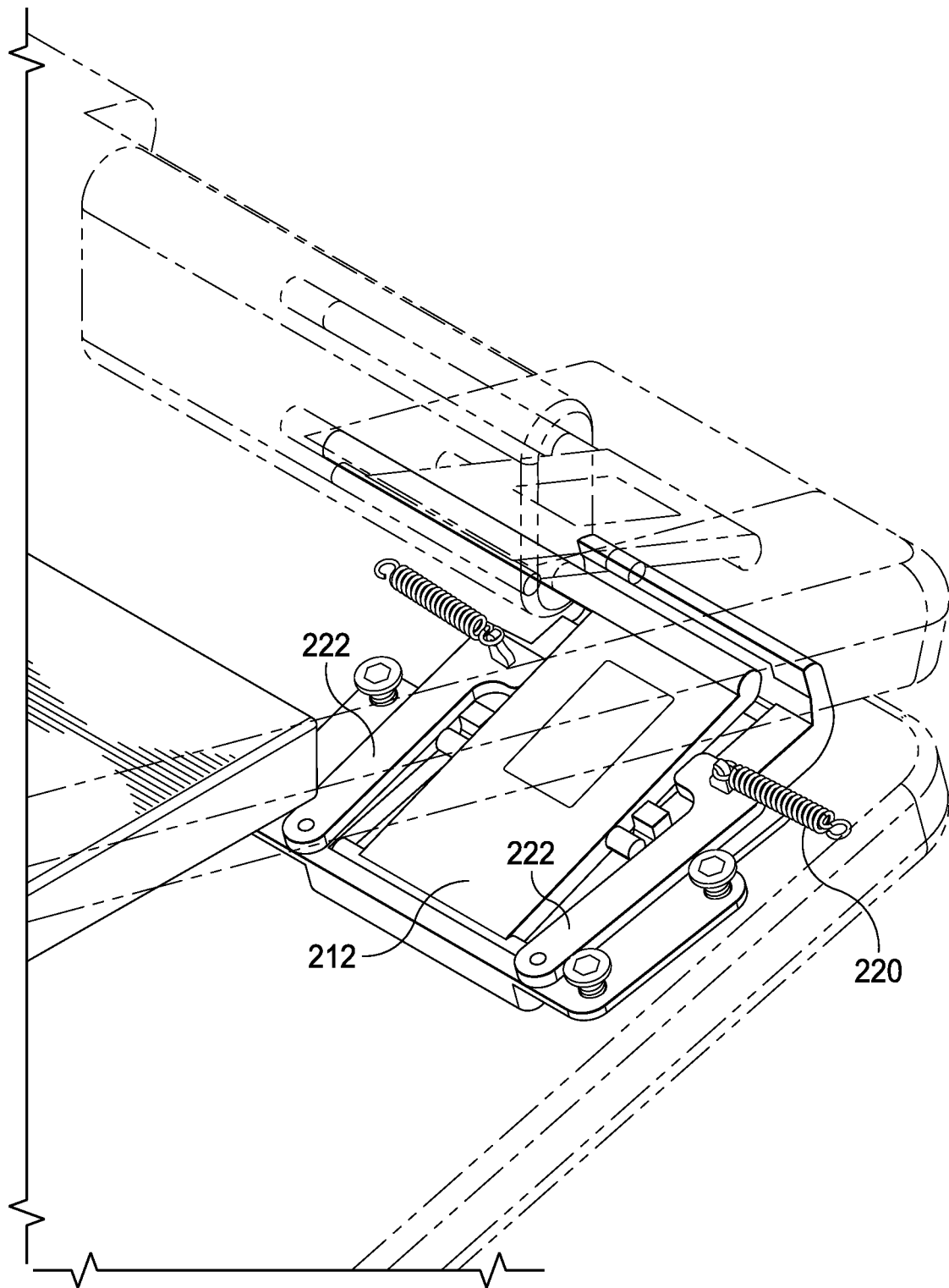
FIGS. 38A and 38B depict an upper perspective cutaway view of the breakaway bracket hinge assembly closing over a keyboard with an expanded configuration spacing between housing portions.
Figure 38B:
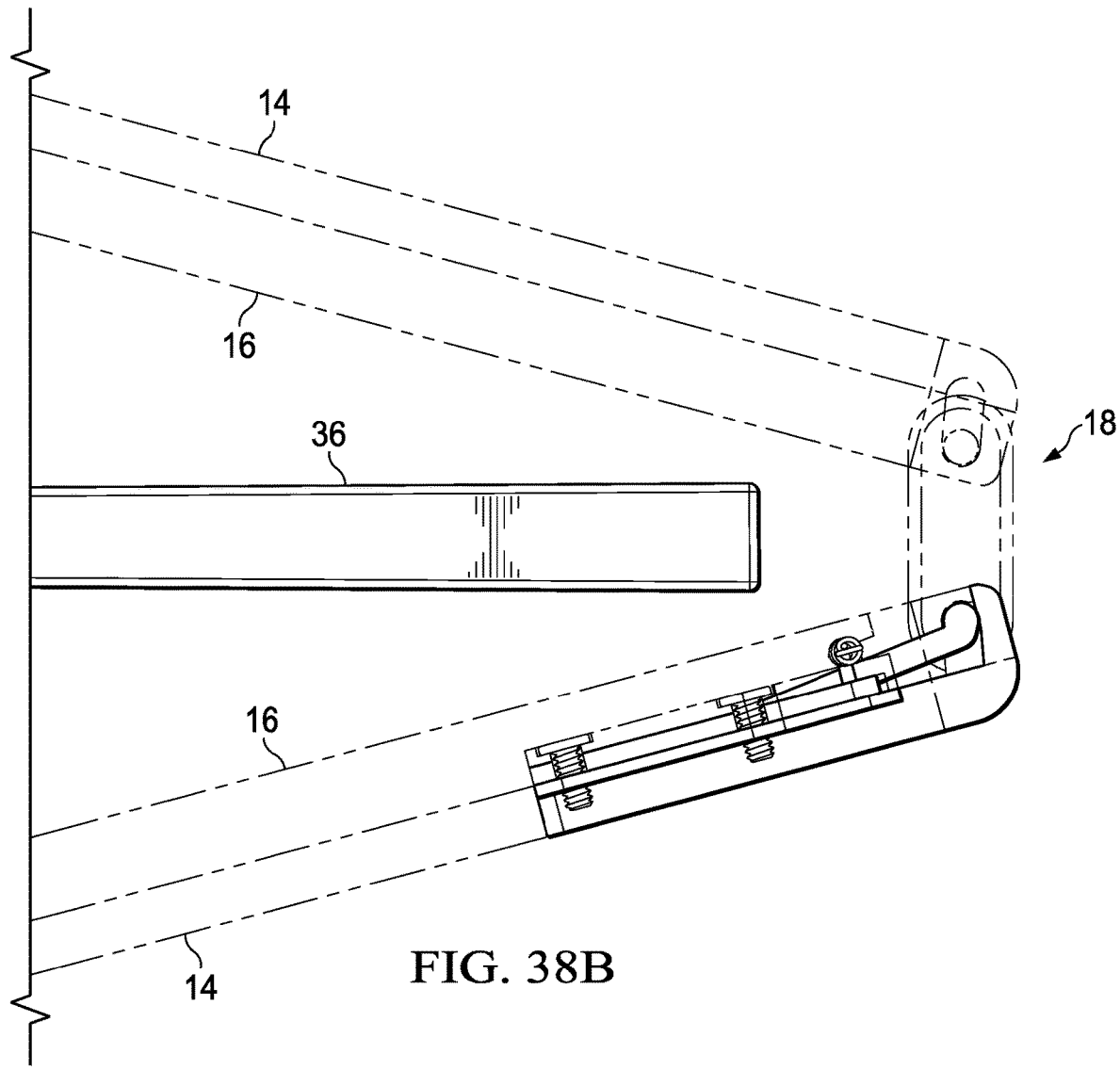

Referring now to FIGS. 38A and 38B, an upper perspective cutaway view depicts breakaway bracket 206 hinge assembly 18 closing over a keyboard 36 with an expanded configuration spacing between housing portions 14. Hinge assembly 18 expands to provide space for keyboard 36 between housing portions 14. The expanded space is created by release of axle plate 212 from retainer 222 to rotate within upper and lower brackets 208 and 216 so that axle 40 moves away from its housing portion 14. Once keyboard 36 is removed from between the housing portions 14, a compressing force against housing portions 14 biases retainer 222 outward and away from axle plate 212 so that axle plate 212 may return to the compressed position against upper bracket 208.

Figure 39A:
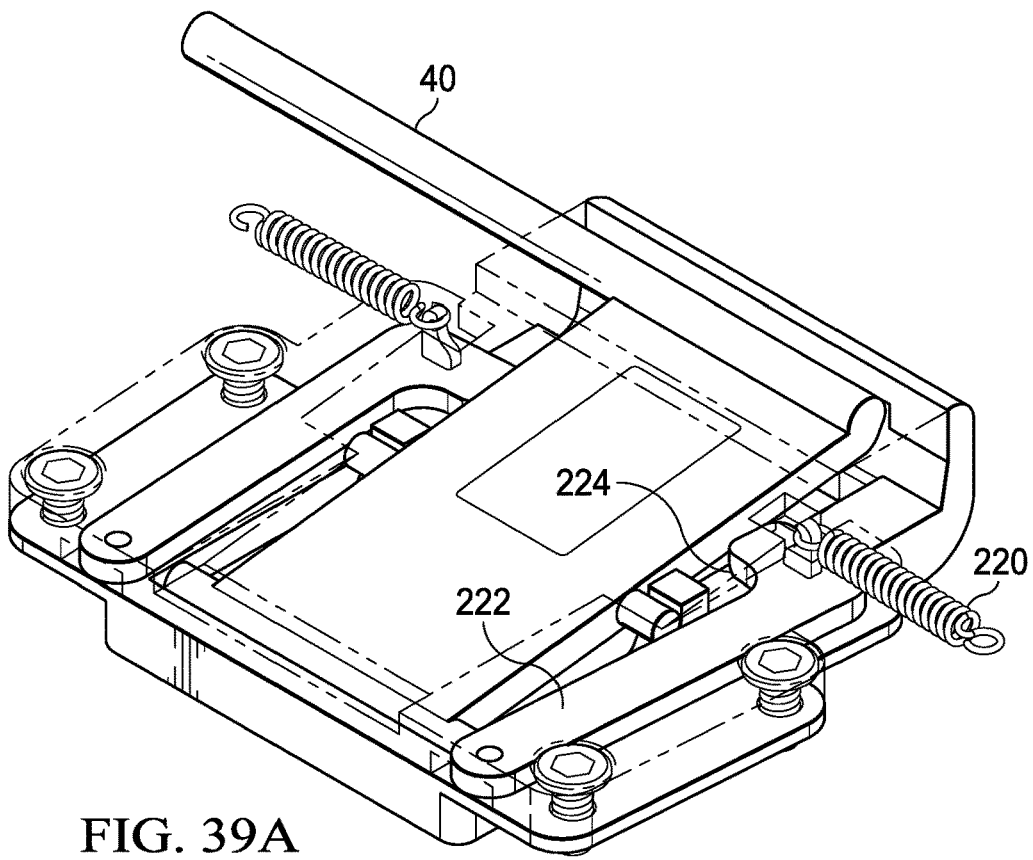
FIGS. 39A, 39B and 39C depict alternative embodiments of breakaway bracket activation devices that adapt to variable distances between information handling system housing portions.
Figure 39B:
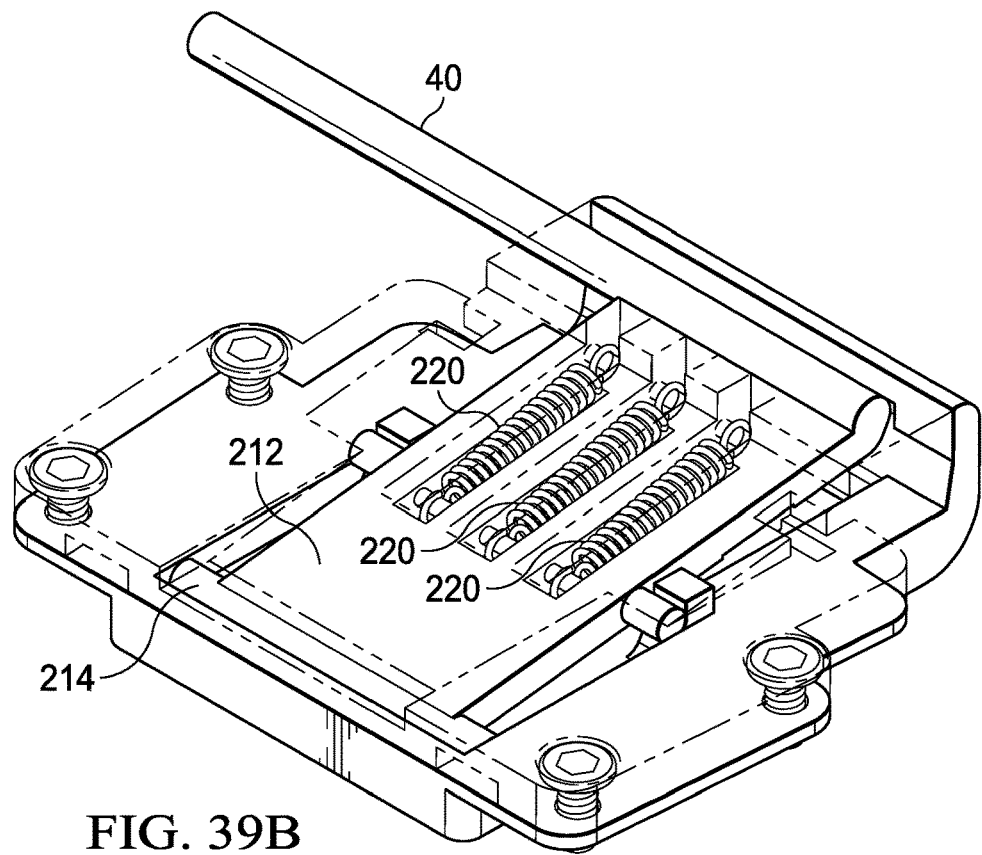
Figure 39C:
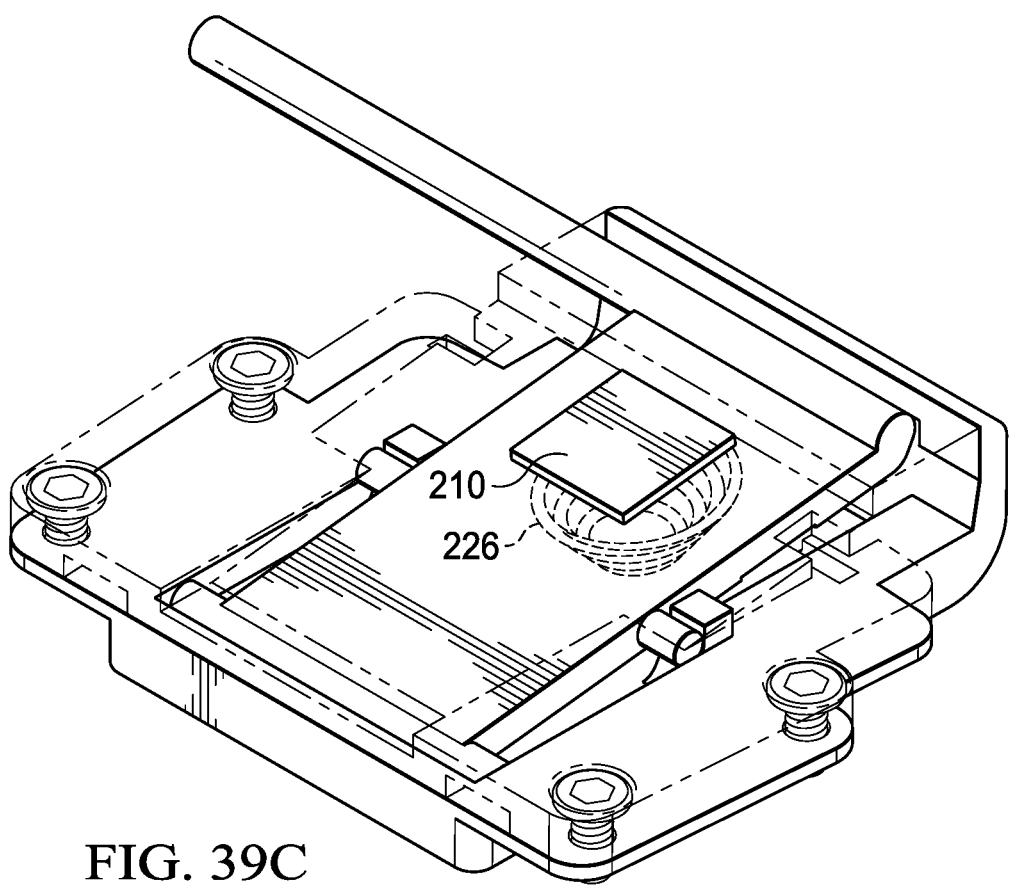

Referring now to FIGS. 39A, 39B and 39C, alternative embodiments are depicted of breakaway bracket 206 activation devices that adapt to variable distances between information handling system housing portions. FIG. 39A depicts beveled edges 224 at the overlap of retainer 222 arms and axle plate 212. Beveling of the edges at the upper and lower surfaces of retainer 222 beveled edge 224 aids transition of axle plate 212 between its compressed and expanded positions. Actuation springs 220 aid the transition between compressed and expanded configurations by pulling outward on retainer 222 when a housing proximity configuration change is desired, such as when a keyboard is detected between or removed from between housing portions 14. FIG. 39B depicts an alternative embodiment of breakaway bracket 206 with actuation springs 220 disposed over top of axle plate 212 to bias axle plate 212 to the compressed position. In one embodiment, actuation springs 220 simply apply a constant bias against axle plate 212 towards the compressed position that is overcome if sufficient separating force is applied at housing portions 14. In an alternative embodiment, nickel titanium alloy springs may be used to adjust axle plate 212 position, such as with a flow of current that changes the spring tension. FIG. 39C depicts yet another alternative embodiment having a balanced conical spring 226 biasing axle plate 212 to the expanded position against a bi-stable magnet 210, such as electro permanent magnet, biasing axle plate 212 to compressed position. The magnetic attraction of electro permanent magnet 210 may be switched between high and low states by logic executing on a embedded controller based upon operating conditions at information handling system 10.

Although the present invention has been described in detail, it should be understood that various changes, substitutions and alterations can be made hereto without departing from the spirit and scope of the invention as defined by the appended claims.

What is claimed is:

1. A method for rotating information handling system housing having first and second housing portions about a hinge assembly, the method comprising:
   rotationally coupling the first housing portion to first and second breakaway brackets of the hinge assembly;
   constraining an axle plate between bracket portions of each breakaway bracket;
   rotating the first and second housing portions about the hinge assembly to a closed position having a first distance between the first and second housing portions;
   disposing a physical object on a display integrated in the housing;
   rotating the first and second housing portions towards a closed position over top of the physical object; and
   translating force applied by the first and second housing portions against the physical object to dislodge the axle plate from an adjacent position to a spread position in response to the translating force exceeding a predetermined force and to rotate the first and second housing portions to a closed position having a second distance between the first and second housing portions of greater than the first distance;
   wherein the to dislodge further comprises:
   holding the axle plate in the adjacent position with opposing arms compressing the axle plate, each arm having a beveled portion overlapping the axle plate; and
   overcoming the compressing the axle plate with the predetermined force applied through the beveled portion.

2. The method of claim 1 wherein the dislodging further comprises:
   coupling the axle plate to an axle at a first end of the axle plate;
   rotationally coupling the axle plate to the bracket portions at a second end opposite the first end; and
   dislodging the axle plate by rotating about the second end.

3. The method of claim 1 further comprising:
biasing the axle plate towards the adjacent position;
removing the predetermined force; and
engaging the axle plate in the opposing arms with force applied from the biasing.

4. The method of claim 1 further comprising:
rotationally coupling the second housing portion to third and fourth breakaway brackets of the hinge assembly; and
translating force applied by the first and second housing portions to dislodge a breakaway portion of the third and fourth breakaway brackets.

* * * * *